United States Patent
Prahlad et al.

(10) Patent No.: US 9,987,755 B2
(45) Date of Patent: Jun. 5, 2018

(54) ELETROADHESIVE GRIPPING SYSTEM WITH SMART BRAKE AND METERING

(71) Applicant: GRABIT, INC., Santa Clara, CA (US)

(72) Inventors: Harsha Prahlad, Cupertino, CA (US); Charlie Duncheon, Los Gatos, CA (US); Steve Annen, Mountain View, CA (US); Matthew Leettola, Rocklin, CA (US); Jonathan Andrew Smith, Nobel (CA); Bobby Neil Roy, Fremont, CA (US)

(73) Assignee: GRABIT, INC., Santa Clara, CA (US)

( * ) Notice: Subject to any disclaimer, the term of this patent is extended or adjusted under 35 U.S.C. 154(b) by 0 days. days.

(21) Appl. No.: 15/126,709

(22) PCT Filed: Mar. 17, 2015

(86) PCT No.: PCT/US2015/021051
§ 371 (c)(1),
(2) Date: Sep. 16, 2016

(87) PCT Pub. No.: WO2015/142911
PCT Pub. Date: Sep. 24, 2015

(65) Prior Publication Data
US 2017/0087728 A1    Mar. 30, 2017

Related U.S. Application Data

(63) Continuation of application No. PCT/US2015/020805, filed on Mar. 16, 2015.
(Continued)

(51) Int. Cl.
*B65G 13/00* (2006.01)
*B65G 13/02* (2006.01)
(Continued)

(52) U.S. Cl.
CPC ........ *B25J 15/0085* (2013.01); *B65G 13/075* (2013.01)

(58) Field of Classification Search
None
See application file for complete search history.

(56) References Cited

U.S. PATENT DOCUMENTS

| | | |
|---|---|---|
| 4,856,769 A | 8/1989 | Andrew et al. |
| 5,207,313 A | 5/1993 | Gebhardt |

(Continued)

FOREIGN PATENT DOCUMENTS

| | | |
|---|---|---|
| DE | 102009011302 A1 | 9/2010 |
| DE | 102011051585 A1 | 1/2013 |

(Continued)

OTHER PUBLICATIONS

Co-pending U.S. Appl. No. 15/299,984, filed Oct. 21, 2016.
(Continued)

*Primary Examiner* — Kavel Singh
(74) *Attorney, Agent, or Firm* — Wilson Sonsini Goodrich & Rosati

(57) ABSTRACT

A system utilizes electroadhesive surfaces for braking and metering objects in an automated environment. An electroadhesive surface can include electrodes that are configured to induce an electrostatic attraction with nearby objects upon application of voltage to the electrodes. The systems described utilize various configurations of electroadhesive surfaces, sensors, controllers and programmable processors to create smart braking, capturing and metering systems for improved automated material handling.

20 Claims, 37 Drawing Sheets

Related U.S. Application Data

(60) Provisional application No. 62/134,009, filed on Mar. 17, 2015, provisional application No. 61/954,438, filed on Mar. 17, 2014.

(51) Int. Cl.
*B65G 13/075* (2006.01)
*B65G 17/08* (2006.01)
*B25J 15/00* (2006.01)

(56) References Cited

U.S. PATENT DOCUMENTS

| | | | |
|---|---|---|---|
| 5,883,357 | A | 3/1999 | Newman et al. |
| 6,548,982 | B1 | 4/2003 | Papanikolopoulos et al. |
| 7,034,432 | B1 | 4/2006 | Pelrine et al. |
| 7,598,651 | B2 * | 10/2009 | Kornbluh ............... B64C 3/48 310/309 |
| 2001/0045755 | A1 | 11/2001 | Schick et al. |
| 2004/0045963 | A1 | 3/2004 | Hoogland |
| 2004/0162639 | A1 | 8/2004 | Watanabe et al. |
| 2005/0036873 | A1 | 2/2005 | Ikehata et al. |
| 2008/0089002 | A1 | 4/2008 | Pelrine et al. |
| 2010/0178139 | A1 | 7/2010 | Sundar et al. |
| 2010/0249553 | A1 | 9/2010 | MacLaughlin |
| 2011/0193362 | A1 | 8/2011 | Prahlad et al. |
| 2012/0101627 | A1 | 4/2012 | Lert |
| 2012/0120544 | A1 | 5/2012 | Pelrine et al. |
| 2012/0330453 | A1 * | 12/2012 | Samak Sangari ...... B25J 9/1697 700/121 |
| 2013/0129464 | A1 | 5/2013 | Regan et al. |
| 2013/0242455 | A1 | 9/2013 | Prahlad et al. |
| 2013/0276826 | A1 | 10/2013 | Koenig et al. |
| 2013/0292303 | A1 | 11/2013 | Prahlad et al. |
| 2013/0294875 | A1 | 11/2013 | Prahlad et al. |
| 2014/0036404 | A1 | 2/2014 | Prahlad et al. |
| 2014/0104744 | A1 | 4/2014 | Prahlad et al. |
| 2015/0176981 | A1 | 6/2015 | Regan et al. |
| 2015/0298320 | A1 | 10/2015 | Eisele et al. |
| 2016/0318190 | A1 | 11/2016 | Prahlad et al. |
| 2017/0036798 | A1 | 2/2017 | Prahlad et al. |

FOREIGN PATENT DOCUMENTS

| | | |
|---|---|---|
| JP | 2003285289 A | 10/2003 |
| JP | 2004142878 A | 5/2004 |
| JP | 2005035751 A | 2/2005 |
| JP | 2009166859 A | 7/2009 |
| JP | 2012131612 A | 7/2012 |
| KR | 20110078566 A | 7/2011 |
| KR | 20130130405 A | 12/2013 |
| WO | WO-2007128398 A1 | 11/2007 |
| WO | WO-2013166317 A2 | 11/2013 |
| WO | WO-2013166324 A2 | 11/2013 |
| WO | WO-2015094375 A1 | 6/2015 |
| WO | WO-2015095826 A1 | 6/2015 |
| WO | WO-2015142754 A1 | 9/2015 |
| WO | WO-2015142911 A1 | 9/2015 |
| WO | WO-2015164264 A1 | 10/2015 |
| WO | WO-2016054561 A1 | 4/2016 |
| WO | WO-2017123816 A1 | 7/2017 |
| WO | WO-2017123817 A1 | 7/2017 |
| WO | WO-2017123818 A1 | 7/2017 |

OTHER PUBLICATIONS

PCT/US2015/026679 International Preliminary Report on Patentability dated Nov. 3, 2016.
PCT/US2015/026679 International Search Report and Written Opinion dated Aug. 27, 2015.
PCT/US2013/077280 International Preliminary Report on Patentability dated Jun. 30, 2016.
PCT/US2013/077280 International Search Report and Written Opinion dated Oct. 2, 2014.
PCT/US2014/071725 International Preliminary Report on Patentability dated Jun. 30, 2016.
PCT/US2014/071725 International Search Report and Written Opinion dated Apr. 16, 2015.
PCT/US2017/013262 Invitation to Pay Additional Fees dated Mar. 20, 2017.
PCT/US2017/013266 International Search Report and Written Opinion dated Apr. 3, 2017.
PCT/US2017/013262 International Search Report and Written Opinion dated May 24, 2017.
PCT/US2017/013264 International Search Report and Written Opinion dated May 16, 2017.
PCT/US2017/056413 International Search Report and Written Opinion dated Jan. 12, 2018.
PCT/US2015/020805 International Preliminary Report on Patentability dated Sep. 29, 2016.
PCT/US2015/020805 International Search Report and Written Opinion dated Jul. 20, 2015.
PCT/US2015/021051 International Preliminary Report on Patentability dated Sep. 29, 2016.
PCT/US2015/021051 International Search Report and Written Opinion dated Sep. 3, 2015.

* cited by examiner

+ve polarity
-ve polarity
ground polarity

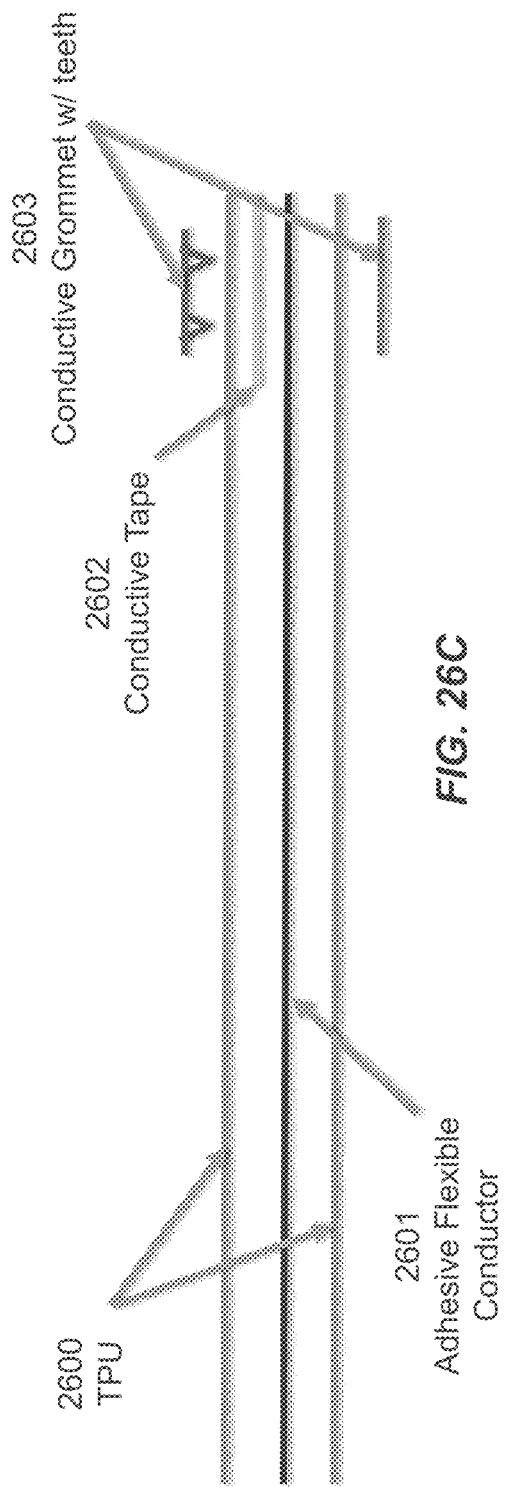

| Size | Weight |
|---|---|
| (in x in x in) | (lbs) |
| 10 x 10 x 8 | 26 |
| 12 x 10 x 6.5 | 6 |
| 16 x 12 x 9 | 9 |
| 18 x 12 x 12 | 12 |
| 24 x 16 x 6.5 | 16 |
| 28 x 15 x 12 | 17 |
| 36 x 22 x 6 | 22 |
| 40 x 24 x 9 | 45 |
| 8 x 8 x 8 | 1.5 |

FIG. 28

ELETROADHESIVE GRIPPING SYSTEM WITH SMART BRAKE AND METERING

CROSS-REFERENCE TO RELATED APPLICATIONS

This application is filed pursuant to 35 U.S.C. § 371 as a United States National Phase Application of International Application No. PCT/US2015/021051 entitled "ELECTROADHESIVE GRIPPING SYSTEM WITH SMART BRAKE AND METERING" filed Mar. 17, 2015, which claims the benefit of U.S. Provisional Application No. 62/134,009, filed Mar. 17, 2015, PCT/US2015/20805, filed Mar. 16, 2015, and U.S. Provisional Application No. 61/954,438, filed Mar. 17, 2014, which are incorporated by reference herein in their entirety.

BACKGROUND OF THE INVENTION

The present invention relates to automated manufacturing and material handling. More particularly, the present invention relates to, in an automated manner, object handling and processing, and providing a modular system for acquiring or moving said objects in a manufacturing process.

Substantial developments have been made in the industrial handling of various materials and items, particularly in the area of robotics. For example, various types of robotics and other automated systems are now used in order to "pick and place" objects during many manufacturing and other materials handling processes. Such robotics and other systems can include robot arms that, for example, grip, lift and/or place an object as part of a designated process. Other manipulations and materials handling techniques can also be accomplished using robotics or other automated systems. Despite many advances over the years in this field, there are many limitations as to what can be handled in such a manner.

Conventional robotic grippers typically use either suction or a combination of large normal forces and fine control with mechanical actuation in order to grip objects. Such techniques have several drawbacks. For example, the use of suction tends to require smooth, clean, dry and generally flat surfaces, which limits the types and conditions of objects that can be gripped. Suction also tends to require a lot of power for the pumps and is prone to leaks at any location on a vacuum or low pressure seal, with a corresponding loss of suction being potentially catastrophic. The use of mechanical actuation often requires large normal or "crushing" forces against an object, and also tends to limit the ability to robotically grip fragile or delicate objects. Producing large forces also increases the cost of mechanical actuation. Mechanical pumps and conventional mechanical actuation with large crushing forces also often require substantial weight, which is a major disadvantage for some applications, such as the end of a robot arm where added mass must be supported. Furthermore, even when used with sturdy objects, robotic arms, mechanical claws and the like can still leave damaging marks on the surface of the object itself.

In conveyance systems, robotic grippers are even less efficient when used for sorting or routing products during mass manufacturing operations. Alternate methods such as gates, levers, tilted ramps, chutes and the like are often employed to expedite these steps. However, problems still remain with sorting operations such as stacking or layering that often prevents optical readers from tracking labels, or allows the clogging of chutes and conveyor pinch points. Excessive speed of objects being obtained on downward ramps, rollers or chutes, often results in crushed products, packages, parcels and fragile objects; or the inability of receiving personnel or equipment to adequately capture or process objects on the receiving end of the delivery ramp, chute or conveyor. Oftentimes, packages, crates, suitcases, parcels or other bulky objects may simply tumble, roll down, or even, roll off of a conveyor, chute or ramp depending on the inclination angle, turning radius, or speed of approach that the package obtains when entering the "trouble point". As a result, there remains a need for improved handling, braking and metering systems that can complement or replace existing inefficient automated conveyance systems.

SUMMARY OF THE INVENTION

The present invention is drawn to a novel electroadhesive gripping system used in manufacturing or material handling for braking, capturing or metering moving objects as they proceed through a material handling process. The system comprises an electroadhesive film surface with one or more electrodes at or near the electroadhesive gripping surface, a power supply, a controller, a sensor and a processor, wherein the system interprets material handling information based on various parameters detected in a material handling process and apply the use of electroadhesive surfaces to appropriately meter the flow of objects; slow, stop or brake the flow of objects; or capture objects that are unstable and have left the flow path, or are in imminent danger of leaving the flow path.

A system utilizes electroadhesive surfaces for braking, capturing and metering objects in an automated environment. An electroadhesive surface includes electrodes that are configured to induce an electrostatic attraction with nearby objects upon application of voltage to the electrodes. The systems described utilize various configurations of electroadhesive surfaces, sensors, controllers and programmable processors to create smart braking, capturing and metering systems for improved automated material handling.

Provided herein is a system comprising an electroadhesive surface including one or more electrodes; a sensor that detects one or more of the presence of a first object or a plurality of objects, a rate of movement of the first object or a second object, an acceleration of movement of the first object or the second object; and a controller configured to meter the flow of the plurality of objects by applying a voltage to the one or more electrodes when the first object is in contact with the electroadhesive surface based on the sensor detection. In some embodiments, the system further comprises a processor configured to receive object detection data from the sensor, and output electroadhesive surface instruction to the controller based on the detection data. In some embodiments of the system the processor comprises flow control instructions based on a second sensor, a flow plan, or a user input. Provided herein is a system comprising: an electroadhesive surface including one or more electrodes; a processor comprising flow control instructions and electroadhesive surface instructions based on the flow control instructions; a controller configured to meter the flow of a plurality of objects by applying a voltage to a first electrode of the one or more electrodes when a first object of the plurality of objects is in contact with the electroadhesive surface based on an electroadhesive surface instruction from the processor. In some embodiments, the system further comprises a sensor configured to detect one or more of presence an object, a rate of movement of the object, or an acceleration of movement of the object, and output object detection data to the processor. Provided herein is a system comprising: an electroadhesive surface including one or more electrodes; a sensor that detects one or more of the presence of an object, a rate of movement of the object, or an acceleration of movement of the object; and a controller configured to decelerate the object by applying a voltage to a first electrode of the one or more electrodes when the object is in contact with the electroadhesive surface based on the sensor detection, wherein the object continues moving relative to the electroadhesive surface despite deceleration. In some embodiments, the system further comprises a processor configured to receive object detection data from the sensor, and output electroadhesive surface instruction to the controller based on the detection data. In some embodiments the processor comprises flow control instructions based on a second sensor, a flow plan, or a user input. Provided herein is a system comprising: an electroadhesive surface including one or more electrodes; a controller configured to decelerate an object that is in contact with the electroadhesive surface by applying a voltage to a first electrode of the one or more electrodes based on an instruction from a processor that controls the flow of the object based on a sensor detection of the object. In some embodiments, the system further comprises a sensor configured to detect one or more of presence the object or of a second object, a rate of movement of the object or of a second object, or an acceleration of movement of the object, and output object detection data to the processor. In any one of the system embodiments, the sensor comprises: an optical sensor, a weight sensor, a speed sensor, an acceleration sensor, a proximity sensor, a touch sensor, a laser sensor, a RFID sensor, an UV sensor, an Infrared sensor, and a radar sensor. In any one of the system embodiments, the sensor determines: the presence of the object, the presence of a second object, the presence of stacked or layered objects, the number of objects in a stack, the size of the object, the shape of the object, the weight of the object, the speed of the object, or the acceleration or deceleration of the object, or the acceleration or deceleration of a second object. In any one of the system embodiments, the electroadhesive surface is flexible. In any one of the system embodiments, the electroadhesive surface has a low coefficient of friction when there is no voltage applied. In any one of the system embodiments, the electroadhesive surface comprises: a pad, a curtain, a flap, a strip, chute, a slide, a roller, a carousel, a door, an arm, a partition, a step, a platform, a table, an undulating surface, a decline surface, and an incline surface. Provided herein is a conveyance system of any one of the embodiments described herein. Provided herein is a metering system for a conveyance system comprising an electroadhesive surface including one or more electrodes; a sensor configured to detect one or more of presence the object or of a second object, a rate of movement of the object or of a second object, or an acceleration of movement of the object, and output object detection data to the processor; a controller configured to decelerate the object by applying a voltage to a first electrode of the one or more electrodes when the object is in contact with the electroadhesive surface based on the sensor detection, wherein the object continues moving relative to the electroadhesive surface despite deceleration; wherein the sensor and electroadhesive surface meter the flow of objects in a process path. In some embodiments of the metering system or the conveyance system, the electroadhesive surface comprises a flap or pad installed beneath rollers of a conveyor system and within proximate contact with the rollers, wherein said electroadhesive surface interacts with the rollers to decelerate rotation when voltage is applied to one or more electrodes in the electroadhesive surface. In some embodiments, the decelerated rotation of the rollers produces a metering effect on an object moving over the rollers. In some embodiments the decelerated rotation of the rollers produces a braking effect on an object moving over the roller. Provided herein is a system comprising: a movable substrate; an electroadhesive surface; and a fixed substrate, wherein the fixed substrate has an electrostatic potential that is different from an electrostatic potential of the movable substrate; wherein the electroadhesive surface shifts between a same electrostatic potential as the movable substrate and a different electrostatic potential as the movable substrate; and wherein a velocity of the movable substrate is controlled by electroadhesion to the electroadhesive surface. Provided herein is a system comprising: a movable substrate; an electroadhesive surface; and a fixed substrate, wherein the fixed substrate has an electrostatic potential that is different from an electrostatic potential of the movable substrate; wherein the electroadhesive surface shifts one or more times between a same electrostatic potential as the movable substrate and a different electrostatic potential as the movable substrate; and wherein a velocity of the movable substrate is controlled by electroadhesion to the electroadhesive surface. Provided herein is a system comprising: a movable substrate; an electroadhesive surface; and a fixed substrate, wherein the fixed substrate has an electrostatic potential that is different from an electrostatic potential of the movable substrate; wherein the electroadhesive surface shifts between electrostatic attraction to the movable substrate and electrostatic attraction to the fixed substrate; wherein the electroadhesive surface moves independently from the fixed substrate during the electrostatic attraction to the movable substrate; and wherein a velocity of the movable substrate is controlled by electroadhesion to the electroadhesive surface. In some embodiments, the velocity of the movable substrate is decreased intermittently. In some embodiments, the velocity is decreased by at least about 10%. In some embodiments, the velocity of the movable substrate is decreased by at least about 25%. In some embodiments, the velocity of the movable substrate is decreased by at least about 50%. In some embodiments, the velocity of the movable substrate is decreased by at least about 75%. In some embodiments, the velocity of the movable substrate is decreased by 100%. In some embodiments, the movable substrate is a planar movable substrate. In some embodiments, the movable substrate is a curved movable substrate. In some embodiments, the curved movable substrate is a brake roller. In some embodiments, the brake roller is a metallic brake roller. In some embodiments, the movable substrate maintains an electrostatic potential equal to ground potential. In some embodiments, the system further comprises a ground brush. In some embodiments, the fixed substrate is a planar fixed substrate. In some embodiments, the fixed substrate is a curved fixed substrate. In some embodiments, the curved fixed substrate is a fixed bed. In some embodiments, the curved fixed substrate is a cupped brake housing. In some embodiments, a curve of the curved fixed substrate is the same as a curve of the curved movable substrate. In some embodiments, the fixed substrate further comprises molded material. In some embodiments, the fixed substrate further comprises electrostatic conductive regions. In some embodiments, the electroadhesive surface comprises ground potential or bipolar electrostatic potential. In some embodiments, the bipolar electrostatic potential comprises at least one region of positive polarity and at least one region of negative polarity. In some embodiments, a velocity of a moving object contacting the movable substrate is controlled by electroadhesion. In some embodiments, the velocity of the moving object is decreased by at least about 10%. In some embodiments, the velocity of the moving object is decreased by at least about 25%. In some embodiments, the velocity of the moving object is decreased by at least about 50%. In some embodiments, the velocity of the moving object is decreased by at least about 75%. In some embodiments, the velocity of the moving object is decreased by 100%. In some embodiments, the velocity of the moving object of about 100 feet per minute (ft/min) is decreased by 100% in about 5 inches. In some embodiments, the velocity of the moving object of about 200 ft/min is decreased by 100% in about 20 inches. In some embodiments, the velocity of the moving object of about 300 ft/min is decreased by 100% in about 44 inches. In some embodiments, the moving object is about 50 pounds (lbs). In some embodiments, the moving object is at least about 10 pounds (lbs). In some embodiments, the moving object is at least about 15 pounds (lbs). In some embodiments, the system is orientated to about a 7.5 degree angle relative to ground. In some embodiments, the system is orientated to about an 8 degree angle relative to ground. In some embodiments, the system is orientated to about an 8.5 degree angle relative to ground. In some embodiments, the system is orientated to about a 9 degree angle relative to ground. In some embodiments, the system further comprises a power supply. In some embodiments, the shifting is performed electronically. In some embodiments, the system is utilized as a roller brake. In some embodiments, the system is utilized as a braking system. In some embodiments, the system is retrofitted to a roller conveyor. In some embodiments, the system further comprises two or more movable substrates and two or more fixed substrates. In some embodiments, the two or more movable substrates is about 5 or more and the two or more fixed substrates is about 5 or more. In some embodiments, the two or more movable substrates is about 10 or more and the two or more fixed substrates is about 10 or more. In some embodiments, the two or more movable substrates is about 15 or more and the two or more fixed substrates is about 15 or more. In some embodiments, each of the two or more movable substrates self-reference to a single fixed substrate of the two of more fixed substrates. In some embodiments, the electroadhesive surface is weaved between the two or more movable substrates. In some embodiments, the system further comprises an electroadhesive curtain. In some embodiments, the electroadhesive curtain is attached above the movable substrate. In some embodiments, the electroadhesive curtain provides a braking force to the moving object by generating an electrostatic potential difference between the moving object and the electroadhesive curtain. In some embodiments, the electrostatic potential difference between the moving object and the electroadhesive curtain is generated on-demand. In some embodiments, the electrostatic potential difference between the moving object and the electroadhesive curtain is generated for a moving object above about 10 lbs. In some embodiments, the electrostatic potential difference between the moving object and the electroadhesive curtain is generated for a moving object above about 15 lbs. In some embodiments, the electrostatic potential difference between the moving object and the electroadhesive curtain is generated for a moving object above about 20 lbs. In some embodiments, the electroadhesive curtain is a same length as the moving object. In some embodiments, the electroadhesive curtain is a length longer than the moving object. In some embodiments, the electroadhesive curtain provides a braking force to the moving object by generating an electroadhesive force between the electroadhesive curtain and the fixed substrate underneath the moving object. In some embodiments, a distance between the fixed substrate and the movable substrate is maintained. In some embodiments, a detachment of the electroadhesive surface from the movable substrate occurs when the electrostatic potential of the electroadhesive surface is equivalent to ground potential. In some embodiments, a detachment of the electroadhesive surface from the movable substrate prevents excessive friction between one or more movable substrates. In some embodiments, an individual movable substrate is referenced to an individual fixed substrate. In some embodiments, the electroadhesive surface contacts the fixed substrate when the moving object is below about 5 lbs. In some embodiments, the electroadhesive surface comprises a top electroadhesive film and a bottom electroadhesive film. In some embodiments, the top electroadhesive film comprises a top surface and a bottom surface, wherein the top surface contacts the movable substrate and the bottom surface contacts a brake wherein the contacting is alternated. In some embodiments, the bottom electroadhesive film comprises a bottom surface sealed to the fixed substrate and a top surface, wherein the top surface contacts the bottom surface of the top electroadhesive film. In some embodiments, the system further comprises a bearing. In some embodiments, the system further comprises a brake shoe. In some embodiments, an individual movable substrate is referenced to an individual fixed substrate and an individual brake shoe. In some embodiments, a bearing contacts the movable substrate by magnetic force. In some embodiments, a bearing contacts the movable substrate by spring-loaded force. In some embodiments, the system further comprises a sensor. In some embodiments, the sensor measures one or more features of the moving object comprising a weight of the moving object, a velocity of the moving object, or an acceleration of the moving object, or combinations thereof. In some embodiments, the one or more measurements determine whether to generate electrostatic potential differences between the movable substrate and the moving object. In some embodiments, the system is utilized in an automated environment. Provided herein is a kit for retrofitting a declining roller conveyor with a braking system comprising: a set of roller conveyor, one or more movable substrates, one or more fixed substrates, an electroadhesive surface, wherein each of the one or more movable substrates references a single fixed substrate from the one or more fixed substrates, and wherein the roller conveyor retrofitted with the braking system decreases a velocity of a moving object by at least about 10%. In some embodiments, the roller conveyor is at least about 5 feet (ft) in length. In some embodiments, the roller conveyor is at least about 10 ft in length. In some embodiments, the roller conveyor is between about 1.0 ft-30.0 ft in length. In some embodiments, the roller conveyor is orientated to about an 8 degree angle relative to ground. In some embodiments, the braking system is mounted underneath the roller conveyor. In some embodiments, the velocity of the moving object is decreased by 100%. In some embodiments, the velocity of the moving object of about 100 feet per minute (ft/min) is decreased by 100% in about 5 inches. In some embodiments, the velocity of the moving object of about 200 ft/min is decreased by 100% in about 20 inches. In some embodiments, the velocity of the moving object of about 300 ft/min is decreased by 100% in about 44 inches. In some embodiments, the moving object is about 50 lbs. In some embodiments, the moving object is at least about 10 lbs. In some embodiments, the moving object is at least about 15 lbs. In some embodiments, the kit is utilized in an automated environment. Provided herein is a method for decreasing the velocity of a movable substrate, the method comprising: contacting an electroadhesive surface to the movable substrate by generating an electrostatic potential difference between the movable substrate and the electroadhesive surface; separating the electroadhesive surface from the movable substrate by attracting the electroadhesive surface towards a separate fixed substrate; and shifting between the contacting and the separating one or more times, wherein the velocity of the movable substrate is controlled by electroadhesion to the electroadhesive surface. Provided herein is a method of exerting force on two or more objects, the method comprising: generating an electrostatic potential difference between an electroadhesive surface and a first object, wherein the electrostatic potential difference exerts a first force to the first object; and changing the electrostatic potential of the electroadhesive surface to generate a second force on the first object and a first force on a second object, wherein the changing is repeated one or more times to exert two or more forces on two or more objects. In some embodiments, the force on two or more objects guides a movement trajectory of the two or more objects. In some embodiments, the method is utilized in an automated environment. In some embodiments, the first force is an attractive force. In some embodiments, the second force is an attractive force. In some embodiments, the first force is a repulsive force. In some embodiments, the second force is a repulsive force. In some embodiments, the force per unit area is between about 0.08 and about 0.1 pounds per square inch (lbs/in^2). In some embodiments, the force per unit area is between about 0.16 and about 0.19 lbs/in^2. In some embodiments, the force per unit area is between about 0.21 and about 0.25 lbs/in^2.

Provided herein is a system comprising an electroadhesive surface comprising one or more electrodes; and a controller configured to meter flow of an object on-demand by applying a voltage to the one or more electrodes when the object is in a proximity to the electroadhesive surface. In some embodiments, a controller output is triggered by a sensor that detects one or more of: a presence of the object; a measured weight or a measured size of the object informed from a control system; a rate of movement of the object or a second object; and an acceleration of movement of the object or the second object. In some embodiments, a processor configured to: receive object detection data from the sensor; and output electroadhesive surface instructions to the controller based on the object detection data. In some embodiments, the processor comprises flow control instructions based on a second sensor, a flow plan, or a user input. Provided herein is a system comprising an electroadhesive surface comprising one or more electrodes; a processor comprising flow control instructions and electroadhesive surface instructions based on the flow control instructions; and a controller configured to meter the flow of a plurality of objects by applying a voltage to the one or more electrodes when a first object of the plurality of objects is in contact with the electroadhesive surface based on instruction from the processor. In some embodiments, the system further comprises a sensor configured to: detect one or more of presence an object, a rate of movement of the object, or an acceleration of movement of the object, and output object detection data to the processor. Provided herein is a system comprising an electroadhesive surface comprising one or more electrodes; a sensor that detects the presence an object or a second object, a rate of movement of the object or the second object, or an acceleration of movement of the object or the second object; and a controller configured to decelerate the object by applying a voltage to a first electrode of the one or more electrodes when the object is in contact with the electroadhesive surface based on the sensor detection, wherein the object continues moving relative to the electroadhesive surface despite deceleration. In some embodiments, the system further comprises a processor configured to: receive object detection data from the sensor, and output electroadhesive surface instruction to the controller based on the detection data. In some embodiments, the processor comprises flow control instructions based on a second sensor, a flow plan, or a user input. Provided herein is a system comprising an electroadhesive surface comprising one or more electrodes; a controller configured to decelerate an object that is in contact with the electroadhesive surface by applying a voltage to a first electrode of the one or more electrodes based on an instruction from a processor that controls the flow of the object based on a sensor detection of the object. In some embodiments the system further comprises a sensor configured to: detect one or more of presence the object or of a second object, a rate of movement of the object or of a second object, or an acceleration of movement of the object, and output object detection data to the processor. In some embodiments, the sensor comprises: an optical sensor, a weight sensor, a speed sensor, an acceleration sensor, a proximity sensor, a touch sensor, a laser sensor, a RFID sensor, an UV sensor, an Infrared sensor, or a radar sensor. In some embodiments, the sensor determines: the presence of the object, the presence of the second object, the presence of stacked or layered objects, the number of objects in a stack, the size of the object, the shape of the object, the weight of the object, the speed of the object, the acceleration or deceleration of the object, or the acceleration or deceleration of the second object. In some embodiments, the electroadhesive surface is flexible. In some embodiments, the electroadhesive surface has a low coefficient of friction when there is no voltage applied. In some embodiments, the electroadhesive surface comprises: a pad, a curtain, a flap, a strip, chute, a slide, a roller, a carousel, a door, an arm, a partition, a step, a platform, a table, an undulating surface, a decline surface, or an incline surface. In some embodiments, the system comprises a conveyance system. Provided herein is a system comprising a movable substrate; an electroadhesive surface; and a fixed substrate, wherein the fixed substrate has an electrostatic potential that is different from an electrostatic potential of the movable substrate; wherein the electroadhesive surface shifts between a first electrostatic potential that is the same as the electrostatic potential of the movable substrate and a second electrostatic potential that is different than the electrostatic potential of the movable substrate; and wherein a velocity of the movable substrate is controlled by electroadhesion to the electroadhesive surface. Provided herein is a system comprising a movable substrate; an electroadhesive surface; and a fixed substrate, wherein the fixed substrate has an electrostatic potential that is different from an electrostatic potential of the movable substrate; wherein the electroadhesive surface shifts one or more times between a first electrostatic potential that is the same as the electrostatic potential of the movable substrate and a second electrostatic potential that is different than the electrostatic potential of the movable substrate; and wherein a velocity of the movable substrate is controlled by electroadhesion to the electroadhesive surface. Provided herein is a system comprising a movable substrate; an electroadhesive surface; and a fixed substrate, wherein the fixed substrate has an electrostatic potential that is different from an electrostatic potential of the movable substrate; wherein the electroadhesive surface shifts between electrostatic attraction to the movable substrate and electrostatic attraction to the fixed substrate; wherein the electroadhesive surface moves independently from the fixed substrate during the electrostatic attraction to the movable substrate; and wherein a velocity of the movable substrate is controlled by electroadhesion to the electroadhesive surface. In some embodiments, the velocity of the movable substrate is decreased intermittently. In some embodiments, the velocity is decreased by at least about 10%. In some embodiments, the velocity of the movable substrate is decreased by at least about 25%. In some embodiments, the velocity of the movable substrate is decreased by at least about 50%. In some embodiments, the velocity of the movable substrate is decreased by at least about 75%. In some embodiments, the velocity of the movable substrate is decreased by 100%. In some embodiments, the movable substrate is a planar movable substrate. In some embodiments, the movable substrate is a curved movable substrate. In some embodiments, the curved movable substrate is a brake roller. In some embodiments, the brake roller is a metallic brake roller. In some embodiments, the electrostatic potential of the movable substrate equals ground potential. In some embodiments, the system further comprises a ground brush. In some embodiments, the fixed substrate is a planar fixed substrate. In some embodiments, the fixed substrate is a curved fixed substrate. In some embodiments, the curved fixed substrate is a fixed bed. In some embodiments, the curved fixed substrate is a cupped brake housing. In some embodiments, a curve of the curved fixed substrate is the same as a curve of the curved movable substrate. In some embodiments, the fixed substrate further comprises molded material. In some embodiments, the fixed substrate further comprises electrostatic conductive regions. In some embodiments, the electroadhesive surface comprises ground potential or bipolar electrostatic potential. In some embodiments, the bipolar electrostatic potential comprises a region of positive polarity and a region of negative polarity. In some embodiments, a velocity of a moving object contacting the movable substrate is controlled by electroadhesion. In some embodiments, the velocity of the moving object is decreased by at least about 10%. In some embodiments, the velocity of the moving object is decreased by at least about 25%. In some embodiments, the velocity of the moving object is decreased by at least about 50%. In some embodiments, the velocity of the moving object is decreased by at least about 75%. In some embodiments, the velocity of the moving object is decreased by 100%. In some embodiments, the velocity of the moving object of about 100 feet per minute (ft/min) is decreased by 100% in about 5 inches. In some embodiments, the velocity of the moving object of about 200 ft/min is decreased by 100% in about 20 inches. In some embodiments, the velocity of the moving object of about 300 ft/min is decreased by 100% in about 44 inches. In some embodiments, the moving object is about 50 pounds (lbs). In some embodiments, the moving object is at least about 10 pounds (lbs). In some embodiments, the moving object is at least about 15 pounds (lbs). In some embodiments, the system is orientated to about a 7.5 degree angle relative to ground. In some embodiments, the system is orientated to about an 8 degree angle relative to ground. In some embodiments, the system is orientated to about an 8.5 degree angle relative to ground. In some embodiments, the system is orientated to about a 9 degree angle relative to ground. In some embodiments, the system further comprises a power supply. In some embodiments, the shifting is performed electronically. In some embodiments, the system is utilized as a roller brake. In some embodiments, the system is utilized as a braking system. In some embodiments, the system is retrofitted to a roller conveyor. In some embodiments, the system further comprises two or more movable substrates and two or more fixed substrates. In some embodiments, the two or more movable substrates is about 5 or more and the two or more fixed substrates is about 5 or more. In some embodiments, the two or more movable substrates is about 10 or more and the two or more fixed substrates is about 10 or more. In some embodiments, the two or more movable substrates is about 15 or more and the two or more fixed substrates is about 15 or more. In some embodiments, each of the two or more movable substrates self-reference to a single fixed substrate of the two of more fixed substrates. In some embodiments, the electroadhesive surface is weaved between the two or more movable substrates. In some embodiments, the system further comprises an electroadhesive curtain. In some embodiments, the electroadhesive curtain is attached above the movable substrate. In some embodiments, the electroadhesive curtain provides a braking force to the moving object by generating an electrostatic potential difference between the moving object and the electroadhesive curtain. In some embodiments, the electrostatic potential difference between the moving object and the electroadhesive curtain is generated on-demand. In some embodiments, the electrostatic potential difference between the moving object and the electroadhesive curtain is generated for a moving object above about 10 lbs. In some embodiments, the electrostatic potential difference between the moving object and the electroadhesive curtain is generated for a moving object above about 15 lbs. In some embodiments, the electrostatic potential difference between the moving object and the electroadhesive curtain is generated for a moving object above about 20 lbs. In some embodiments, the electroadhesive curtain is a same length as the moving object. In some embodiments, the electroadhesive curtain is a length longer than the moving object. In some embodiments, the electroadhesive curtain provides a braking force to the moving object by generating an electroadhesive force between the electroadhesive curtain and the movable substrate underneath the moving object. In some embodiments, a distance between the fixed substrate and the movable substrate is maintained. In some embodiments, a detachment of the electroadhesive surface from the movable substrate occurs when a third electrostatic potential of the electroadhesive surface equals ground potential. In some embodiments, a detachment of the electroadhesive surface from the movable substrate prevents friction between one or more movable substrates. In some embodiments, an individual movable substrate is referenced to an individual fixed substrate. In some embodiments, the electroadhesive surface contacts the fixed substrate when the moving object is below about 5 lbs. In some embodiments, the electroadhesive surface comprises a top electroadhesive film and a bottom electroadhesive film. In some embodiments, the top electroadhesive film comprises a top surface and a bottom surface, wherein the top surface contacts the movable substrate and the bottom surface contacts a brake wherein the contacting is alternated. In some embodiments, the bottom electroadhesive film comprises a bottom surface sealed to the fixed substrate and a top surface, wherein the top surface contacts the bottom surface of the top electroadhesive film. In some embodiments, the system further comprises a bearing. In some embodiments, the system further comprises a brake shoe. In some embodiments, an individual movable substrate is referenced to an individual fixed substrate and an individual brake shoe. In some embodiments, a bearing contacts the movable substrate by magnetic force. In some embodiments, a bearing contacts the movable substrate by spring-loaded force. In some embodiments, the system further comprises a sensor. In some embodiments, the sensor measures one or more features of the moving object comprising a weight of the moving object, a velocity of the moving object, or an acceleration of the moving object, or combinations thereof. In some embodiments, the one or more measurements determine whether to generate electrostatic potential differences between the movable substrate and the moving object. In some embodiments, the system is utilized in an automated environment. In some embodiments, the fixed substrate is originally substantially at rest and the velocity of the movable substrate is increased or decreased intermittently as needed. Provided herein is a kit for retrofitting a roller conveyor with a braking system comprising: one or more movable substrates, one or more fixed substrates, an electroadhesive surface, wherein each of the one or more movable substrates references a single fixed substrate from the one or more fixed substrates, and wherein a roller conveyor retrofitted with the system decreases a velocity of a moving object by at least about 10%. In some embodiments, the roller conveyor is between about 1 foot and about 30 feet (ft) in length. In some embodiments, the roller conveyor is at least about 5 ft in length. In some embodiments, the roller conveyor is at least about 10 ft in length. In some embodiments, the one or more movable substrates is between about 5 and 35 and the one or more fixed substrates is between about 5 and 35. In some embodiments, the roller conveyor is orientated to about an 8 degree angle relative to ground. In some embodiments, the braking system is mounted underneath the roller conveyor. In some embodiments, the velocity of the moving object is decreased by 100%. In some embodiments, the velocity of the moving object of about 100 feet per minute (ft/min) is decreased by 100% in about 5 inches. In some embodiments, the velocity of the moving object of about 200 ft/min is decreased by 100% in about 20 inches. In some embodiments, the velocity of the moving object of about 300 ft/min is decreased by 100% in about 44 inches. In some embodiments, the moving object is about 50 lbs. In some embodiments, the moving object is at least about 10 lbs. In some embodiments, the moving object is at least about 15 lbs. In some embodiments, the kit is utilized in an automated environment. Provided herein is a method for decreasing the velocity of a movable substrate, the method comprising: contacting an electroadhesive surface to the movable substrate by generating an electrostatic potential difference between the movable substrate and the electroadhesive surface; separating the electroadhesive surface from the movable substrate by attracting the electroadhesive surface towards a fixed substrate; and shifting between the contacting and the separating one or more times, wherein the velocity of the movable substrate is controlled by electroadhesion to the electroadhesive surface. Provided herein is a method of exerting force on two or more objects, the method comprising: generating an electrostatic potential difference between an electroadhesive surface and a first object, wherein the electrostatic potential difference exerts a first force to the first object; and changing the electrostatic potential difference to generate a second force on the first object and a first force on a second object, wherein the changing is repeated one or more times to exert two or more forces on two or more objects. In some embodiments, the force on two or more objects guides a movement trajectory of the two or more objects. In some embodiments, the method is utilized in an automated environment. In some embodiments, the first force is an attractive force. In some embodiments, the second force is an attractive force. In some embodiments, the first force is a repulsive force. In some embodiments, the second force is a repulsive force. In some embodiments, the voltage of activation is between about 100 Volts (V) and about 1000 V. In some embodiments, the voltage of activation is between about 500 V and about 3000 V. In some embodiments, the voltage of activation is between about 500 V and about 6000 V. Provided herein is a system comprising: a first substrate; a second substrate that is mechanically separate from the first substrate, an electroadhesive surface only partially attached to second substrate; wherein the first substrate has a first electrostatic potential that is different from a second electrostatic potential of the second substrate; wherein the electroadhesive surface shifts between electrostatic attraction to the first substrate and electrostatic attraction to the second substrate; wherein at least a portion of the electroadhesive surface moves independently from the first substrate during the electrostatic attraction to the second substrate; and wherein a velocity of the first substrate is controlled by electroadhesion to the electroadhesive surface and the velocity of the second substrate. In some embodiments, the first substrate is originally substantially at rest, and the velocity of the second substrate is increased or decreased intermittently. In some embodiments, the first substrate is substantially at rest, and the velocity of the second substrate is increased or decreased intermittently.

Provided herein is a system comprising an electroadhesive surface including one or more electrodes; and a controller configured to meter a flow of a plurality of objects by applying a voltage to the one or more electrodes when the plurality of objects is in contact with the electroadhesive surface. In some embodiments, a controller output is triggered by a sensor that detects one or more of: the presence of an object or a plurality of objects; a control system which informs the measured weight, size or other properties of the object; a rate of movement of the object or a second object; and an acceleration of movement of the object or the second object. In some embodiments, the system further comprises a processor configured to: receive object detection data from the sensor, and output electroadhesive surface instruction to the controller based on the detection data. In some embodiments, the processor comprises flow control instructions based on a second sensor, a flow plan, or a user input. Provided herein is a system comprising an electroadhesive surface including one or more electrodes; a processor comprising flow control instructions and electroadhesive surface instructions based on the flow control instructions; and a controller configured to meter the flow of a plurality of objects by applying a voltage to the one or more electrodes when a first object of the plurality of objects is in contact with the electroadhesive surface based on instruction from the processor. In some embodiments, the system further comprising a sensor configured to detect the presence of one or more objects; a rate of movement of the object; an acceleration of movement of the object, and output object detection data to the processor. Provided herein is a system comprising an electroadhesive surface including one or more electrodes; a sensor that detects the presence an object or a second object, a rate of movement of the object or the second object, or an acceleration of movement of the object or the second object; and a controller configured to decelerate the object by applying a voltage to a first electrode of the one or more electrodes when the object is in contact with the electroadhesive surface based on the sensor detection, wherein the object continues moving relative to the electroadhesive surface despite deceleration. In some embodiments, the system further comprises a processor configured to receive object detection data from the sensor, and output electroadhesive surface instruction to the controller based on the detection data.

In some embodiments, the processor comprises flow control instructions based on a second sensor, a flow plan, or a user input. Provided herein is a system comprising an electroadhesive surface including one or more electrodes; a controller configured to decelerate an object that is in contact with the electroadhesive surface by applying a voltage to a first electrode of the one or more electrodes based on an instruction from a processor that controls the flow of the object based on a sensor detection of the object. In some embodiments, the system further comprises a sensor configured to detect one or more of presence the object or of a second object, a rate of movement of the object or of a second object, or an acceleration of movement of the object, and output object detection data to the processor. In any one of the systems described above, the sensor comprises: an optical sensor, a weight sensor, a speed sensor, an acceleration sensor, a proximity sensor, a touch sensor, a laser sensor, a RFID sensor, an UV sensor, an Infrared sensor, or a radar sensor. In any one of the systems described above, the sensor determines: the presence of the object, the presence of the second object, the presence of stacked or layered objects, the number of objects in a stack, the size of the object, the shape of the object, the weight of the object, the speed of the object, or the acceleration or deceleration of the object, or the acceleration or deceleration of the second object. In any one of the systems described above, the electroadhesive surface is flexible. In any one of the systems described above, the electroadhesive surface has a low coefficient of friction when there is no voltage applied. In any one of the systems described above, the electroadhesive surface comprises: a pad, a curtain, a flap, a strip, chute, a slide, a roller, a carousel, a door, an arm, a partition, a step, a platform, a table, an undulating surface, a decline surface, or an incline surface. A conveyance system comprising a system comprising any one of the systems described above. Provided herein is a system comprising: a movable substrate; an electroadhesive surface; and a fixed substrate, wherein the fixed substrate has an electrostatic potential that is different from an electrostatic potential of the movable substrate; wherein the electroadhesive surface shifts between a same electrostatic potential as the movable substrate and a different electrostatic potential as the movable substrate; and wherein a velocity of the movable substrate is controlled by electroadhesion to the electroadhesive surface. Provided herein is a system comprising a movable substrate; an electroadhesive surface; and a fixed substrate, wherein the fixed substrate has an electrostatic potential that is different from an electrostatic potential of the movable substrate; wherein the electroadhesive surface shifts one or more times between a same electrostatic potential as the movable substrate and a different electrostatic potential as the movable substrate; and wherein a velocity of the movable substrate is controlled by electroadhesion to the electroadhesive surface. Provided herein is a system comprising a movable substrate; an electroadhesive surface; and a fixed substrate, wherein the fixed substrate has an electrostatic potential that is different from an electrostatic potential of the movable substrate; wherein the electroadhesive surface shifts between electrostatic attraction to the movable substrate and electrostatic attraction to the fixed substrate; wherein the electroadhesive surface moves independently from the fixed substrate during the electrostatic attraction to the movable substrate; and wherein a velocity of the movable substrate is controlled by electroadhesion to the electroadhesive surface. Any one of the three systems described immediately above wherein the second substrate is substantially at rest and the velocity of the first substrate is decreased intermittently. Any one of the three systems described immediately above wherein the velocity is decreased by at least about 10%. In some embodiments, the velocity of the movable substrate is decreased by at least 25%. In some embodiments, the velocity of the movable substrate is decreased by at least 50%. In some embodiments, the velocity of the movable substrate is decreased by at least 75%. In some embodiments, the velocity of the movable substrate is decreased by 100%. Any one of the three systems described immediately above wherein the movable substrate is a planar movable substrate. Any one of the three systems described immediately above wherein the movable substrate is a curved movable substrate. In some embodiments wherein the curved movable substrate is a brake roller. In some embodiments, wherein the brake roller is a metallic brake roller. Any one of the three systems described immediately above wherein the movable substrate maintains an electrostatic potential equal to ground potential. In some embodiments further comprising a ground brush. Any one of the three systems described immediately above wherein the fixed substrate is a planar fixed substrate. Any one of the three systems described immediately above wherein the fixed substrate is a curved fixed substrate. In some embodiments, the curved fixed substrate is a fixed bed. In some embodiments, the curved fixed substrate is a cupped brake housing. In some embodiments, a curve of the curved fixed substrate is the same as a curve of the curved movable substrate. Any one of the three systems described immediately above wherein the fixed substrate further comprises molded material. Any one of the three systems described immediately above wherein the fixed substrate further comprises electrostatic conductive regions. Any one of the three systems described immediately above wherein the electroadhesive surface comprises ground potential or bipolar electrostatic potential. In some embodiments, wherein the bipolar electrostatic potential comprises a region of positive polarity and a region of negative polarity. Any one of the three systems described immediately above wherein a velocity of a moving object contacting the movable substrate is controlled by electroadhesion. In some embodiments, the velocity of the moving object is decreased by at least about 10%, In some embodiments, the velocity of the moving object is decreased by at least about 25%. In some embodiments, the velocity of the moving object is decreased by at least about 50%. In some embodiments, the velocity of the moving object is decreased by at least about 75%. In some embodiments the velocity of the moving object is decreased by 100%. Any one of the three systems described immediately above wherein the velocity of the moving object is decreased by at least about 10%, by at least 25%, by at least 50%, by at least 75% or by 100% and wherein the moving object is between about 10 pounds (lbs) and about 50 pounds (lbs). Any one of the three systems described immediately above wherein the system is orientated to between about a 7.5 degree angle and about a 9 degree angle relative to ground. Any one of the three systems described immediately above wherein the system further comprises a power supply. In some embodiments the shifting is performed electronically. Any one of the three systems described immediately above wherein the system is utilized as a roller brake. Any one of the three systems described immediately above wherein the system is utilized as a braking system. Any one of the three systems described immediately above wherein the system is retrofitted to a roller conveyor. Any one of the three systems described immediately above wherein the system further comprises two or more movable substrates and two or more fixed substrates. Any one of the three systems described immediately above wherein the two or more movable substrates is about 5 or more and the two or more fixed substrates is about 5 or more. In some embodiments, each of the two or more movable substrates self-reference to a single fixed substrate of the two of more fixed substrates. In some embodiments, the electroadhesive surface is weaved between the two or more movable substrates. In some embodiments, the system further comprises an electroadhesive curtain. In some embodiments, the electroadhesive curtain is attached above the movable substrate. In some embodiments, the electroadhesive curtain provides a braking force to the moving object by generating an electrostatic potential difference between the moving object and the electroadhesive curtain. In some embodiments described immediately above wherein the electrostatic potential difference between the moving object and the electroadhesive curtain is generated on-demand. In some embodiments, the electroadhesive curtain is a same length as the moving object. In some embodiments, the electroadhesive curtain is a length longer than the moving object. In some embodiments, the electroadhesive curtain provides a braking force to the moving object by generating an electroadhesive force between the electroadhesive curtain and the movable substrate underneath the moving object. Any one of the three systems described immediately above wherein a distance between the fixed substrate and the movable substrate is maintained. In some embodiments, a detachment of the electroadhesive surface from the movable substrate occurs when the electrostatic potential of the electroadhesive surface is equivalent to ground potential. In some embodiments, a detachment of the electroadhesive surface from the movable substrate prevents friction between one or more movable substrates. Any one of the three systems described immediately above wherein an individual movable substrate is referenced to an individual fixed substrate. Any one of the three systems described immediately above wherein the electroadhesive surface comprises a top electroadhesive film and a bottom electroadhesive film. In some embodiments, the top electroadhesive film comprises a top surface and a bottom surface, wherein the top surface contacts the movable substrate and the bottom surface contacts a brake wherein the contacting is alternated. In some embodiments, the bottom electroadhesive film comprises a bottom surface sealed to the fixed substrate and a top surface, wherein the top surface contacts the bottom surface of the top electroadhesive film. Any one of the three systems described immediately above wherein the system further comprises a bearing. In some embodiments the system further comprises a brake shoe. In some embodiments an individual movable substrate is referenced to an individual fixed substrate and an individual brake shoe. In some embodiments, a bearing contacts the movable substrate by magnetic force. In some embodiments a bearing contacts the movable substrate by spring-loaded force. Any one of the three systems described immediately above wherein the system further comprises an optical sensor. In some embodiments, the optical sensor measures one or more features of the moving object comprising a weight of the moving object, a velocity of the moving object, or an acceleration of the moving object, or combinations thereof. Any one of the three systems described immediately above wherein one or more measurements determine whether to generate electrostatic potential differences between the movable substrate and the moving object.

Any one of the three systems described immediately above wherein the system is utilized in an automated environment. Provided herein is a kit for retrofitting a conveyor belt with a braking system comprising: a roller conveyor, one or more movable substrates, one or more fixed substrates, an electroadhesive surface, wherein each of the one or more movable substrates references a single fixed substrate from the one or more fixed substrates, and wherein the conveyor belt retrofitted with the braking system decreases a velocity of a moving object by at least about 10%, by at least about 25%, by at least about 50%, by at least about 75% or by 100%. In some embodiments, the braking system portion of the roller conveyor is at least about 5 ft long. In some embodiments, the braking system portion of the roller conveyor is between about 1.0 ft long and about 15 ft long. In some embodiments, the one or more movable substrates is between about 5 and 35 movable substrates and the one or more fixed substrates is between about 5 and 35 fixed substrates. In some embodiments, the roller conveyor is orientated between about a 7.5 degree angle and about a 9 degree angle relative to ground. In some embodiments, the braking system is mounted underneath the conveyor belt. In some embodiments, the moving object is between about 10 pounds (lbs) and about 50 pounds (lbs). In some embodiments, the kit is utilized in an automated environment. In some embodiments, the kit is utilized in a manually operable fashion. Provided herein is a system comprising a first substrate; a second substrate that is mechanically separate from the first substrate, an electroadhesive surface only partially attached to second substrate; wherein the first substrate has an electrostatic potential that is different from an electrostatic potential of the second substrate; wherein the electroadhesive surface shifts between electrostatic attraction to the first substrate and electrostatic attraction to the second substrate; wherein at least a portion of the electroadhesive surface moves independently from the first substrate during the electrostatic attraction to the second substrate; and wherein a velocity of the first substrate is controlled by electroadhesion to the electroadhesive surface and the velocity of the second substrate. In some embodiments, the first substrate is originally substantially at rest, and the velocity of the second substrate is increased or decreased intermittently.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 26C is an illustrative view of the electroadhesive surface.

FIG. 28 is a table that illustrates moving object dimensions, weight, and normalized percentages.

DETAILED DESCRIPTION OF THE INVENTION

Figure 1A:
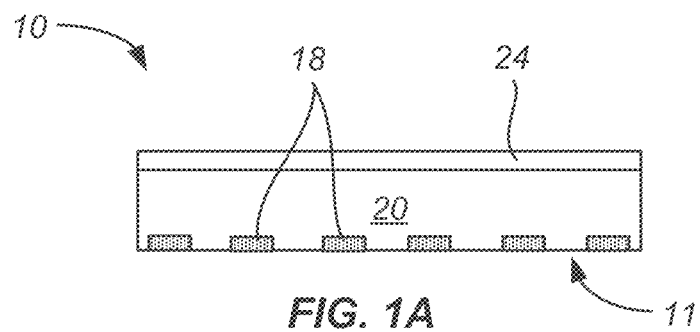
FIG. 1A is a side cross-section of an example electroadhesive device.

The present invention provides a novel electroadhesive gripping system used in manufacturing or material handling for braking, capturing or metering moving objects as they proceed through a material handling process. The system comprises an electroadhesive film surface with one or more electrodes at or near the electroadhesive gripping surface, a power supply, a controller, a sensor and a processor, wherein the system interprets material handling information based on various parameters detected in a material handling process and apply the use of electroadhesive surfaces to appropriately meter the flow of objects; slow, stop or brake the flow of objects. In some cases, the sensor and/or the processor is replaced by human judgment and human actions through pressing a button, a foot pedal etc.

Provided herein is a system that utilizes electroadhesive surfaces for braking and metering objects in an automated environment. An electroadhesive surface includes electrodes that are configured to induce an electrostatic attraction with nearby objects upon application of voltage to the electrodes. The systems described utilize various configurations of electroadhesive surfaces, sensors, controllers and programmable processors to create smart braking, capturing and metering systems for improved automated material handling.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments are utilized, and other changes are made, without departing from the scope of the subject matter presented herein. It will be readily understood that the aspects of the present disclosure, as generally described herein, and illustrated in the figures, are arranged, substituted, combined, separated, and designed in a wide variety of different configurations, all of which are explicitly contemplated herein.

As illustrated in US 2013/0294875, herein incorporated by reference in its entirety, an electroadhesive surface includes electrodes that are configured to induce an electrostatic attraction with nearby objects upon application of voltage to the electrodes. As the term is used herein, "electro-adhesion" refers to the mechanical coupling of two objects using electrostatic forces. Electro-adhesion as described herein uses electrical control of these electrostatic forces to permit temporary and detachable attachment between a foreign substrate and a surface of an electro-adhesion-enabled surface. This electrostatic adhesion creates an attraction between the foreign substrate and the surface together or increases the traction or friction between the foreign substrate and the surface due to electrostatic forces created by an applied electric field. The surface is placed against or nearby a surface of a foreign substrate. An electrostatic adhesion voltage is then applied via electrodes using external control electronics in electrical communication with the electrodes. The electrostatic adhesion voltage uses alternating positive and negative charges on neighboring electrodes. As a result of the voltage difference between electrodes, one or more electro-adhesive forces are generated, which electro-adhesive forces act adhere the surface and the foreign substrate against one another, or increases the traction or friction between the foreign substrate and the surface. Due to the nature of the forces being applied, it will be readily appreciated that actual contact between the electroadhesion surface and the foreign substrate is not necessary. For example, a piece of paper, thin film, or other material or substrate is placed between the electroadhesion surface and the foreign substrate. The electrostatic force maintains the current position of the electroadhesion surface relative to the surface of the foreign substrate. The overall electrostatic force is sufficient to overcome the inertial pull on the foreign substrate, such that electroadhesion surface is used to stop the foreign substrate along the path.

Removal of the electrostatic adhesion voltages from the electrodes ceases the electrostatic adhesion force between the electroadhesion surface and the surface of the foreign substrate. Thus, when there is no electrostatic adhesion voltage between electrodes, the electroadhesion surface moves readily relative to the surface of the foreign substrate. This condition allows the electroadhesion surface to move before and after an electrostatic adhesion voltage is applied. Well controlled electrical activation and de-activation enables fast adhesion and detachment, such as response times less than about 50 milliseconds, for example, while consuming relatively small amounts of power.

As the term is used herein, "surface", "electroadhesion surface", "gripper surface", "blanket", "flap", "pad", "curtain" and variations thereof are intended to be synonymous, and refer to the electroadhesion film surface of the electroadhesion gripping system.

As used herein, "about" when used in reference to a velocity of the moving object or movable substrate means variation of 1%-5%, of 5%-10%, of 10%-20%, and/or of 10%-50% (as a percent of the percentage of the velocity, or as a variation of the percentage of the velocity). For example, if the percentage of the velocity is "about 20%", the percentage varies 5%-10% as a percent of the percentage i.e. from 19% to 21% or from 18% to 22%; alternatively the percentage varies 5%-10% as an absolute variation of the percentage i.e. from 15% to 25% or from 10% to 30%.

The term "about" when used with respect to a weight of a moving object, degree angle, or force per unit area means variations of any of: up to 5%, up to 10%, up to 15%, up to 20%, up to 25%, and up to 30%. For example, if the weight of a moving object is "about 120 lbs," this includes variations of up to 5%, i.e. 114 to 126 lbs, variations of up to 10%, i.e. 108 to 132 lbs, variations of up to 15%, i.e. 102 to 138 lbs, variations of up to 20%, i.e. 96 to 144 lbs, variations of up to 25%, i.e. 90 to 150 lbs, or variations of up to 30%, i.e. 84 to 156 lbs.

As used herein, and unless otherwise specified, the term "about" means an acceptable error for a particular value as determined by one of ordinary skill in the art, which depends in part on how the value is measured or determined. In certain embodiments, the term "about" means within 1, 2, 3, or 4 standard deviations. In certain embodiments, the term "about" means within 30%, 25%, 20%, 15%, 10%, 9%, 8%, 7%, 6%, 5%, 4%, 3%, 2%, 1%, 0.5%, 0.1%, or 0.05% of a given value or range.

In an exemplary aspect, the electroadhesion surface of the system includes electrodes on an outside surface of an insulating material, or at or near the electroadhesion gripping surface of the electroadhesion film. This aspect is well suited for controlled attachment to insulating and weakly conductive inner materials of various foreign substrates.

In other exemplary aspects, the electrodes are embedded within an insulating material so as to provide insulation both between the electrodes, and between the electrodes and the foreign substrate. The insulating material furthers comprise multiple separate layers of insulation, each providing different properties that are beneficial to the overall application.

As will be readily appreciated, a shorter distance between the electroadhesion surface and the surface of a foreign substrate results in a stronger electro-adhesive force between the objects. Accordingly, a deformable surface adapted to at least partially conform to the surface of the foreign substrate is used.

As the term is used herein, an electrostatic adhesion voltage refers to a voltage that produces a suitable electrostatic force to couple the electroadhesion surface to a foreign substrate. The minimum voltage needed for the electroadhesion surface will vary with a number of factors, such as: the size of the surface, the material conductivity and spacing of electrodes, the insulating material, the foreign substrate material, the presence of any disturbances to electro-adhesion such as dust, other particulates or moisture, the weight of any substrates coming in contact with the electro-adhesive force, compliance of the electro-adhesive device, the dielectric and resistivity properties of the foreign substrate, and the relevant gaps between electrodes and the foreign substrate surface.

In some aspects, an electro-adhesive surface takes the form of a substantially planar panel or sheet having a plurality of electrodes thereon. In other aspects, the electro-adhesive surface takes a fixed shape that is matched to the geometry of the foreign substrate most commonly carried, comes in contact with or handled by the electroadhesion surface. In other aspects, the electro-adhesive surface is a hanging curtain comprising one or multiple sections to drape an area and easily slow an object in the path, yet not substantially hinder movement of the object when the electroadhesive surface is inactive. The electrodes are enhanced by various means, such as by being patterned on an adhesive device surface to improve electro-adhesive performance, or by making them using soft or flexible materials to increase compliance and thus conformance to irregular surfaces on foreign substrates.

As the terms are used herein, deformable and conformable are intended to be interpreted synonymously; meaning: corresponding in form, compliant, ability to adapt; capable of being reshaped. And conversely, it is implied and directly suggested that these terms also mean the ability to return to their original shape, with in the elastic limits of the material.

Turning first to FIG. 1A, an example electroadhesive device is illustrated in elevated cross-sectional view. Electroadhesive device 10 includes one or more electrodes 18 located at or near an "electroadhesive gripping surface" 11 thereof, as well as an insulating material 20 between electrodes and a backing 24 or other supporting structural component. In many cases, the insulating material 20 extends outward from the electrode and be present between the electrodes and the foreign substrate. In some cases, the insulator 20 comprises several different layers of insulators. For purposes of illustration, electroadhesive device 10 is shown as having six electrodes in three pairs, although it will be readily appreciated that more or fewer electrodes are used in a given electroadhesive device. Where only a single electrode is used in a given electroadhesive device, a complimentary electroadhesive device having at least one electrode of the opposite polarity is preferably used therewith. With respect to size, electroadhesive device 10 is substantially scale invariant. That is, electroadhesive device sizes range from less than 1 square centimeter to greater than several meters in surface area. Even larger and smaller surface areas are also possible, and are sized to the needs of a given application.

Figure 1B:
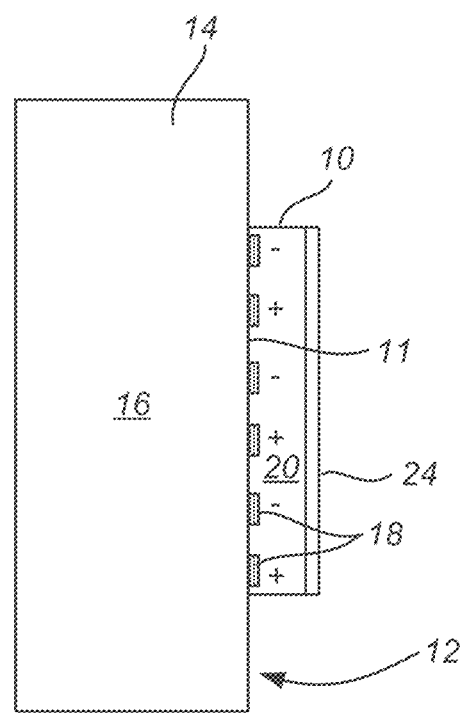
FIG. 1B illustrates in side cross-sectional view the example electroadhesive device of FIG. 1A attracted to a foreign object.

FIG. 1B depicts in elevated cross-sectional view of the example electroadhesive device 10 of FIG. 1A adhered to a foreign object 14. Foreign object 14 includes surface 12 and inner material 16. Electroadhesive gripping surface 11 of electroadhesive device 10 is placed against or nearby surface 12 of foreign object 14. An electrostatic adhesion voltage is then applied via electrodes 18 using external control electronics (not shown) in electrical communication with the electrodes 18. As shown in FIG. 1B, the electrostatic adhesion voltage uses alternating positive and negative charges on neighboring electrodes 18. As a result of the voltage difference between electrodes 18, one or more electroadhesive forces are generated, which electroadhesive forces act to hold the electroadhesive device 10 and foreign object 14 to each other. Due to the nature of the forces being applied, it will be readily appreciated that actual contact between electroadhesive device 10 and foreign object 14 is not necessary. Rather sufficient proximity to allow the electric field based electroadhesive interaction to take place is all that is necessary. For example, a piece of paper, thin film, or other material or substrate is placed between electroadhesive device 10 and foreign object 14. Furthermore, although the term "contact" is used herein to denote the interaction between an electroadhesive device and a foreign object, it will be understood that actual direct surface to surface contact is not always required, such that one or more thin objects such as an insulator, are disposed between an device or electroadhesive gripping surface and the foreign object. In some embodiments such an insulator between the gripping surface and foreign object is a part of the device, while in others it is a separate item or device.

Additionally or alternatively, there is a gap between the electroadhesive gripping surface and the object being gripped and this gap is decreased upon activation of the electroadhesive force. For example, the electroadhesive force causes the electroadhesive gripping surface to move closer to the exterior surface of the object being gripped so as to close the gap. Moreover, the electroadhesive attraction causes the gripping surface to move toward the exterior surface of the object being gripped at multiple points across the surface area of the gripping surface. For example, the compliant gripping surface conforms to the exterior surface microscopically, mesoscopically, and/or macroscopically. Such local gap-closing by the gripping surface causes the gripping surface to (at least partially) conform to the exterior surface of the object. Electroadhesive gripping surfaces with sufficient flexibility to conform to local non-uniformities, surface imperfections and other micro-variations and/or macro-variations in exterior surfaces of objects are referred to herein as compliant gripping surfaces. However, it is understood that any of the gripping surfaces described herein exhibits such compliance whether specifically referred to as compliant gripping surfaces or not.

Figure 1C:
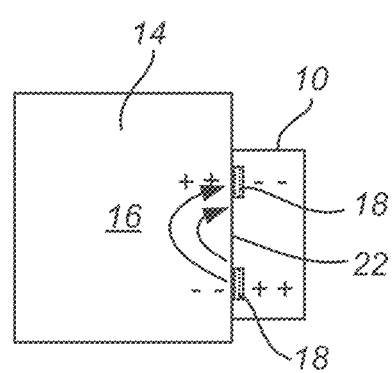
FIG. 1C illustrates in side cross-sectional close-up view an electric field formed in the foreign object of FIG. 1B as result of the voltage difference between electrodes in the attracted example electroadhesive device.

FIG. 1C illustrates in elevated cross-sectional close-up view an electric field formed in the foreign object of FIG. 1B as a result of the voltage difference between electrodes in the adhered example electroadhesive device 10. While the electroadhesive device 10 is placed against foreign object 14 and an electrostatic adhesion voltage is applied, an electric field 22 forms in the inner material 16 of the foreign object 14. The electric field 22 locally polarizes inner material 16 or induces direct changes on material 16 locally opposite to the charge on the electrodes of the device 18 and thus causes electrostatic adhesion between the electrodes 18 (and device 10) and the induced charges on the foreign object 14. The induced charges are the result of a dielectric polarization or from weakly conductive materials and electrostatic induction of charge. In the event that the inner material 16 is a strong conductor, such as copper for example, the induced charges completely cancel the electric field 22. In this case the internal electric field 22 is zero, but the induced charges nonetheless still form and provide electrostatic force to the electroadhesive device.

Thus, the electrostatic adhesion voltage provides an overall electrostatic force, between the electroadhesive device 10 and inner material 16 beneath surface 12 of foreign object 14, which electrostatic force maintains the current position of the electroadhesive device relative to the surface of the foreign object. The overall electrostatic force is sufficient to overcome the gravitational pull on the foreign object 14, such that the electroadhesive device 10 is used to hold the foreign object aloft. In various embodiments, a plurality of electroadhesive devices are placed against foreign object 14, such that additional electrostatic forces against the object are provided. The combination of electrostatic forces is sufficient to lift, move, pick and place, or otherwise handle the foreign object. Electroadhesive device 10 is also attached to other structures and holds these additional structures aloft, or it is used on sloped or slippery surfaces to increase normal or lateral friction forces.

Removal of the electrostatic adhesion voltages from electrodes 18 ceases the electrostatic adhesion force between electroadhesive device 10 and the surface 12 of foreign object 14. Thus, when there is no electrostatic adhesion voltage between electrodes 18, electroadhesive device 10 moves more readily relative to surface 12. This condition allows the electroadhesive device 10 to move before and after an electrostatic adhesion voltage is applied. Well controlled electrical activation and de-activation enables fast adhesion and detachment, such as response times less than about 50 milliseconds, for example, while consuming relatively small amounts of power.

Electroadhesive device 10 includes electrodes 18 on an outside surface 11 of an insulating material 20. This embodiment is well suited for controlled attachment to insulating and weakly conductive inner materials 16 of various foreign objects 14. Other electroadhesive device 10 relationships between electrodes 18 and insulating materials 20 are also contemplated and suitable for use with a broader range of materials, including conductive materials. For example, a thin electrically insulating material (not shown) is located on the surfaces of the electrodes. Multiple insulating surfaces area used in certain cases, (such as illustrated by layer 49 in FIG. 3C), and the material on either side of the electrodes is different from each other. As will be readily, appreciated, a shorter distance between surfaces 11 and 12 as well as the material properties of such an electrically insulating material results in a stronger electroadhesive attraction between the objects due to the distance dependence of the field-based induced electroadhesive forces. Accordingly, a deformable surface 11 adapted to at least partially conform to the surface 12 of the foreign object 14 is used.

As the term is used herein, an electrostatic adhesion voltage refers to a voltage that produces a suitable electrostatic force to couple electroadhesive device 10 to a foreign object 14. The minimum voltage needed for electroadhesive device 10 will vary with a number of factors, such as: the size of electroadhesive device 10, the material conductivity and spacing of electrodes 18, the insulating material 20, the foreign object material 16, the presence of any disturbances to electroadhesion such as dust, other particulates or moisture, the weight of any objects being supported by the electroadhesive force, compliance of the electroadhesive device, the dielectric and resistivity properties of the foreign object, and/or the relevant gaps between electrodes and foreign object surface. In one embodiment, the electrostatic adhesion voltage includes a differential voltage between the electrodes 18 that is between about 500 volts and about 15 kilovolts. Even lower voltages are used in micro applications. In one embodiment, the differential voltage is between about 2 kilovolts and about 5 kilovolts. Voltage for one electrode is zero. Alternating positive and negative charges is also applied to adjacent electrodes 18. The voltage on a single electrode is varied in time, and in particular is alternated between positive and negative charge so as to not develop substantial long-term charging of the foreign object. The resultant clamping forces will vary with the specifics of a particular electroadhesive device 10, the material it adheres to, any particulate disturbances, surface roughness, and so forth. In general, electroadhesion as described herein provides a wide range of clamping pressures, generally defined as the attractive force applied by the electroadhesive device divided by the area thereof in contact with the foreign object.

The actual electroadhesion forces and pressure will vary with design and a number of factors. In one embodiment, electroadhesive device 10 provides electroadhesive attraction pressures between about 0.7 kPa (about 0.1 psi) and about 70 kPa (about 10 psi), although other amounts and ranges are certainly possible. The amount of force needed for a particular application is readily achieved by varying the area of the contacting surfaces, varying the applied voltage, and/or varying the distance between the electrodes and foreign object surface, although other relevant factors are also manipulated as desired.

Because an electrostatic adhesion force is the primary force used to hold, slow, retard, impede, brake, meter, restrict movement, or otherwise manipulate a foreign object, rather than a traditional mechanical or "crushing" force, the electroadhesive device 10 is used in a broader set of applications. For example, electroadhesive device 10 is well suited for use with rough surfaces, or surfaces with macroscopic curvature or complex shape. In one embodiment, surface 12 includes roughness greater than about 100 microns. In a specific embodiment, surface 12 includes roughness greater than about 3 millimeters. In addition, electroadhesive device 10 is used on objects that are dusty or dirty, as well as objects that are fragile. Objects of varying sizes and shapes are also handled by one or more electroadhesive devices, as set forth in greater detail below.

Although electroadhesive device 10 having electroadhesive gripping surface 11 of FIG. 1A is shown as having six electrodes 18, it will be understood that a given electroadhesive device or gripping surface has just a single electrode. Furthermore, it will be readily appreciated that a given electroadhesive device has a plurality of different electroadhesive gripping surfaces, with each separate electroadhesive gripping surface having at least one electrode and being adapted to be placed against or in close proximity to the foreign object to be gripped. Although the terms electroadhesive device, electroadhesive gripping unit and electroadhesive gripping surface are all used herein to designate electroadhesive components of interest, it will be understood that these various terms can be used interchangeably in various contexts. In particular, while a given electroadhesive device might comprise numerous distinct gripping surfaces; these different gripping surfaces might also be considered separate "devices" or alternatively "end effectors" themselves. Embodiments with multiple different gripping surfaces are considered as one single device or are also considered as numerous different devices acting in concert.

Figure 2A:
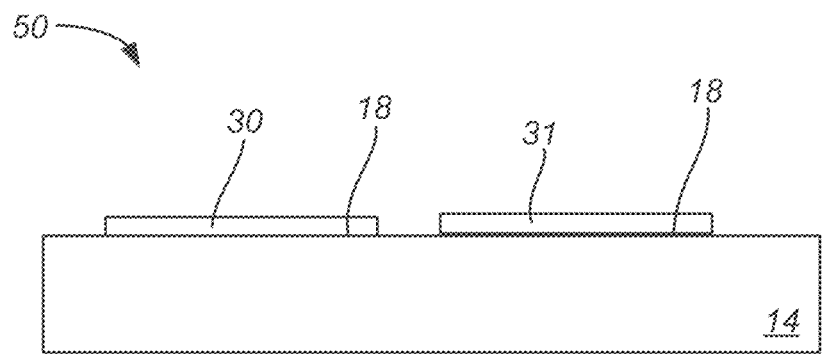
FIG. 2A illustrates in side cross-sectional view an example pair of electroadhesive gripping surfaces having single electrodes thereon.
Figure 2B:
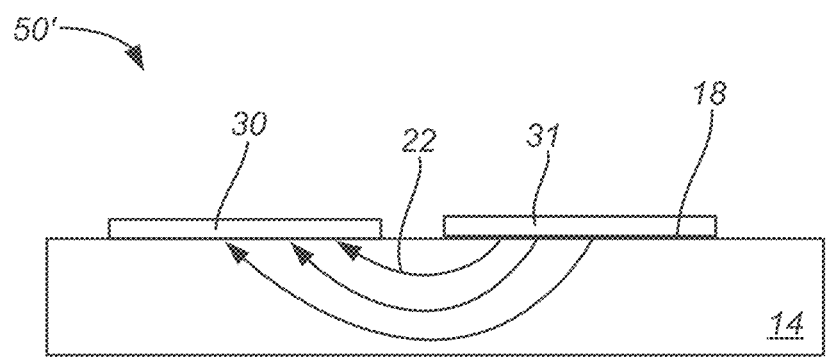
FIG. 2B illustrates in side cross-sectional view the example pair of electroadhesive gripping surfaces of FIG. 2A with voltage applied thereto.

Referring to FIGS. 2A and 2B, an example pair of electroadhesive devices or gripping surfaces having single electrodes thereon is shown in side cross-sectional view. FIG. 2A depicts electroadhesive gripping system 50 having electroadhesive devices or gripping surfaces 30, 31 that are in contact with the surface of a foreign object 14, while FIG. 2B depicts activated electroadhesive gripping system 50' with the devices or gripping surfaces having voltage applied thereto. Electroadhesive gripping system 50 includes two electroadhesive devices or gripping surfaces 30, 31 that directly contact the foreign object 14. Each electroadhesive device or gripping surface 30, 31 has a single electrode 18 coupled thereto. In such cases, the electroadhesive gripping system is designed to use the foreign object as an insulation material. When voltage is applied, an electric field 22 forms within foreign object 14, and an electrostatic force between the gripping surfaces 30, 31 and the foreign object is created.

Various embodiments that include numerous of these single electrode electroadhesive devices are used, as will be readily appreciated.

In some embodiments, an electroadhesive gripping surface takes the form of a flat panel or sheet having a plurality of electrodes thereon. In other embodiments, the gripping surface takes a fixed shape that is matched to the geometry of the foreign object most commonly lifted or handled. For example, a curved geometry is used to match the geometry of a cylindrical paint can or soda can. The electrodes are enhanced by various means, such as by being patterned on an adhesive device surface to improve electroadhesive performance, or by making them using soft or flexible materials to increase compliance and thus conformance to irregular surfaces on foreign objects.

Figure 3A:
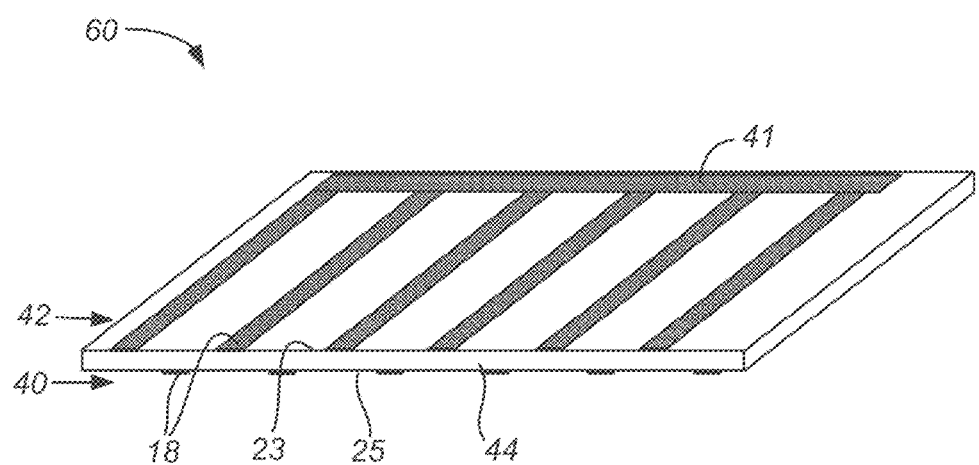
FIG. 3A illustrates in top perspective view an example electroadhesive gripping surface in the form of a sheet with electrodes pattered on top and bottom surfaces thereof.
Figure 3B:
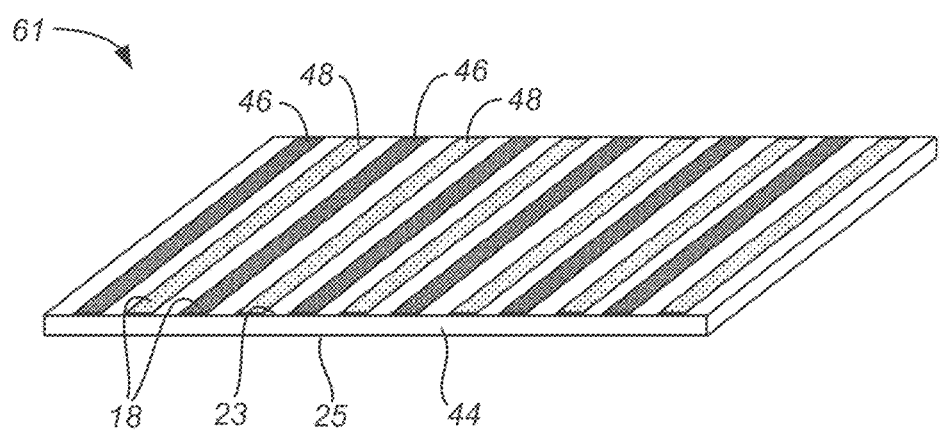
FIG. 3B illustrates in top perspective view another example electroadhesive gripping surface in the form of a sheet with electrodes patterned on the top and bottom surfaces thereof.
Figure 3C:
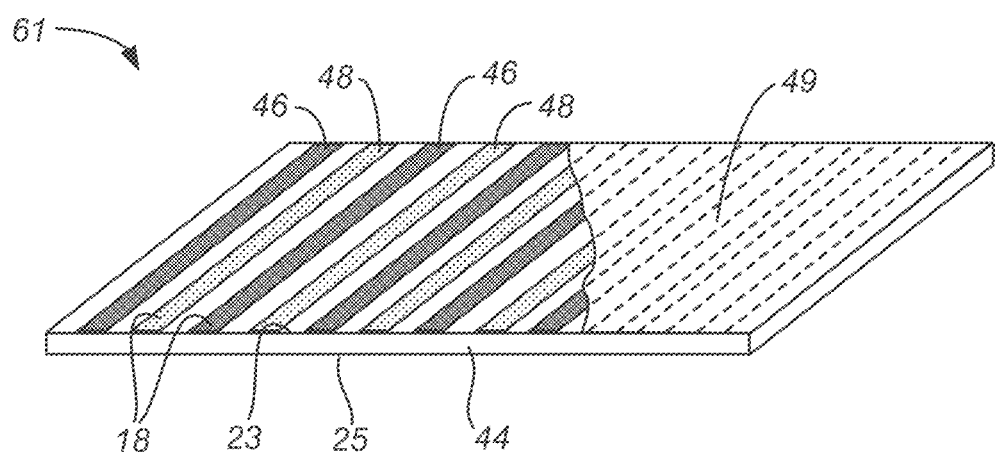
FIG. 3C illustrates in top perspective view another example electroadhesive gripping surface in the form of a sheet with electrodes patterned on the top and bottom surfaces thereof and also comprising an additional insulating layer to protect the electrodes.

Turning next to FIGS. 3A-3C, two examples of electroadhesive gripping surfaces in the form of flat panels or sheets with electrodes patterned on surfaces thereof are shown in top perspective view. FIG. 3A shows electroadhesive gripping surface 60 in the form of a sheet or flat panel with electrodes 18 patterned on top and bottom surfaces thereof. Top and bottom electrodes sets 40 and 42 are interdigitated on opposite sides of an insulating layer 44. In some cases, insulating layer 44 is formed of a stiff or rigid material. In some cases, the electrodes as well as the insulating layer 44 is compliant and composed of a polymer, such as an acrylic elastomer, to increase compliance. In one preferred embodiment the modulus of the polymer is below about 10 MPa and in another preferred embodiment it is more specifically below about 1 MPa. Various known types of compliant electrodes are suitable for use with the devices and techniques described herein, and examples are described in U.S. Pat. No. 7,034,432, which is incorporated by reference herein in its entirety and for all purposes.

Electrode set 42 is disposed on a top surface 23 of insulating layer 44, and includes an array of linear patterned electrodes 18, (and also include an additional outer insulating layer 49, as illustrated in FIG. 3C). A common electrode 41 electrically couples electrodes 18 in set 42 and permits electrical communication with all the electrodes 18 in set 42 using a single input lead to common electrode 41. Electrode set 40 is disposed on a bottom surface 25 of insulating layer 44, and includes a second array of linear patterned electrodes 18 that is laterally displaced from electrodes 18 on the top surface. Bottom electrode set 40 also includes a common electrode (not shown). Electrodes are patterned on opposite sides of an insulating layer 44 to increase the ability of the gripping surface 60 to withstand higher voltage differences without being limited by breakdown in the air gap between the electrodes, as will be readily appreciated.

Alternatively, electrodes are also patterned on the same surface of the insulating layer, such as that which is shown in FIG. 3B. As shown, electroadhesive gripping surface 61 comprises a sheet or flat panel with electrodes 18 patterned only on one surface thereof. Electroadhesive gripping surface 61 is substantially similar to electroadhesive gripping surface 60 of FIG. 3A, except that electrodes sets 46 and 48 are interdigitated on the same surface 23 of a compliant insulating layer 44. No electrodes are located on the bottom surface 25 of insulating layer 44. This particular embodiment decreases the distance between the positive electrodes 18 in set 46 and negative electrodes 18 in set 48, and allows the placement of both sets of electrodes on the same surface of electroadhesive gripping surface 61. Functionally, this eliminates the spacing between the electrodes sets 46 and 48 due to insulating layer 44, as in embodiment 60. It also eliminates the gap between one set of electrodes (previously on bottom surface 25) and the foreign object surface when the top surface 23 adheres to the foreign object surface. In some cases, the top (electrode) surface 23 is further coated with an insulating material (as depicted by layer 49, and illustrated in FIG. 3C), so that the electrode sets 46 and 48 are completely sandwiched (e.g., encapsulated) between insulating materials. Although either embodiment 60 or 61 can be used, these changes in the latter embodiment 61 provide relatively greater electroadhesive forces between electroadhesive gripping surface 61 and the subject foreign object to be handled due to the closer proximity of both sets of electrodes 46, 48 to the foreign object surface.

In some embodiments, an electroadhesive device or gripping surface comprises a sheet or veil type grasper that is substantially flexible in nature. In such embodiments, either no backing structure or a substantially flexible backing structure is used, such that all or a portion of the veil type device or gripping surface is substantially flex or otherwise conform to a foreign object or objects, as is desired for a given application. Creating electroadhesive grippers that facilitate such conforming or compliance to a foreign object is achieved, for example, by forming the electroadhesive layer or gripping surface out of thin materials, by using foam or elastic materials, by butting out flaps or extensions from a primary electroadhesive sheet, or by connecting the sheet only at a few selected underlying locations, rather than to an entire rigid backing, among other possibilities.

Provided herein is a system comprising an electroadhesive surface including one or more electrodes; a sensor that detects one or more of the presence of a first object or a plurality of objects, a rate of movement of the first object or a second object, or an acceleration of movement of the first object or the second object; and a controller configured to meter the flow of the plurality of objects by applying a voltage to the one or more electrodes when the first object is in contact with the electroadhesive surface based on the sensor detection.

In some embodiments, the system further comprises a processor configured to receive object detection data from the sensor, and output electroadhesive surface instruction to the controller based on the detection data.

In some embodiments of the system the processor comprises flow control instructions based on a second sensor, a flow plan, or a user input.

Provided herein is a system comprising: an electroadhesive surface including one or more electrodes; a processor comprising flow control instructions and electroadhesive surface instructions based on the flow control instructions; a controller configured to meter the flow of a plurality of objects by applying a voltage to a first electrode of the one or more electrodes when a first object of the plurality of objects is in contact with the electroadhesive surface based on an electroadhesive surface instruction from the processor.

In some embodiments, the system further comprises a sensor configured to detect the presence of one or more objects, a rate of movement of the object, or an acceleration of movement of the object, or a barcode or other identification method which is used to query a database of weights and size which then, in turn is used to predict the rate of movement or acceleration of the first object or the second object and output object detection data to the processor.

In some embodiments, the sensing does not come from an automated system but from a human being judging the speed or acceleration and the damage potential of each box through visual cues or external sensor. The human then engages a manual mechanism such as a switch, foot pedal, voice or other means to command the brake to arrest or slow down the flow.

In some embodiments, an electroadhesive gripping surface takes the form of a flat panel or sheet having a plurality of electrodes thereon. In other aspects, the electro-adhesive surface is a hanging curtain comprising one or multiple sections to drape an area and easily slow an object in the path, yet not substantially hinder movement of the object when the electroadhesive surface is inactive. In other aspects, the electro-adhesive surface is a door, an arm, a flap, or moveable partition comprising one or more electrodes to obstruct an area and easily slow an object in the path, yet not substantially hinder movement of the object when the electroadhesive surface is inactive. The door, arm, flap or moveable partition is suspended from above, from the side, or beneath a conveyor system.

Figure 4:
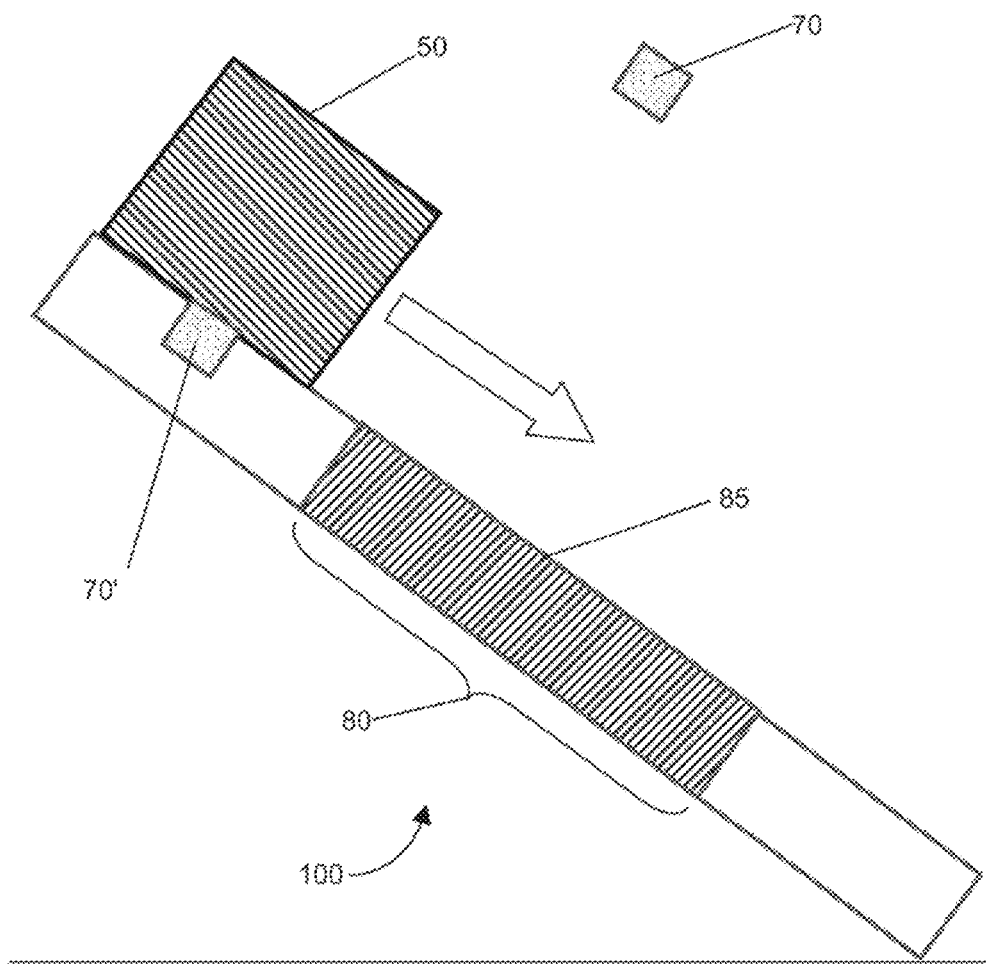
FIG. 4 is an illustrative side view of an exemplary electroadhesive metering system.

As shown in FIG. 4, in some embodiments, a first sensor 70 is configured to detect the presence of a first object 50 and generate object detection data based on the first object 50 presence. In some embodiments, the first sensor 70 is configured to detect the presence of a plurality of objects (not shown), either before, after, above or below a first object and generate the object detection data based on the presence of such plurality of objects. In some embodiments, the first sensor 70 is configured to detect the rate of movement of the first object or second object or a plurality of objects and generate object detection data thereof and generate the object detection data based on the movement detected. In some embodiments, the first sensor 70 is configured to detect the acceleration of movement the first object or second object or a plurality of objects and generate the object detection data based on the acceleration detected. In addition, the system comprises at least a second sensor 70' for alternate detection and measurement of objects in the flow path, such as weight, balance, or shape to name but a few and generate additional or alternate object detection data based on the detected aspect by the second sensor 70', which may or may not be located in the same vicinity as shown in FIG. 4. The object detection data and the alternate object detection data is combined, used together, or alternatively used based on the demands of the flow process being employed. In some embodiments, the sensors 70 and 70' are replaced by manual input such as judgment of velocity, or information coming to a human being from a control system in the form of light, sound, vibration or other sensory input.

That is, the sensor(s) provide this object detection data to a controller (not shown), which in turn is configured to meter the flow of the plurality of objects by applying a voltage to the one or more electrodes comprising an electroadhesive metering section 80 when the object(s) are in contact with the electroadhesive surface 85.

Alternately the system comprises a processor (not shown), comprising flow control instructions and electroadhesive surface instructions based on the flow control instructions configured to meter the flow of the plurality of objects 50 in the flow path and in contact with the electroadhesive surface 80. The processor receives the object detection data from the sensor, and optionally receives the alternate object detection data from a second sensor. The processor generates flow control instructions, based on a user input, a flow plan pre-loaded in the processor or receivable by the processor, or an additional sensor. The processor includes flow control instructions which are based on a user input, based on a flow plan pre-loaded in the processor or be receivable by the processor, or be based on an additional sensor. The processor generates electroadhesive surface instruction based on the flow control instructions and the object detection data and/or the alternate object detection data. That is, the processor evaluates the object detection data and/or the alternate object detection data based on flow control instructions and generates electroadhesive surface instructions that are delivered to a controller that meters the flow of the object or a plurality of objects, or slows the rate or acceleration the object or a second object. The flow control instructions are thereafter translated into electroadhesive surface instruction to the controller of the system which acts on the object or a second object to meter the flow of the object or the second object, to change the rate of movement of the object or the second object, or to change the rate of acceleration of the object or the second object.

Further, when there is alternate object detection data provided to the processor, the processor is configured to evaluate the object detection data and the alternate object detection data based on the flow control instructions and generate electroadhesive surface instructions that are delivered to a controller that meters the flow of the object or a plurality of objects, or slows the rate or acceleration the object or a second object.

In any one of the system embodiments, the sensor comprises: an optical sensor, a weight sensor, a speed sensor, an acceleration sensor, a proximity sensor, a touch sensor, a laser sensor, a RFID sensor, an UV sensor, an Infrared sensor, and a radar sensor.

In any one of the system embodiments, the sensor determines: the presence of the object, the presence of a second object, the presence of stacked or layered objects, the number of objects in a stack, the size of the object, the shape of the object, the weight of the object, the speed of the object, or the acceleration or deceleration of the object, or the acceleration or deceleration of a second object.

In any one of the system embodiments, the electroadhesive surface is flexible. By way of non-limiting example, this flexible electroadhesive surface comprises a curtain, a flexible or swinging door, a flap, a partition, a pad, or a strap.

In any one of the system embodiments, the surface that the moving object moves on has an effective coefficient of friction that is low when there is no electroadhesive voltage applied is applied to the electroadhesive surface.

In any one of the system embodiments, the electroadhesive surface has a low coefficient of friction when there is no voltage applied.

In some embodiments, the system comprises a coefficient of friction. In some embodiments, the coefficient of friction is a low coefficient of friction. A system with a low coefficient of friction comprises a system that would allow a moving object to slide at about a 45 degree angle. A system with a low coefficient of friction comprises a system that would allow a moving object to slide at about a 35 degree angle. A system with a low coefficient of friction comprises a system that would allow a moving object to slide at about a 25 degree angle. A system with a low coefficient of friction comprises a system that would allow a moving object to slide at about a 15 degree angle. A system with a low coefficient of friction comprises a system that would allow a moving object to slide at about a 5 degree angle. A system with a low coefficient of friction comprises a system that would allow a moving object to slide at about a 45, 40, 35, 30, 25, 20, 15, 10, or 5 degree angle. In some embodiments, a system with a low coefficient of friction comprises a system that would allow an object weighing less than 10 pounds (lbs) to slide. In some embodiments, a system with a low coefficient of friction comprises a system that would allow an object weighing less than 5 pounds (lbs) to slide.

In any one of the system embodiments, the electroadhesive surface comprises: a pad, a curtain, a flap, a strap, a strip, chute, a slide, a roller, a carousel, a door, an arm, a partition, a step, a platform, a table, an undulating surface, a decline surface, and an incline surface.

Provided herein is a conveyance system of any one of the embodiments described herein.

Provided herein is a system comprising: an electroadhesive surface including one or more electrodes; a sensor that detects one or more of the presence of an object, a rate of movement of the object, or an acceleration of movement of the object; and a controller configured to decelerate the object by applying a voltage to a first electrode of the one or more electrodes when the object is in contact with the electroadhesive surface based on the sensor detection, wherein the object continues moving relative to the electroadhesive surface despite deceleration.

In some embodiments, the system further comprises a processor configured to receive object detection data from the sensor, and output electroadhesive surface instruction to the controller based on the detection data.

In some embodiments the processor comprises flow control instructions based on a second sensor, a flow plan, or a user input.

Provided herein is a system comprising: an electroadhesive surface including one or more electrodes; a controller configured to decelerate an object that is in contact with the electroadhesive surface by applying a voltage to a first electrode of the one or more electrodes based on an instruction from a processor that controls the flow of the object based on a sensor detection of the object.

In some embodiments, the system further comprises a sensor configured to detect one or more of presence the object or of a second object, a rate of movement of the object or of a second object, or an acceleration of movement of the object, and output object detection data to the processor.

As shown in FIG. 4, in some embodiments, a first sensor 70 is configured to detect the presence of a first object 50 and generate object detection data based on the first object 50 presence. In some embodiments, the first sensor 70 is configured to detect the presence of a plurality of objects (not shown), either before, after, above or below a first object and generate the object detection data based on the presence of such plurality of objects. In some embodiments, the first sensor 70 is configured to detect the rate of movement of the first object or second object or a plurality of objects and generate object detection data thereof and generate the object detection data based on the movement detected. In some embodiments, the first sensor 70 is configured to detect the acceleration of movement the first object or second object or a plurality of objects and generate the object detection data based on the acceleration detected. In addition, the system comprises at least a second sensor 70' for alternate detection and measurement of objects in the flow path, such as weight, balance, or shape to name but a few and generate additional or alternate object detection data based on the detected aspect by the second sensor 70'. The object detection data and the alternate object detection data is combined, used together, or alternatively used based on the demands of the flow process being employed.

That is, the sensor(s) provide this object detection data to a controller (not shown), which in turn is configured to meter the flow of the plurality of objects by applying a voltage to the one or more electrodes comprising an electroadhesive metering section 80 when the object(s) are in contact with the electroadhesive surface 85.

Alternately the system comprises a processor (not shown), comprising flow control instructions and electroadhesive surface instructions based on the flow control instructions configured to meter the flow of the plurality of objects 50 in the flow path and in contact with the electroadhesive surface 80. The processor receives the object detection data from the sensor, and optionally receives the alternate object detection data from a second sensor. The processor generates flow control instructions, based on a user input, a flow plan pre-loaded in the processor or receivable by the processor, or an additional sensor. The processor includes flow control instructions which are based on a user input, based on a flow plan pre-loaded in the processor or be receivable by the processor, or be based on an additional sensor. The processor generates electroadhesive surface instruction based on the flow control instructions and the object detection data and/or the alternate object detection data. That is, the processor evaluates the object detection data and/or the alternate object detection data based on flow control instructions and generates electroadhesive surface instructions that are delivered to a controller that meters the flow of the object or a plurality of objects, or slows the rate or acceleration the object or a second object. The flow control instructions are thereafter translated into electroadhesive surface instruction to the controller of the system which acts on the object or a second object to meter the flow of the object or the second object, to change the rate of movement of the object or the second object, or to change the rate of acceleration of the object or the second object.

Further, when there is alternate object detection data provided to the processor, the processor is configured to evaluate the object detection data and the alternate object detection data based on the flow control instructions and generate electroadhesive surface instructions that are delivered to a controller that meters the flow of the object or a plurality of objects, or slows the rate or acceleration the object or a second object.

In any one of the system embodiments, the sensor comprises: an optical sensor, a weight sensor, a speed sensor, an acceleration sensor, a proximity sensor, a touch sensor, a laser sensor, a RFID sensor, an UV sensor, an Infrared sensor, and a radar sensor.

In any one of the system embodiments, the sensor determines: the presence of the object, the presence of a second object, the presence of stacked or layered objects, the number of objects in a stack, the size of the object, the shape of the object, the weight of the object, the speed of the object, or the acceleration or deceleration of the object, or the acceleration or deceleration of a second object.

In any one of the system embodiments, the electroadhesive surface is flexible. By way of non-limiting example, this flexible electroadhesive surface comprises a curtain, a flexible or swinging door, a flap, a partition, a pad, or a strap.

In any one of the system embodiments, the electroadhesive surface has a low coefficient of friction when there is no voltage applied.

In any one of the system embodiments, the electroadhesive surface comprises: a pad, a curtain, a flap, a strap, a strip, chute, a slide, a roller, a carousel, a door, an arm, a partition, a step, a platform, a table, an undulating surface, a decline surface, and an incline surface.

Provided herein is a conveyance system of any one of the embodiments described herein.

FIG. 4 shows is an illustration of an electroadhesive metering and for braking system 100 as part of an illustrative conveyor system in some embodiments, a first sensor 70 is configured to detect the presence of an object 50 and generate object detection data based on the object 50 presence. In some embodiments, the first sensor 70 is configured to detect the presence of a plurality of objects (not shown), either before, after, above or below a first object and generate the object detection data based on the presence of such plurality of objects. In some embodiments, the first sensor 70 is configured to detect the rate of movement of the first object or second object or a plurality of objects and generate object detection data thereof and generate the object detection data based on the movement detected. In some embodiments, the first sensor 70 is configured to detect the acceleration of movement the first object or second object or a plurality of objects and generate the object detection data based on the acceleration detected. In addition, the system comprises at least a second sensor 70' for alternate detection and measurement of objects in the flow path, such as weight, balance, or shape to name but a few and generate additional or alternate object detection data based on the detected aspect by the second sensor 70'. The object detection data and the alternate object detection data is combined, used together, or alternatively used based on the demands of the flow process being employed.

That is, the sensor(s) provide this object detection data to a controller (not shown), which in turn is configured to meter the flow of the plurality of objects by applying a voltage to the one or more electrodes comprising an electroadhesive metering section 80 when the object(s) are in contact with the electroadhesive surface 85.

Alternately the system comprises a processor (not shown), comprising flow control instructions and electroadhesive surface instructions based on the flow control instructions configured to meter the flow of the plurality of objects in the flow path and in contact with the electroadhesive surface 80. The processor receives the object detection data from the sensor, and optionally receives the alternate object detection data from a second sensor. The processor generates flow control instructions, based on a user input, a flow plan pre-loaded in the processor or receivable by the processor, or an additional sensor. The processor includes flow control instructions which are based on a user input, based on a flow plan pre-loaded in the processor or be receivable by the processor, or be based on an additional sensor. The processor generates electroadhesive surface instruction based on the flow control instructions and the object detection data and/or the alternate object detection data. That is, the processor evaluates the object detection data and/or the alternate object detection data based on flow control instructions and generates electroadhesive surface instructions that are delivered to a controller that meters the flow of the object or a plurality of objects, or slows the rate or acceleration the object or a second object. The flow control instructions are thereafter translated into electroadhesive surface instruction to the controller of the system which acts on the object or a second object to meter the flow of the object or the second object, to change the rate of movement of the object or the second object, or to change the rate of acceleration of the object or the second object.

Further, when there is alternate object detection data provided to the processor, the processor is configured to evaluate the object detection data and the alternate object detection data based on the flow control instructions and generate electroadhesive surface instructions that are delivered to a controller that meters the flow of the object or a plurality of objects, or slows the rate or acceleration the object or a second object.

Figures 5A, 5B:
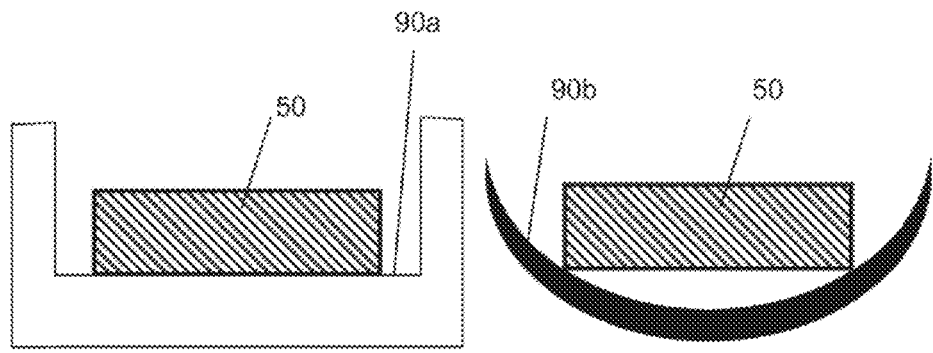
FIGS. 5A and 5B are illustrative arrangements of a chute delivery/conveyance system.

Referring to FIGS. 5A-5B is an illustration of variable chute surfaces 90a, 90b which comprises a flow path. Surfaces are flat as illustrated in 90a, or curved as shown in 90b, or undulating or otherwise uneven and providing a less than ideal contact surface. As shown in FIG. 5B, only part of an object surface is in contact with the electroadhesive surface at any given time. Conventional conveyor systems would be unable to meter or brake the flow of objects in this case, whereas the voltage of an electroadhesive system, coupled with sensors providing direct or indirect (through one or more of the controller and processor) feedback to the electroadhesive surface adjusts the voltage to increase the attractiveness or adherence of the object to the surface, thus providing a braking or metering effect. The feedback is so reactive that such control appears continuous or nearly continuous, limited only by the speed with which the sensor-generated object detection data or other detection data is translated into electroadhesive surface instructions.

Figure 6:
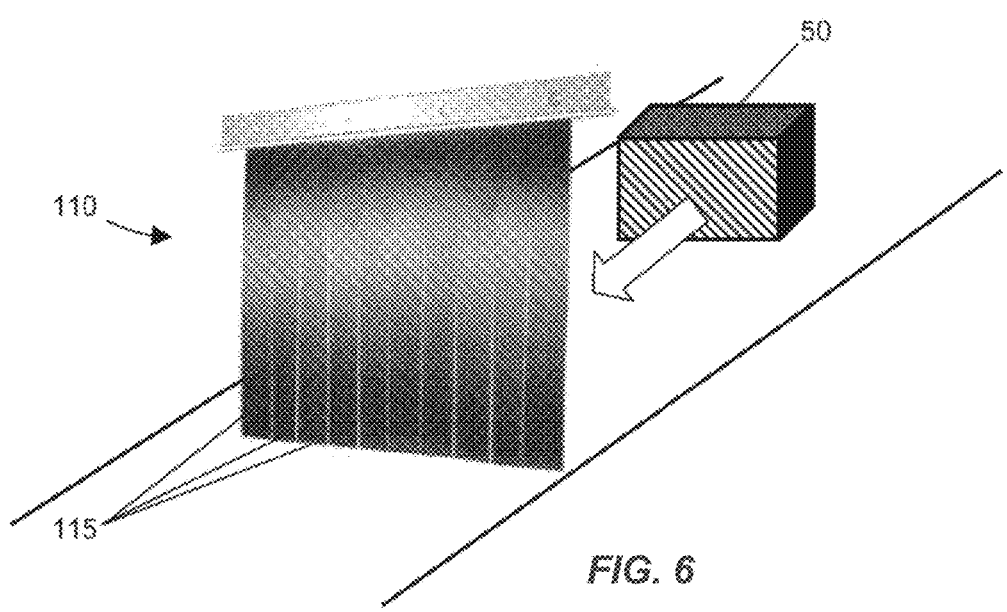
FIG. 6 is a isometric view of an electroadhesive curtain surface arrangement illustrating the metering capability of objects in a conveyance flow path.

Still further, referring to FIG. 6, is an illustration of a curtain 110 or sectioned curtain comprising one or more electroadhesive surfaces 115 including one or more electrodes. As illustrated, an object 50 in a conveyance system of any type (i.e.: chute, roller system, roller conveyor, braking system, etc.), is easily metered by applying a voltage to the electrodes in the curtain to induce an attraction to the passing object, in turn decelerating the object relative to the curtain. Depending on the voltage applied, the weight and/or size of the object; the effect of the curtain is to meter, space-apart objects, brake acceleration, or even temporarily stop objects, later allowing them to proceed past the low friction surface, when the voltage is decreased or removed.

Provided herein is a metering system for a conveyance system comprising an electroadhesive surface including one or more electrodes; a sensor configured to detect one or more of presence the object or of a second object, a rate of movement of the object or of a second object, or an acceleration of movement of the object, and output object detection data to the processor; a controller configured to decelerate the object by applying a voltage to a first electrode of the one or more electrodes when the object is in contact with the electroadhesive surface based on the sensor detection, wherein the object continues moving relative to the electroadhesive surface despite deceleration; wherein the sensor and electroadhesive surface meter the flow of objects in a process path.

In some embodiments of the metering system or the conveyance system, the electroadhesive surface comprises a flap or pad installed beneath rollers of a conveyor system and within proximate contact with the rollers, wherein said electroadhesive surface interacts with the rollers to decelerate rotation when voltage is applied to one or more electrodes in the electroadhesive surface.

In some embodiments, the decelerated rotation of the rollers produces a metering effect on an object moving over the rollers. In some embodiments the decelerated rotation of the rollers produces a braking effect on an object moving over the roller. In some embodiments, the decelerated rotation on one of two rollers located side by side allows steering of the object moving over the rollers towards the decelerated roller. This is used to either steer the flow of the object on-demand, or to help align it against one edge of the overall conveyance surface on-demand.

In some embodiments, an electroadhesive device or gripping surface comprises for example, a compliant gripping surface to conform to an exterior surface microscopically, mesoscopically, and/or macroscopically. Such local gap-closing by the gripping surface causes the gripping surface to (at least partially) conform to the exterior surface of an object. Electroadhesive gripping surfaces with sufficient flexibility to conform to local non-uniformities, surface imperfections and other micro-variations and/or macro-variations in exterior surfaces of objects are referred to herein as compliant gripping surfaces. The ability to better conform the electroadhesive film to the rough or irregular surfaces or shapes of a foreign object improves the adhesion bond and performance of the system.

Figure 7:
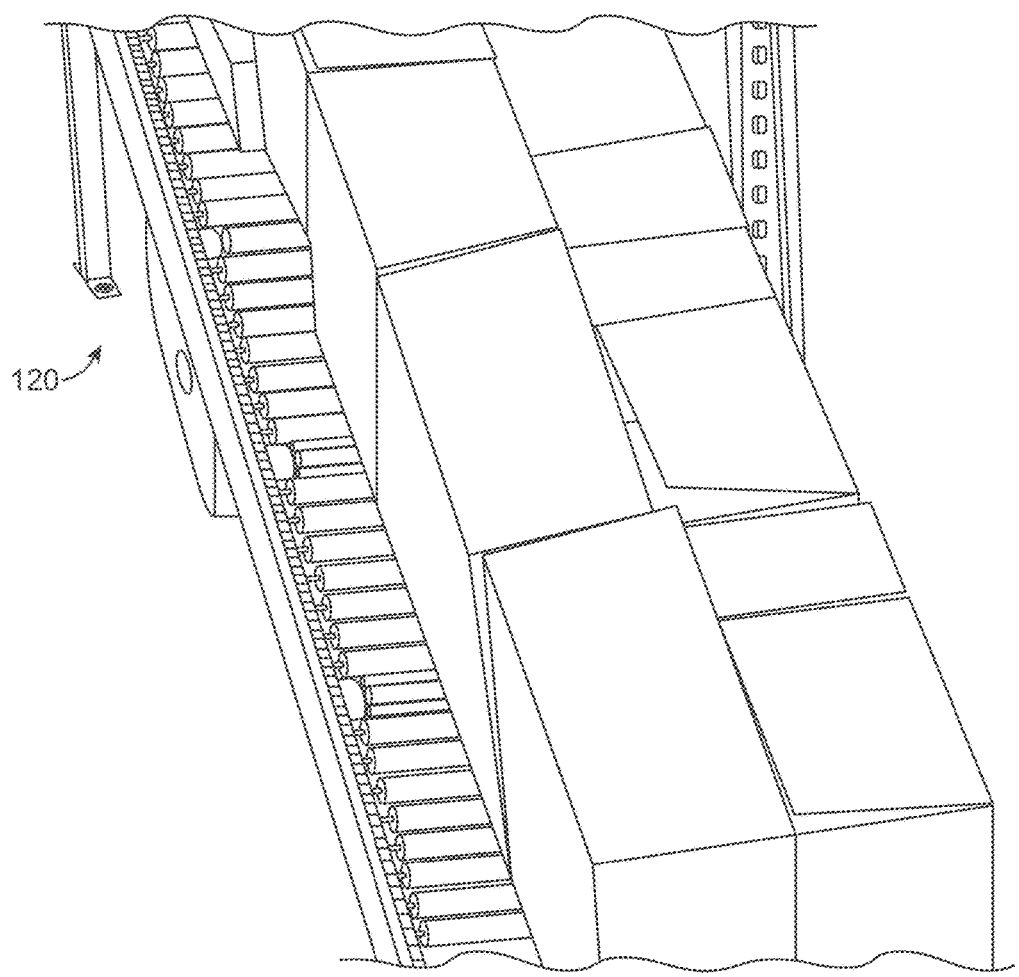
FIG. 7 is an illustrative view of an exemplary of a roller conveyor system.

As illustrated in FIG. 7, a roller conveyor 120 is illustrated with a plurality of packages. In most cases, a roller conveyor has no braking system, unless there is a pad between rollers or at the end of section; an inclined section to reduce speed; or unless the rollers are powered with a motor-driven system. In turn, roller conveyors are generally "dumb" systems that will continue to roll as long as there is weight and an inclination to induce movement over their surfaces.

Figure 8:
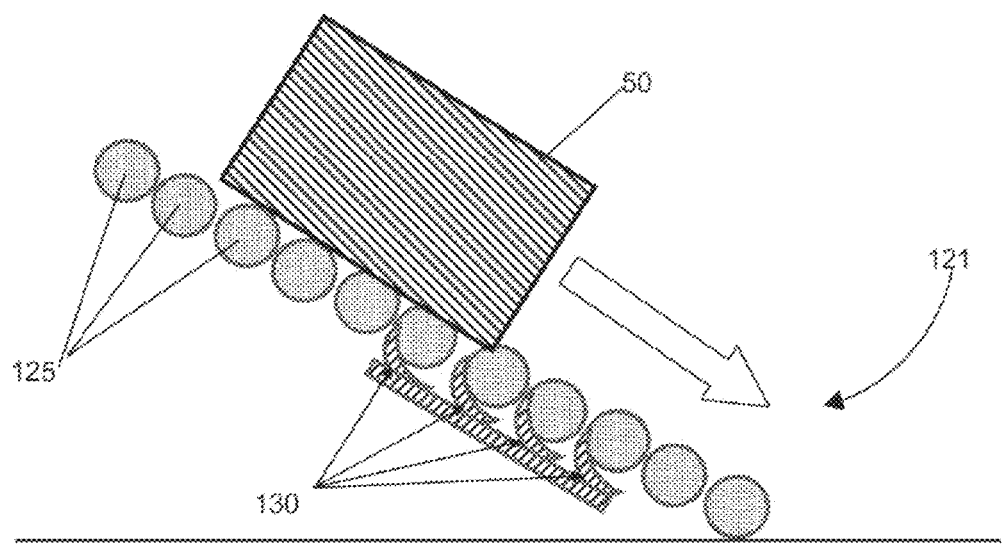
FIG. 8 is an illustrative view of an exemplary a roller conveyor with an exemplary electroadhesive braking/metering pad system.

As shown in FIG. 8, a novel roller electroadhesive surface comprises a flap or pad 130 installed beneath rollers 125 of a new roller conveyor system 121. When activated by the sensor or processor (not shown) or combination thereof, the electroadhesive pads 130, in proximate contact with the rollers 125, increase the friction between the rollers and the pads, thus decelerating the roller velocity and in turn decelerate the objects moving over them.

Figure 9:
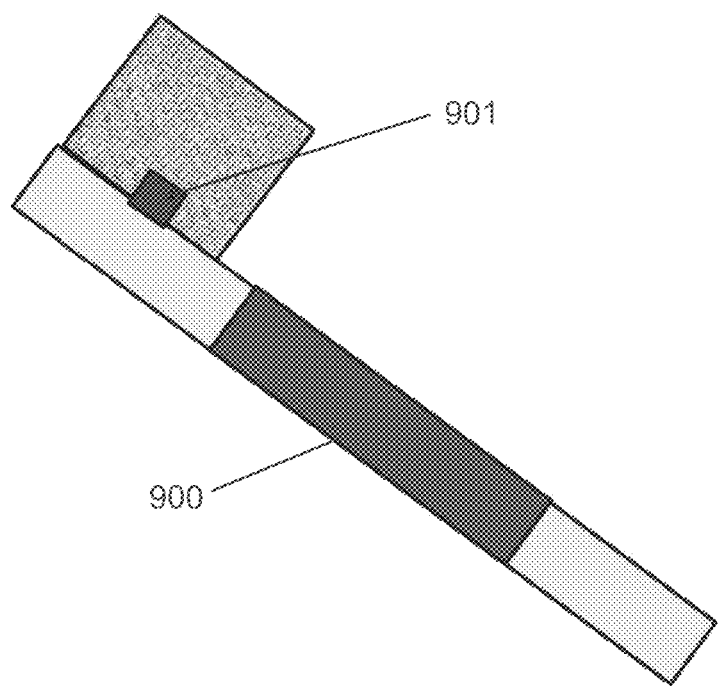
FIG. 9 is an illustrative view of an exemplary of a roller conveyor system with an electroadhesive braking section and sensor.

As illustrated in FIG. 9, a roller conveyor comprises electroadhesive braking, 900. In some embodiments, the entire length of the roller conveyor comprises electroadhesive braking. In some embodiments, the roller conveyor is at least about 5 feet (ft) in length. In some embodiments, the roller conveyor is at least about 10 ft in length. In some embodiments, the roller conveyor is between about 1.0 ft-30.0 ft in length. In some embodiments, the braking system portion of the movable conveyor is at least about 1 foot in length. In some embodiments, the braking system portion of the movable conveyor is at least about 3 feet in length. In some embodiments, the braking system portion of the movable conveyor is at least about 5 feet in length. In some embodiments, the braking system portion of the movable conveyor is between about 1 foot and 15 feet in length. In some embodiments, there are several sections of individually addressable braking sections that are subsets of the overall braking system length. In some embodiments, one or more regions of the roller conveyor length comprises one or more electroadhesive braking regions. In some embodiments, a roller conveyor comprises a single electroadhesive braking region. In some embodiments, a roller conveyor comprises multiple repeated electroadhesive braking regions. In some embodiments, a roller conveyor comprises a sensor, 901. In some embodiments, the sensor measures characteristics of the moving object. In some embodiments, the characteristics measured by the sensor includes the weight of the moving object, the velocity of the moving object, the acceleration of the moving object, the dimensions of the moving object, the bottom surface area of the moving object, or combinations thereof, or others. In some embodiments, the characteristics measured by the sensor is used to determine whether or not to engage the electroadhesive braking. The sensor is positioned before the electroadhesive braking regions. The sensor is positioned in the electroadhesive braking region. In some embodiments, the electroadhesive braking is engaged on demand. In some embodiments, the electroadhesive braking is engaged on moving objects weighing about 50 lbs. In some embodiments, the electroadhesive braking is engaged on moving objects weighing at least about 10 lbs. In some embodiments, the electroadhesive braking is engaged on moving objects weighing at least about 15 lbs.

Figure 10A:
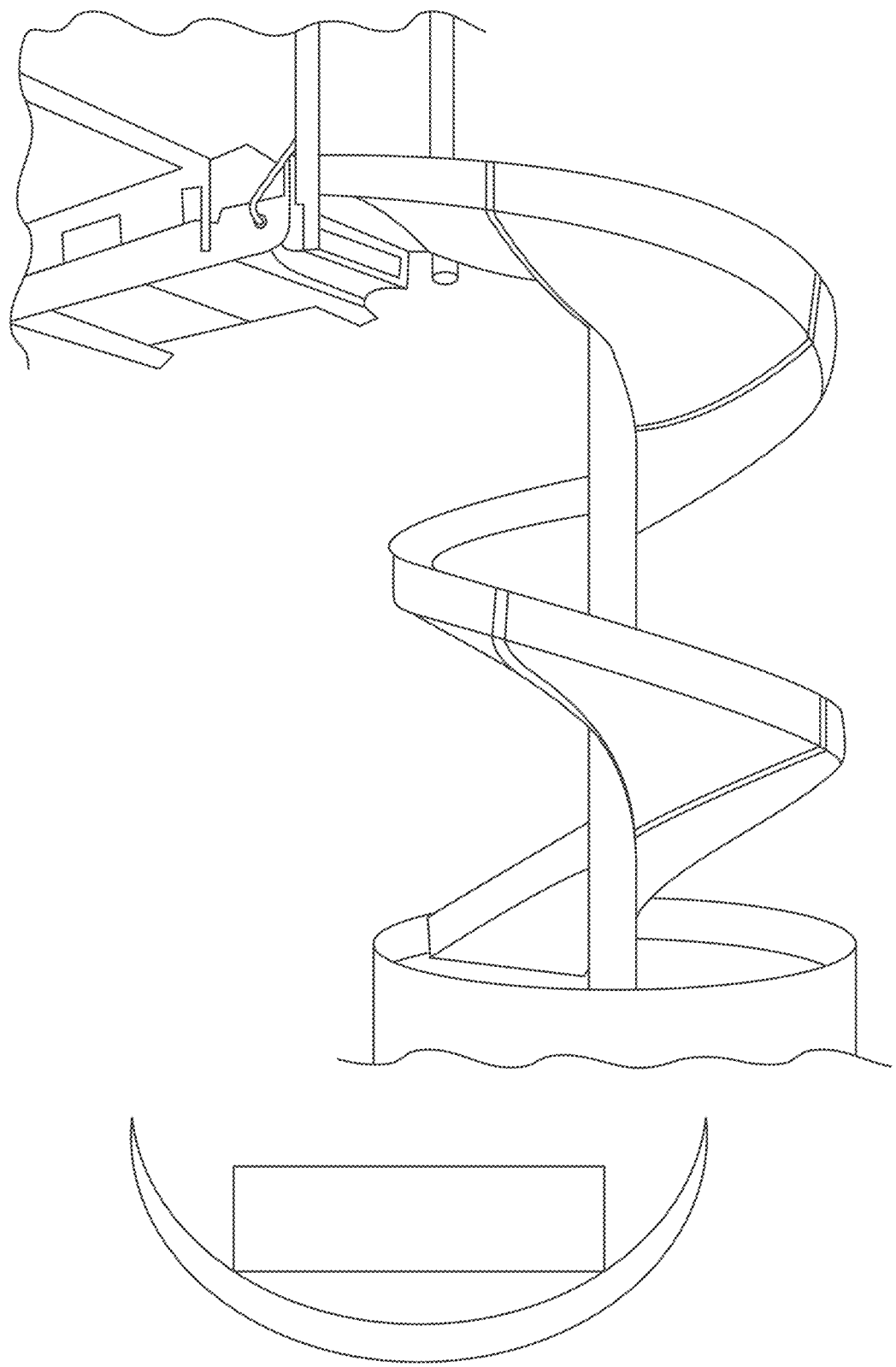
FIG. 10A is an photographic view of a load lane chute having a curved bottom to contact the moving object, illustrative view.
Figure 10B:
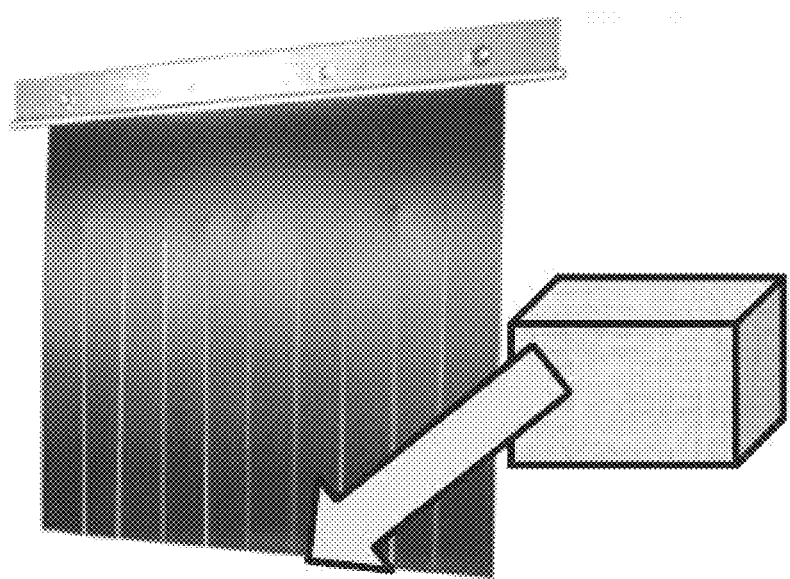
FIG. 10B is an illustrative view of an electroadhesive chute curtain and moving object.
Figure 11A:
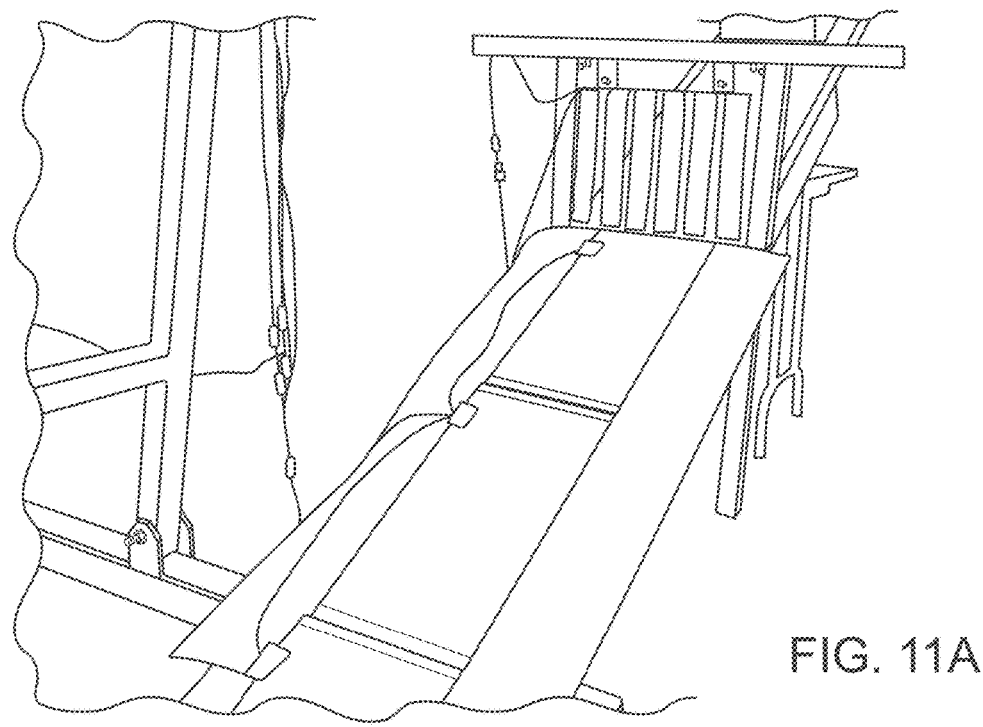
FIG. 11A-D are photographic views of the electroadhesive chute curtain as a standard curtain, 11A, as a long curtain, 11B, as an overlapping curtain, 11C, and as a long curtain reversed, 11D.
Figure 11B:
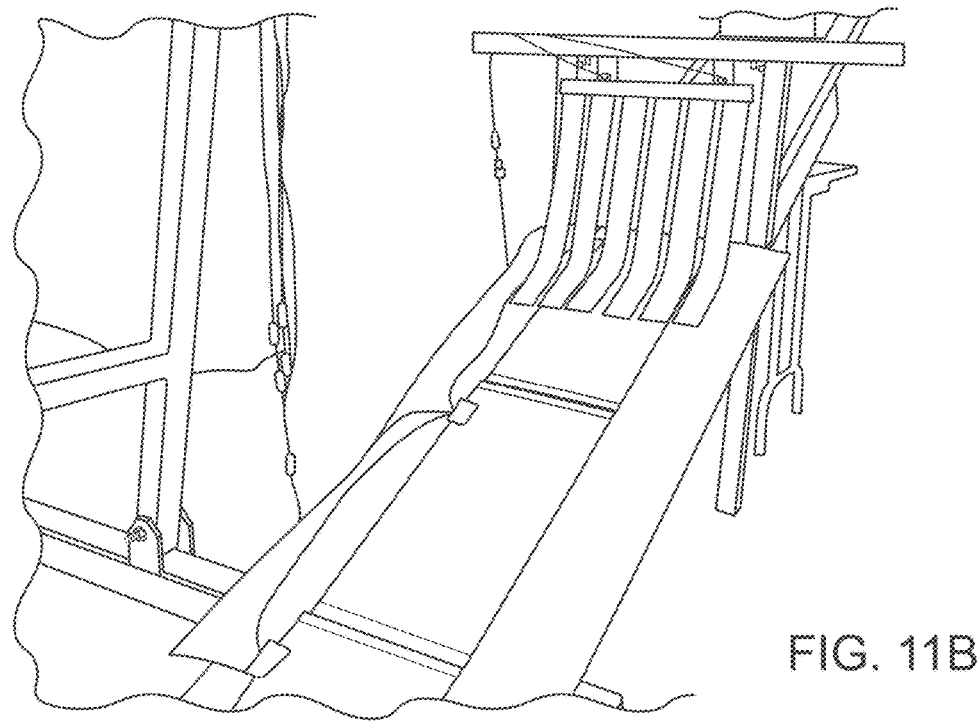
Figure 11C:
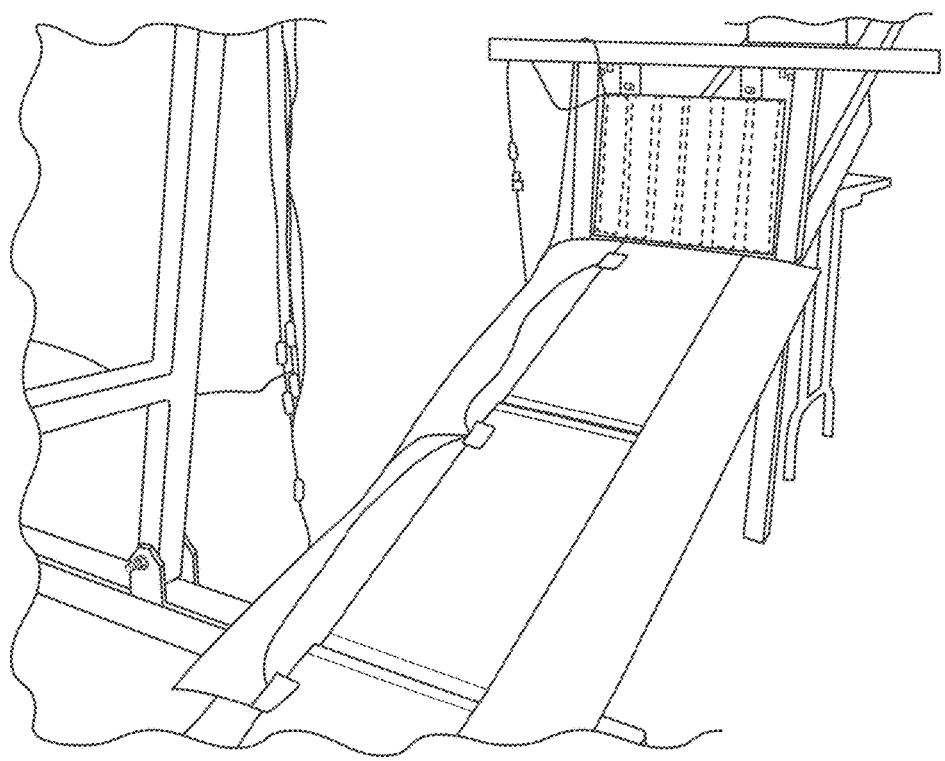
Figure 11D:
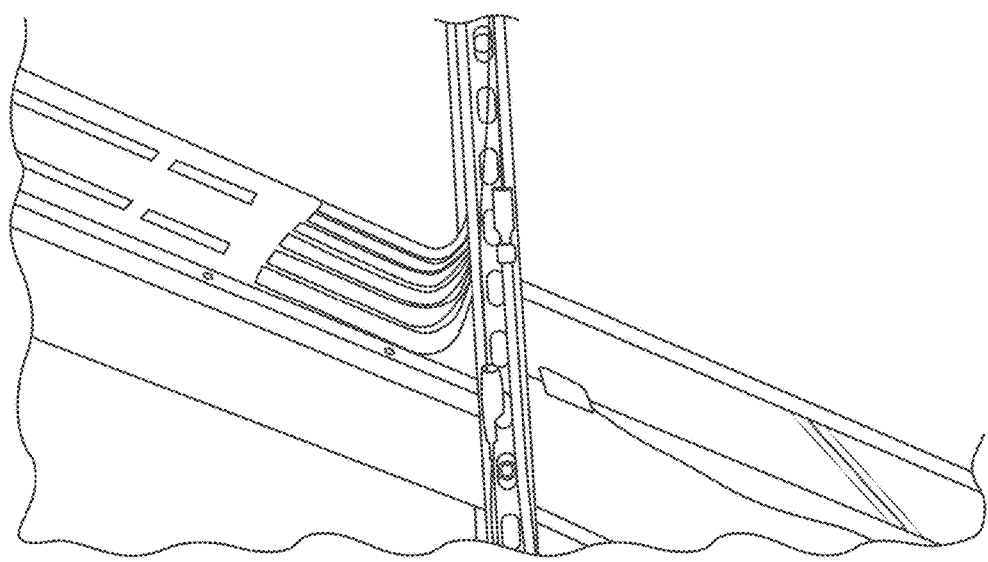

In some embodiments, surface contact between a moving object and a movable substrate is less than 50% the bottom surface area of the movable substrate. In some embodiments, the surface contact between a moving object and the movable substrate is less than about 40%, 30%, 20%, 10%, or 5% the bottom surface area of the movable substrate. As illustrated in FIG. 10A, a chute comprises curved bottoms. In some embodiments chutes comprising curved bottoms have reduced surface contact to moving objects compared with a chute with a flat bottom. In some embodiments, the system comprises an electroadhesive curtain, FIG. 10B. The electroadhesive curtain is mounted above the system. The electroadhesive curtain is mounted in the path of the moving object. The electroadhesive curtain exerts force on the sides or top of the moving object. The force exerted by the electroadhesive curtain is exerted on demand. The force exerted by the electroadhesive curtain is exerted on moving objects weighing about 50 lbs. The force exerted by the electroadhesive curtain is exerted on moving objects weighing at least about 10 lbs. The force exerted by the electroadhesive curtain is exerted on moving objects weighing at least about 15 lbs. The force exerted by the electroadhesive curtain is exerted on moving objects with a velocity greater than about 25 ft/min. The force exerted by the electroadhesive curtain is exerted on moving objects with a velocity greater than about 50 ft/min. The force exerted by the electroadhesive curtain is exerted on moving objects with a velocity greater than about 100 ft/min. The electroadhesive curtain exerts no force on moving objects with weight less than 5 lbs. As illustrated in FIG. 11 or 12, the electroadhesive curtain is mounted above the system. The electroadhesive curtain is a standard length, where the end opposite to the attachment end contacts the top surface of the system, 11A or 12B. The electroadhesive curtain is a long length, where at least one quarter the length of the curtain contacts the top surface of the system, 11B or 12C. The electroadhesive curtain is an overlapping curtain, adhering at least a portion of the curtain to itself, 11C or 12D. The electroadhesive curtain is a long curtain reversed, 11D or 12E, wherein at least one quarter the length of the curtain contacts the top surface of the system and the contacting occurs at a higher point than the curtain attachment point of the system.

Figure 12A:
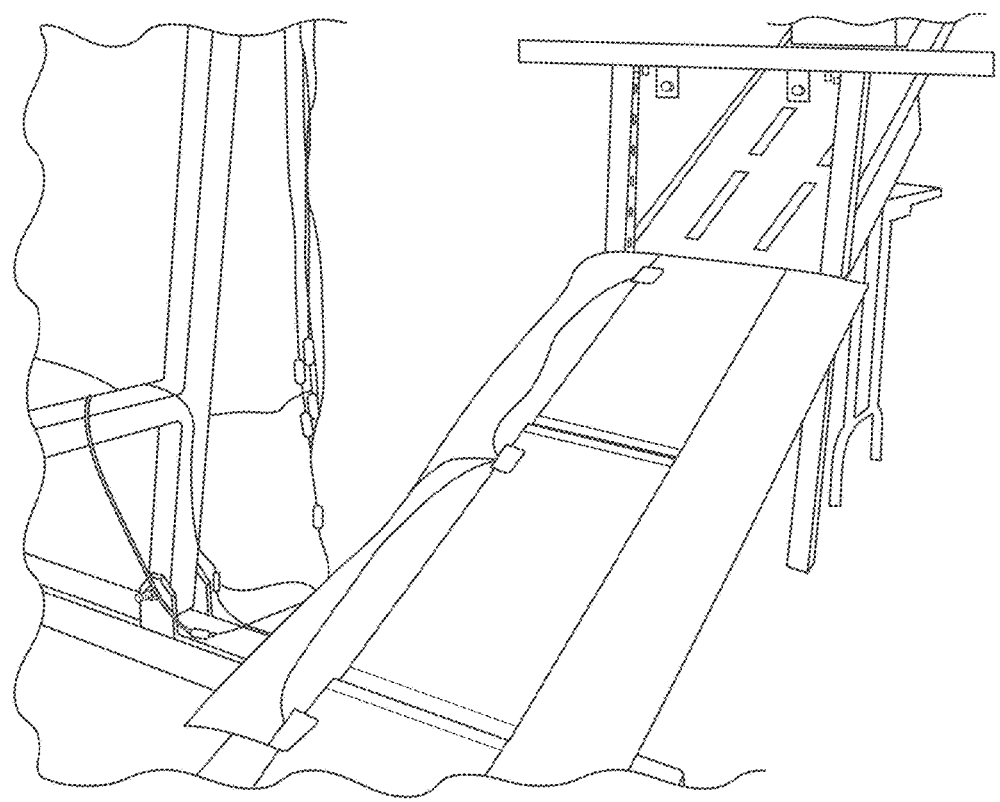
FIG. 12A is a photographic view of the electroadhesive chute pads.
Figure 12B:
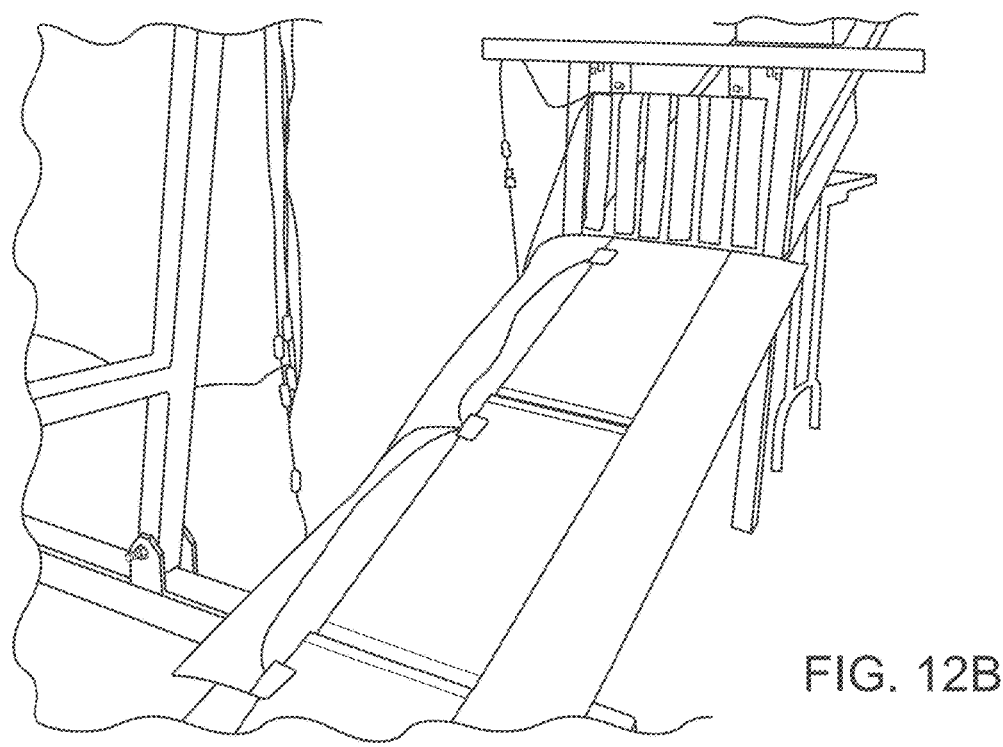
FIG. 12B-E are photographic views of the electroadhesive chute curtain as a standard curtain, 12B, as a long curtain, 12C, as an overlapping curtain, 12D, and as a long curtain reversed, 12E.
Figure 12C:
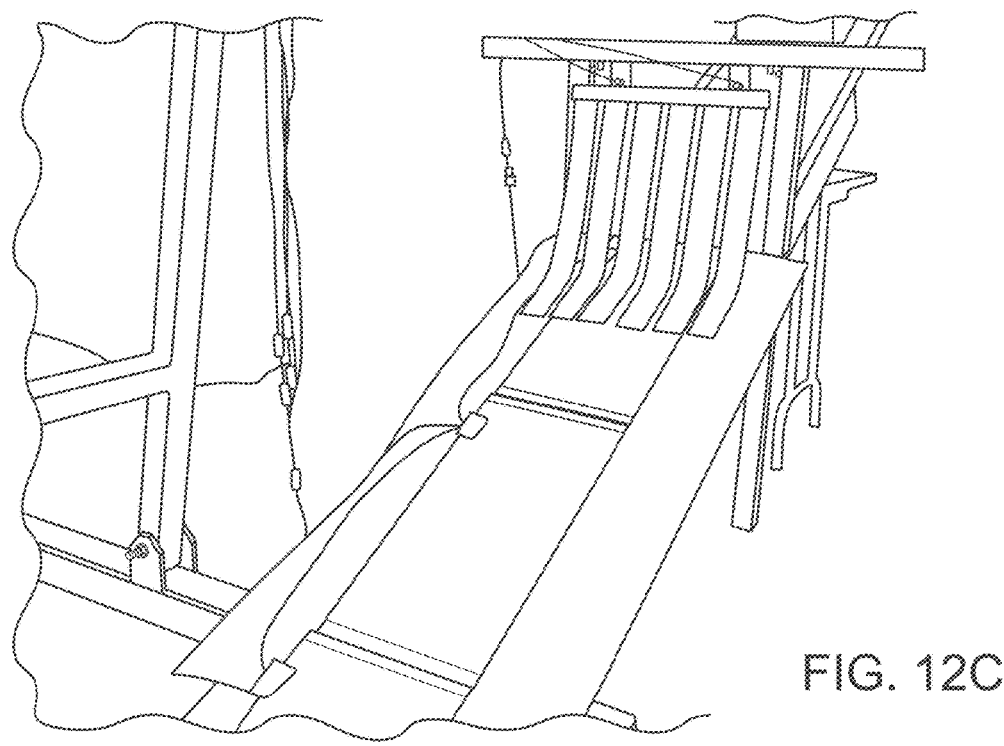
Figure 12D:
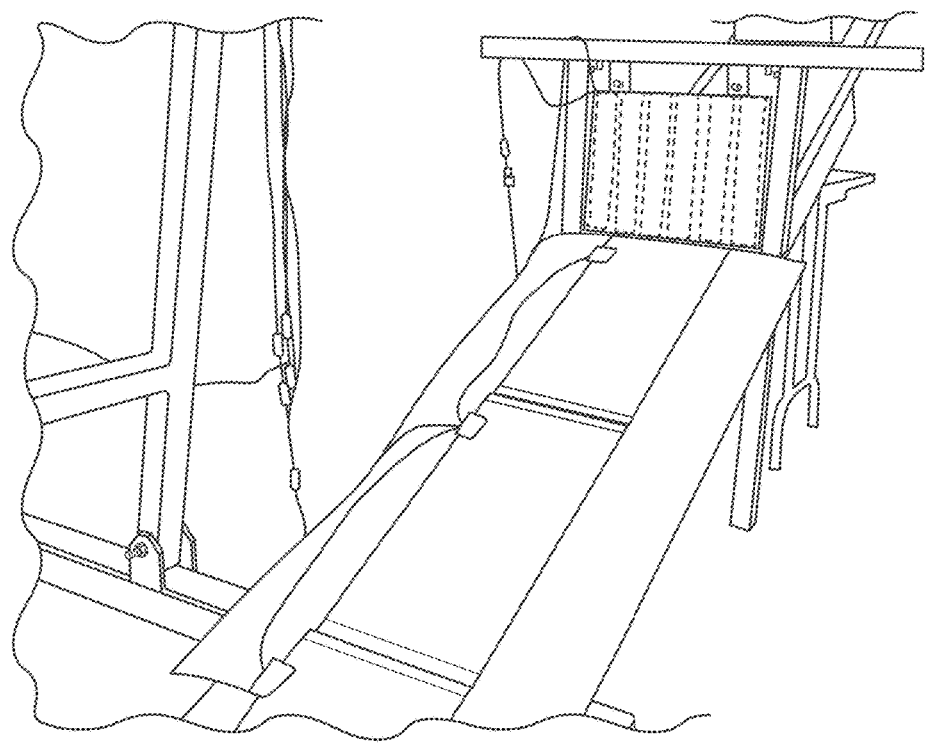
Figure 12E:
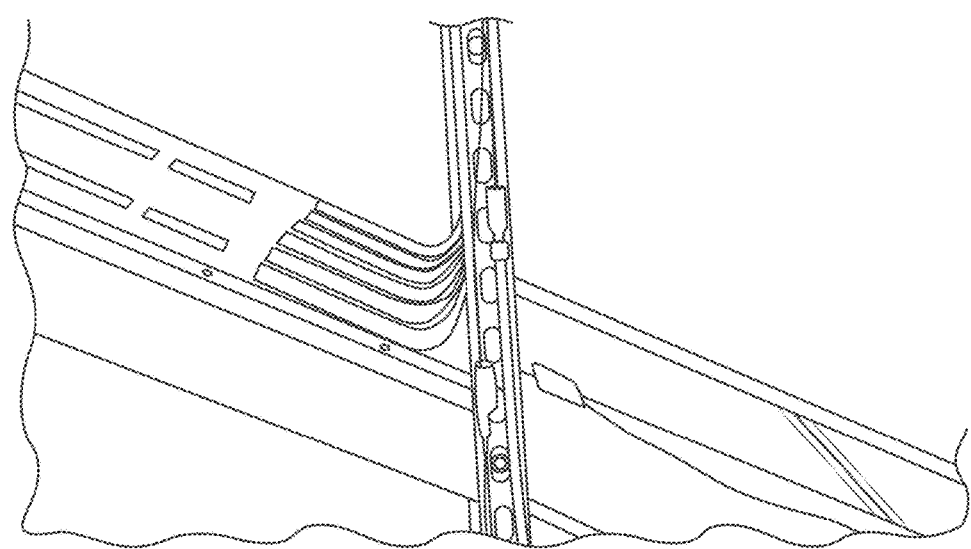
Figure 12F:
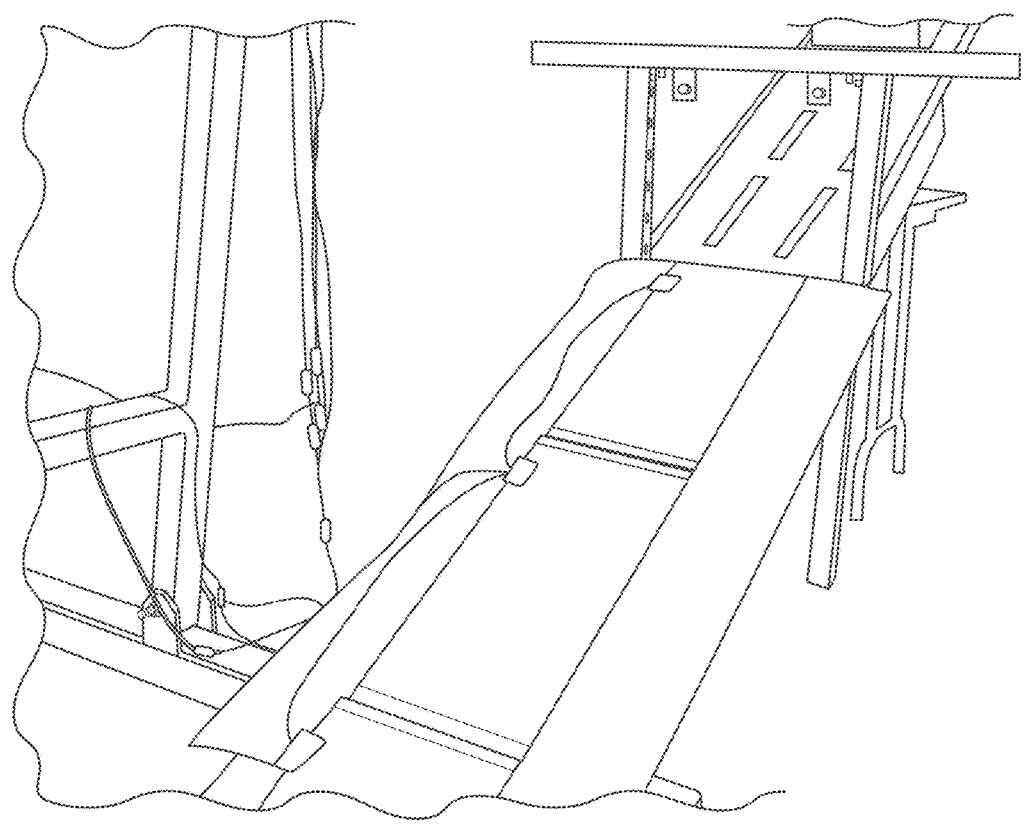
FIG. 12F is a photographic view of the flat brake plate.

As illustrated in FIG. 12A or 12F, the system includes an electroadhesive surface in direct contact with a moving object. In some embodiments, the electroadhesive surface is an electroadhesive pad or electroadhesive chute pad, 12F. In this embodiment, the electroadhesive pad is mounted on top of the substrate (i.e. a ramp or chute). In this embodiment, the electroadhesive pad covers the entire top of the ramp or chute. In this embodiment, the electroadhesive pad covers one or more regions of the ramp or chute. In this embodiment, the electroadhesive pad covers one or more repeating regions of the ramp or chute. In this embodiment, the electroadhesive braking is dependent upon the amount of contact area between the moving object and the electroadhesive pad. In some embodiments, the electroadhesive pad comprises plastic. In some embodiments, the plastic is polyethylene.

Figure 13A:
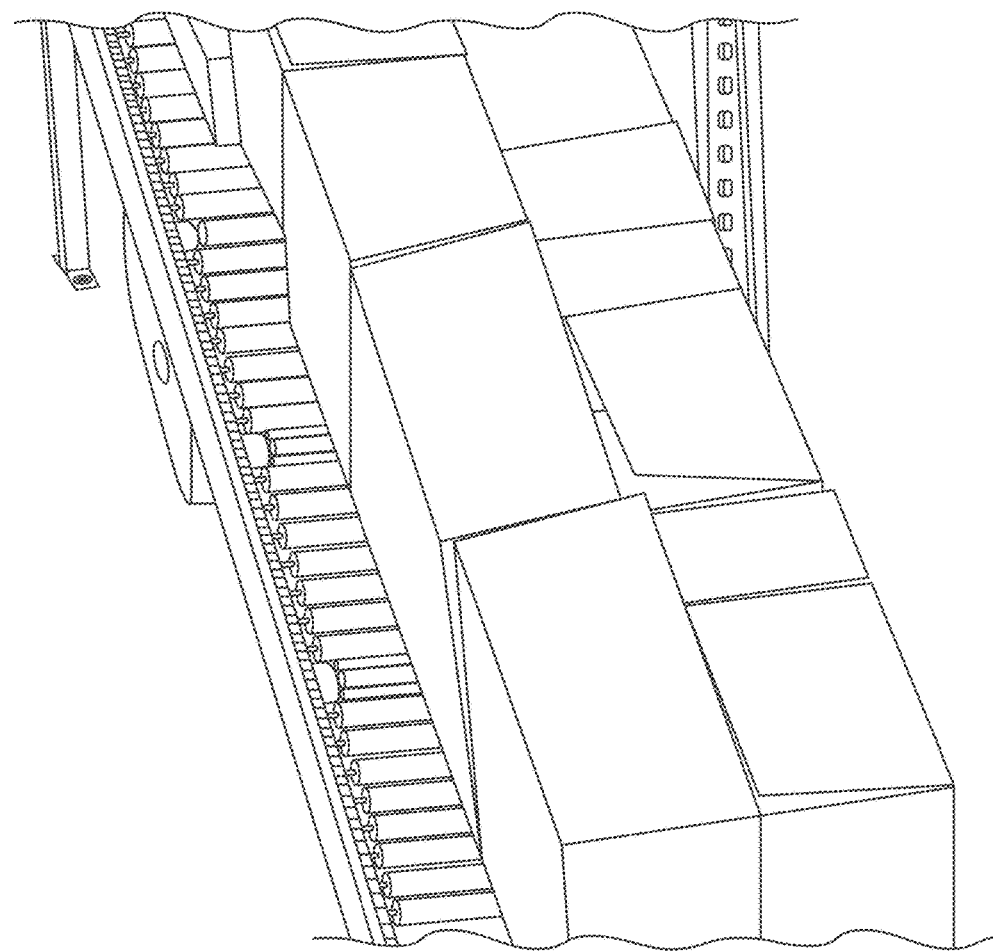
FIG. 13A is a photographic view of moving objects on a roller conveyor system and FIG. 13B is an illustrative view of the electroadhesive pad with flaps installed underneath the roller conveyor to reduce the velocity of the rotational roller.
Figure 13B:
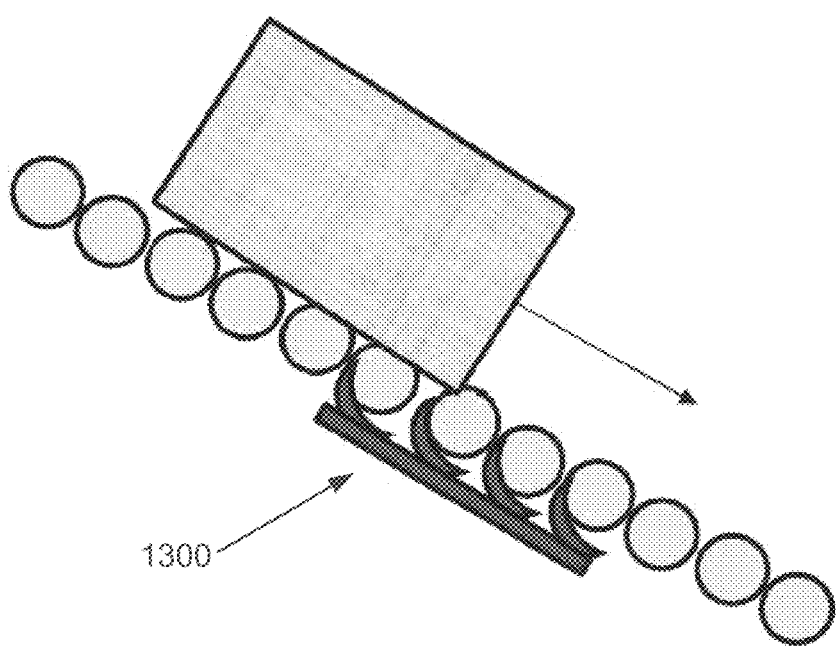

As illustrated in FIG. 13, the velocity of moving objects (i.e. boxes) traveling down a roller conveyor, 13A, is reduced by the system mounted underneath the roller conveyor, comprising flaps that individually slow down the rotation of an individual roller, 13B. In some embodiments, the system interacts with standard movable substrates (i.e. rollers).

Figure 14A:
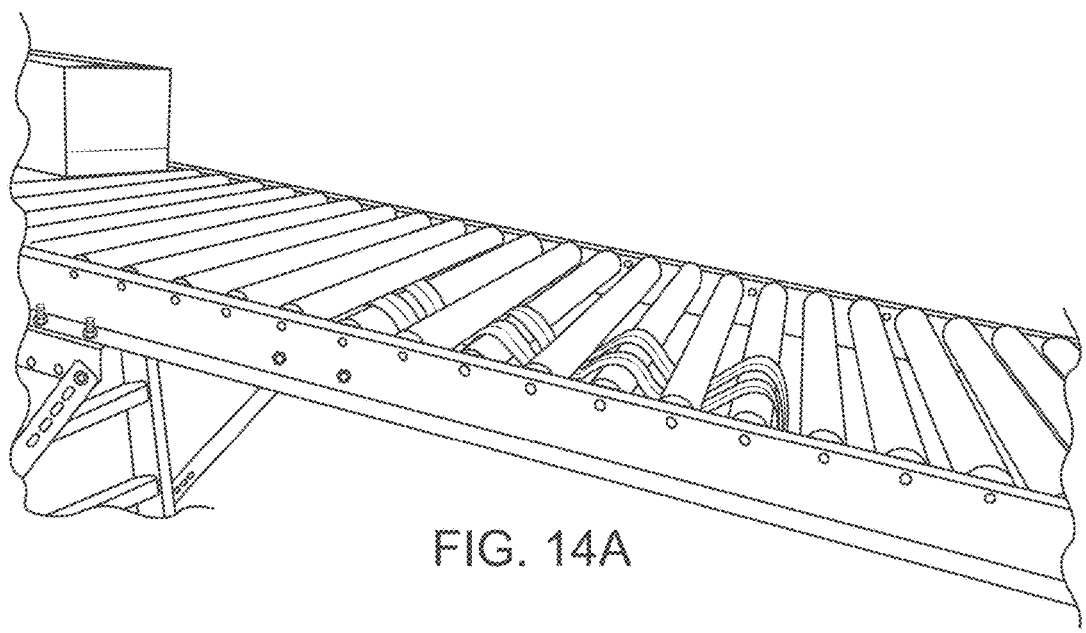
FIG. 14A-E are photographic views of electroadhesive roller brakes weaved in between the rollers, 14A, with a uniform electroadhesive surface and a curved fixed bed, 14B, with a non-uniform electroadhesive surface and curved fixed bed, 14D, with molded material and planar angled fixed bed, 14C, and with a different molded material and planar angled fixed bed 14E.
Figure 14B:
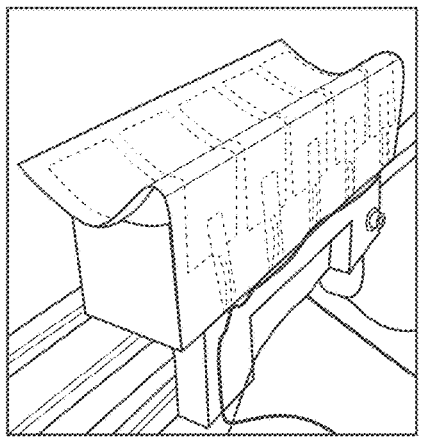
Figure 14C:
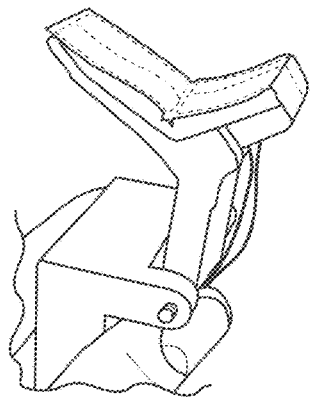
Figure 14D:
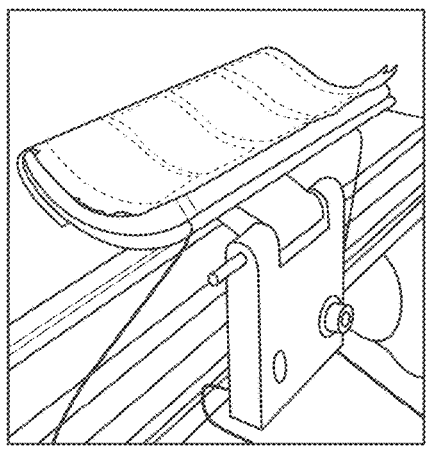
Figure 14E:
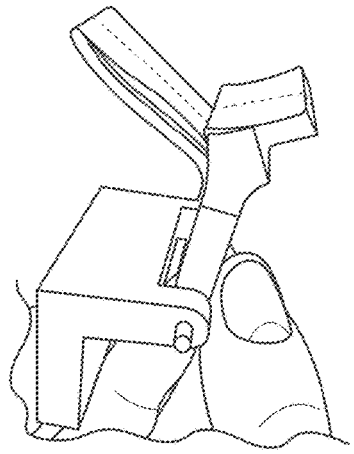
Figure 18A:
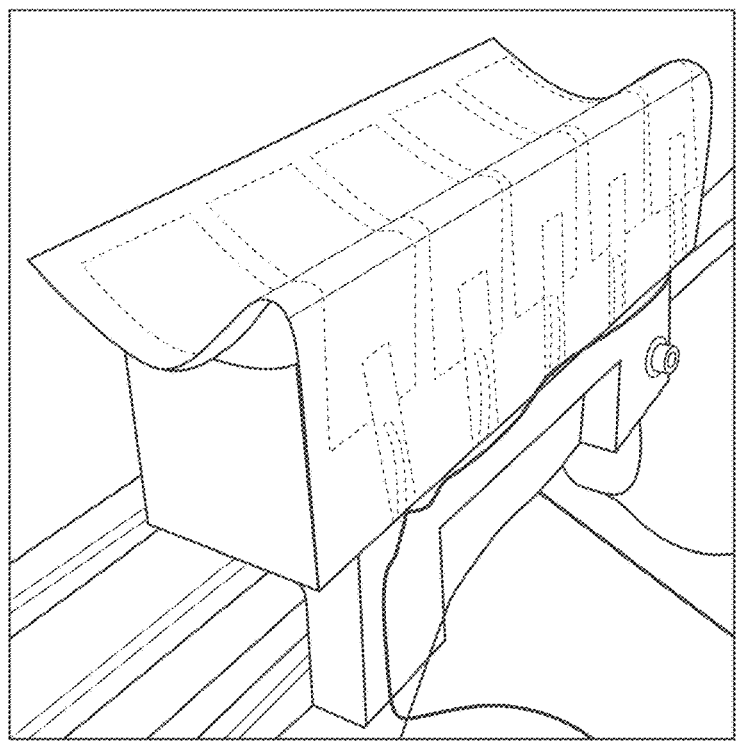
FIG. 18A-C are photographic views of the roller brake pad, with uniform electroadhesive film material, 18A, non-uniform electroadhesive film material, 18B, and foam between the electroadhesive film and fixed substrate, 18C.
Figure 18B:
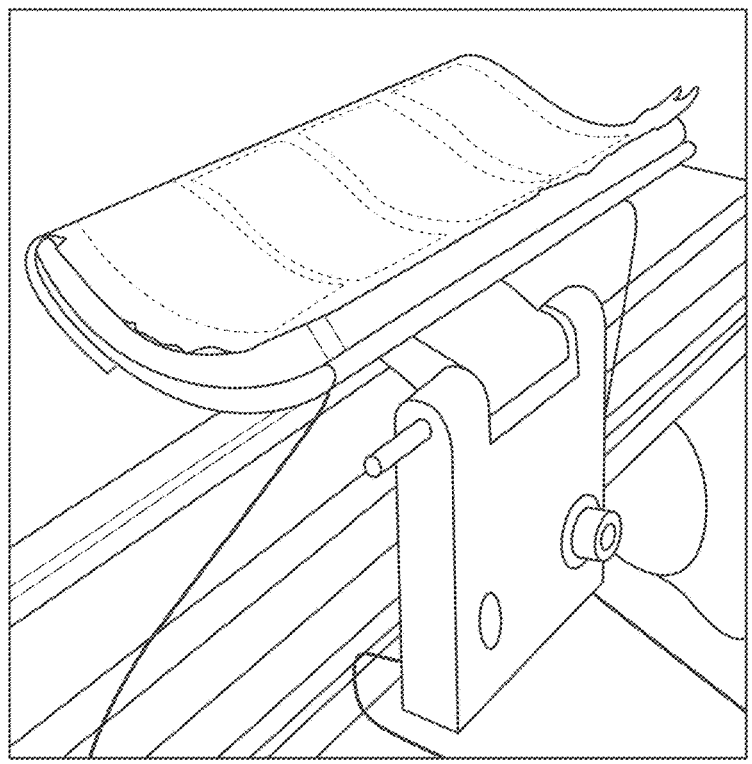
Figure 18C:
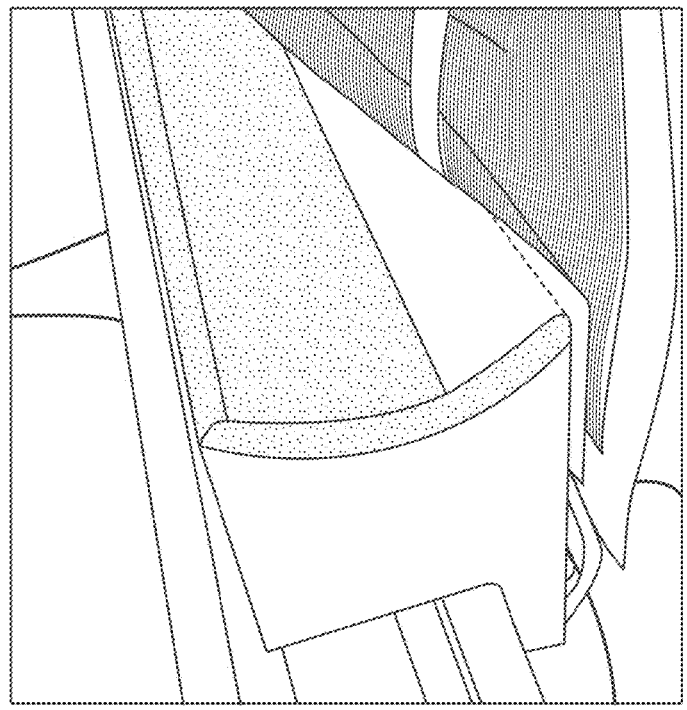
Figure 19:
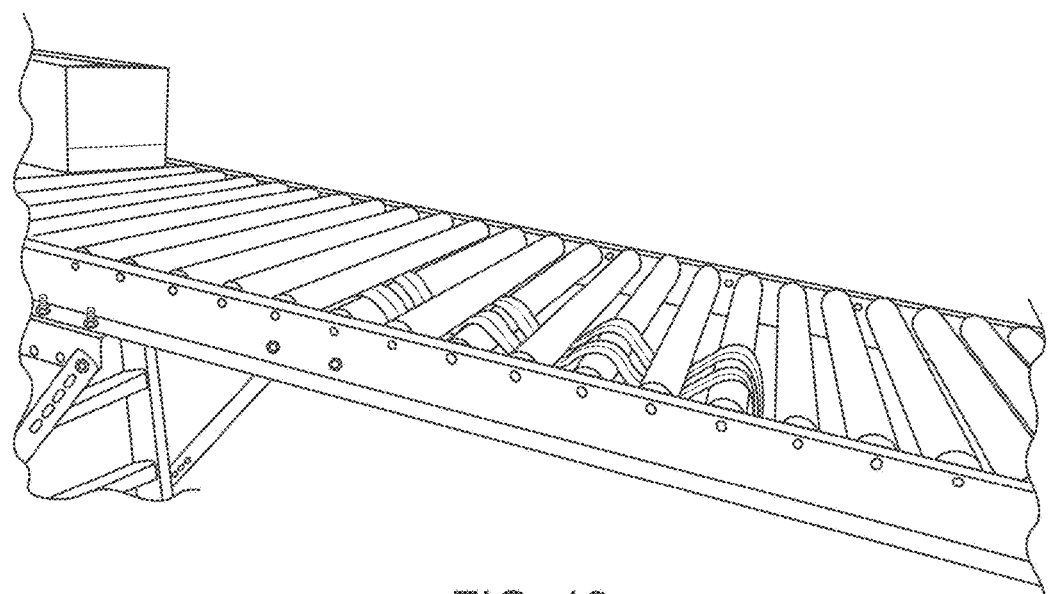
FIG. 19 is a photographic view of the electroadhesive film weaved between multiple roller brake pads.

As illustrated in FIG. 14A or FIG. 19, the electroadhesive surface is mounted directly onto one or more rollers. The electroadhesive surface is weaved between rollers. The electroadhesive surface is continuous with a curved fixed bed as in FIG. 14B or FIG. 18A. The electroadhesive surface is discontinuous with a curved fixed bed as in FIG. 14D or 18B. In some embodiments, a molded material (i.e. foam) is between the electroadhesive surface and the fixed substrate, FIG. 18C. The molded material is adjacent to a planar angled fixed bed, FIG. 14C or a different molded material is adjacent to a planar angled fixed bed, FIG. 14E. In some embodiments, illustrated on FIGS. 14C and E, the electroadhesive surface is used as an initiator to bring a high friction surface (such as a rubber or ceramic pad) in contact with the roller when the electroadhesion is energized through electrical voltage or current. When the electroadhesive surface is de-energized, the high friction surface is detached through a different electroadhesion action, or by spring return or other forms of actuation such as electromagnetic, pneumatic, piezoelectric etc.

Figure 15A:
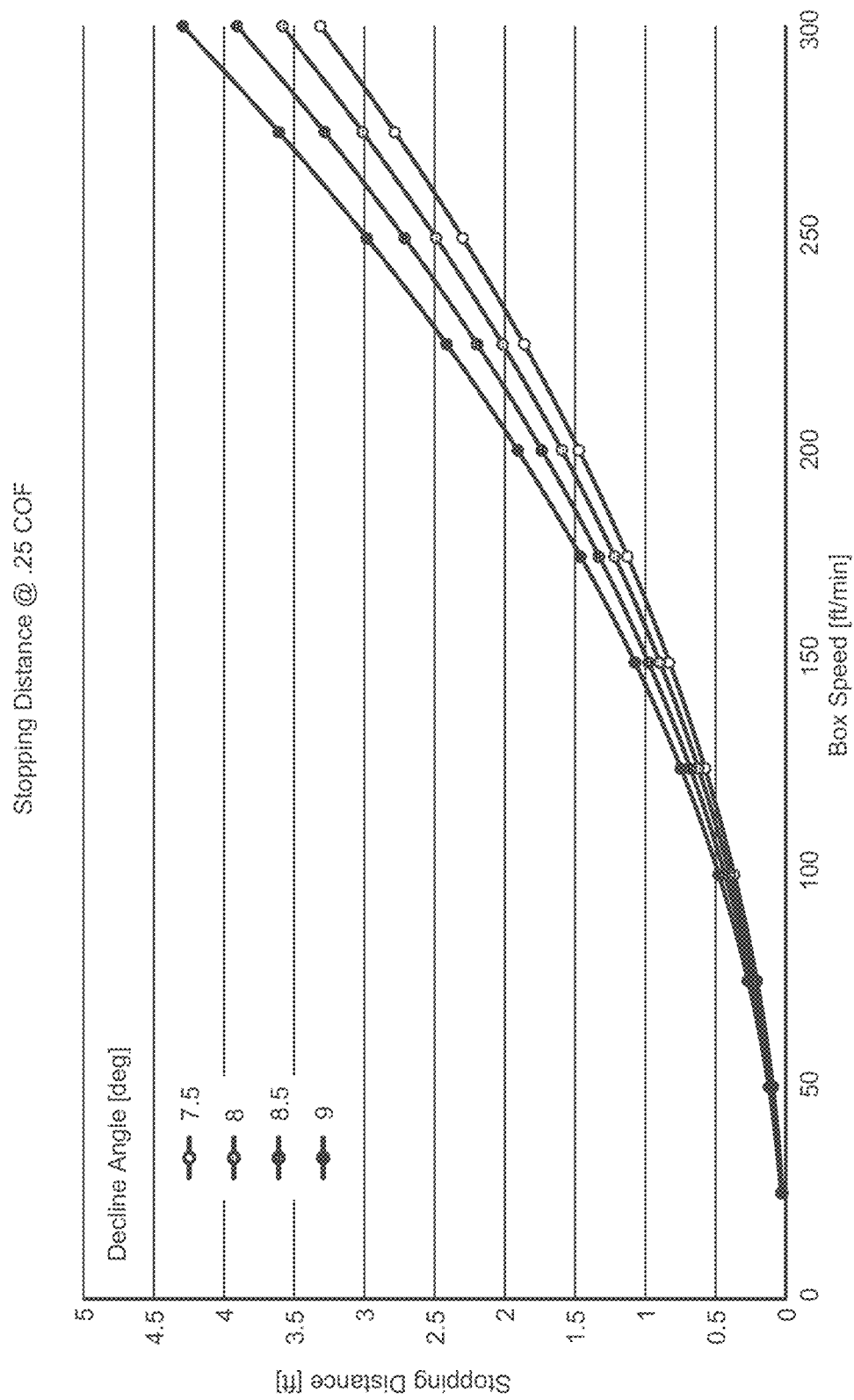
FIG. 15A is a graphical representation of moving object stopping distances in feet plotted against moving object speed in feet per minute, with the system oriented at four different angles relative to ground.
Figure 15B:
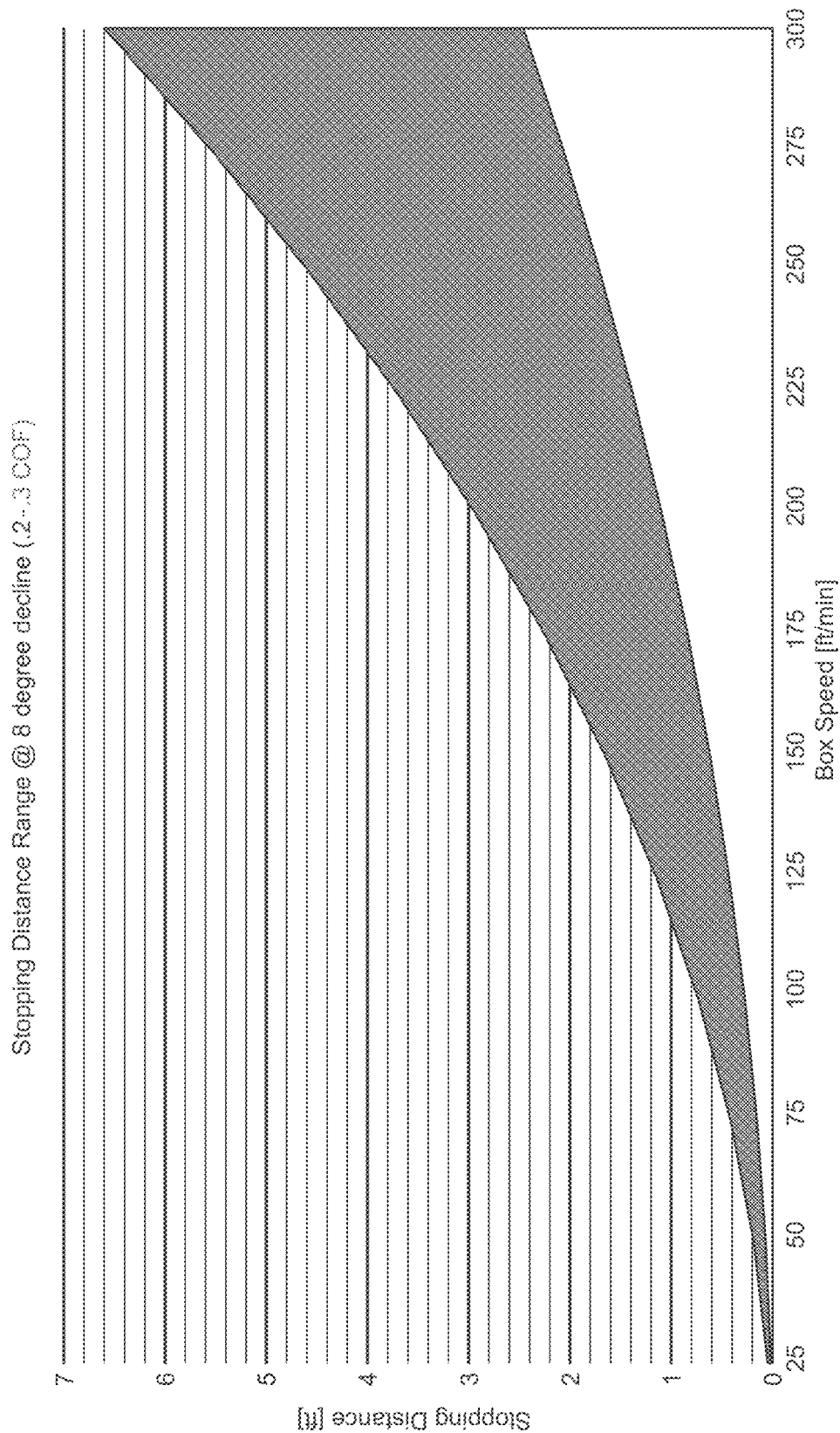
FIG. 15B is a graphical representation of moving object stopping distances in feet plotted against moving object speed in feet per minute, with the system oriented at 8 degree angle relative to ground.

As illustrated in FIG. 15A-B, the system reduces the velocity of a moving object to 0 feet per minute (ft/min) within a given distance (i.e. a stopping distance). In some embodiments, the distance in feet to reduce the velocity of the moving object to 0 ft/min is related to the moving object's speed. In some embodiments, a greater speed results in a greater distance the moving object travels before its velocity is reduced to 0 ft/min. In some embodiments, the system stops a moving object traveling at 100 ft/min in 0.5 ft. In some embodiments, the system stops a moving object traveling at 200 ft/min in about 1.5 ft to about 2 ft. In some embodiments, the system stops a moving object traveling at about 300 ft/min in about 3 ft to about 4.5 ft. In some embodiments, the velocity of the moving object of about 100 feet per minute (ft/min) is decreased by 100% in about 5 inches. In some embodiments, the velocity of the moving object of about 200 ft/min is decreased by 100% in about 20 inches. In some embodiments, the velocity of the moving object of about 300 ft/min is decreased by 100% in about 44 inches. In some embodiments, the movable substrate is at approximately 0 ft/min and needs to be imparted motion by "locking" it to an external object so that it attains a velocity of about 30 ft/min.

In some embodiments, the angle of the system relative to ground influences the stopping distance. In some embodiments, a greater angle between the system and ground results in longer stopping distances for moving objects traveling at speeds greater than about 150 ft/min. In some embodiments, the angle is about 7.5 degrees, 8 degrees, 8.5 degrees, 9 degrees, 9.5 degrees, or about 10 degrees. In some embodiments, the angle is between about 6 degrees and about 15 degrees. In some embodiments, the angle is between about 7 degrees and about 10 degrees. In some embodiments, the system is oriented 90 degrees relative to the ground.

In some embodiments, the velocity of the moving object is decreased by at least about 10%, 15%, 20%, 25%, 30%, 35%, 40%, 45%, 50%, 55%, 60%, 65%, 70%, 75%, 80%, 85%, 90% or about 95%. In some embodiments, the velocity of the moving object is decreased by at least about 10%. In some embodiments, the velocity of the moving object is decreased by at least about 25%. In some embodiments, the velocity of the moving object is decreased by at least about 50%. In some embodiments, the velocity of the moving object is decreased by at least about 75%. In some embodiments, the velocity of the moving object is decreased by 100%.

Figure 16:
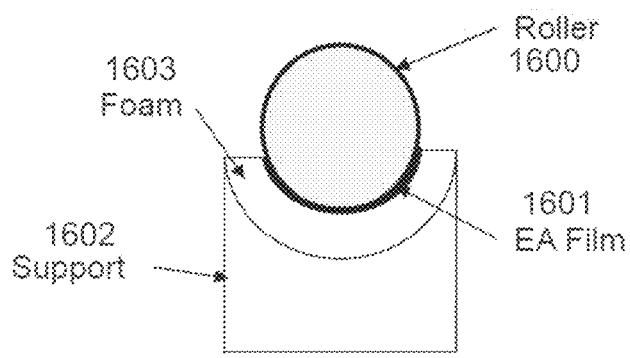
FIG. 16 is an illustrative view of a roller brake pad.
Figure 17A:
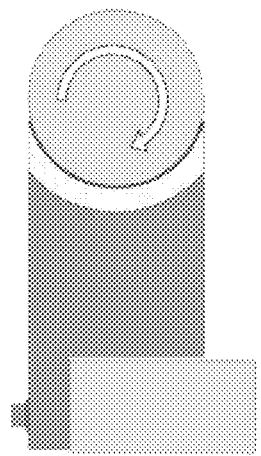
FIG. 17A-D are illustrative views of roller brake pad designs.
Figure 17B:
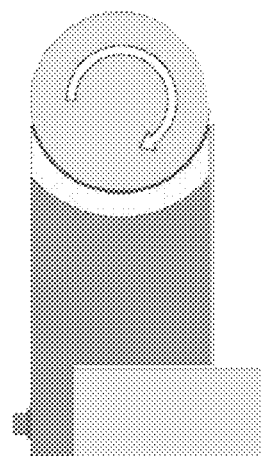
Figure 17C:
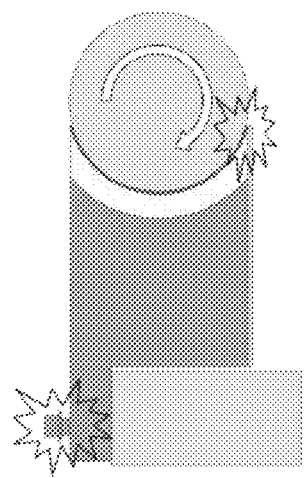
Figure 17D:
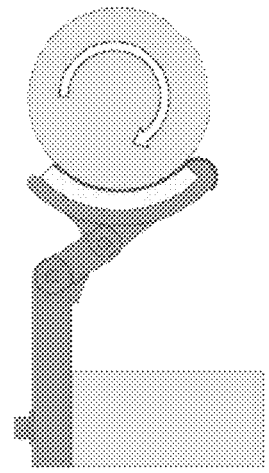

As illustrated in FIG. 16, an electroadhesive surface 1601 (i.e. electroadhesive film) is positioned between a movable substrate 1600 (i.e. roller) and a fixed substrate 1602 (i.e. fixed bed or braking housing). In some embodiments, a molded material (i.e. foam) 1603 is positioned between the electroadhesive surface and the support.

In some embodiments, the molded material (i.e. foam) is bonded to the electroadhesive surface. In this embodiment, a tangential force of between about 0.8 pounds per square inch (lbs/in$^2$) and about 1.2 lbs/in$^2$ is exerted on the moving object without the electroadhesive surface. In this embodiment, a tangential force of between about 2 lbs/in$^2$ and about 2.5 lbs/in$^2$ is exerted on the moving object with the electroadhesive surface. In some embodiments, the tangential force per unit area is between about 0.1 and about 1 lbs/in$^2$. In some embodiments, the tangential force exerted on the moving object is greater with the electroadhesive surface. In some embodiments, the tangential force is a frictional force.

In some embodiments, the molded material (i.e. foam) is adjacent to the electroadhesive surface. In this embodiment, a tangential force of between about 0.1 lbs/in$^2$ to about 0.4 lbs/in$^2$ is exerted on the moving object without the electroadhesive surface. In this embodiment, a tangential force of between about 2 lbs/in$^2$ and about 2.8 lbs/in$^2$ is exerted on the moving object with the electroadhesive surface. In some embodiments, the tangential force is a frictional force. In some embodiments, the tangential force changes the shape of the molded material (i.e. foam). In some embodiments, a molded material (i.e. foam) with a changed shape reduces the contact area between the electroadhesive surface and the movable substrate.

As illustrated in FIG. 17, the molded material (i.e. foam) is bonded to the electroadhesive surface, 17A. In this embodiment, a tangential force of between about 0.9 lbs/in$^2$ and about 1.2 pounds per square inch (lbs/inch$^2$) is exerted on the moving object. In some embodiments, the molded material (i.e. foam) is adjacent to the electroadhesive surface and a plastic insert is added to one or more sides of the fixed substrate, 17B. In this embodiment, the contact area between the electroadhesive surface and the movable surface is increased. In this embodiment, a tangential force of between about 0.16 lbs/in$^2$ and about 0.18 lbs/in$^2$ is exerted on the moving object. In some embodiments, the molded material (i.e. foam) is adjacent to the electroadhesive surface, the plastic insert is added to one or more sides of the fixed substrate, and one or more mounting bolts is loosened, 17C. In this embodiment, a tangential force of between about 0.2 lbs/in$^2$ and about 0.25 lbs/in$^2$ is exerted on the moving object. In some embodiments, the tangential force per unit area is between about 0.1 and about 1 lbs/in$^2$. In some embodiments, the molded material (i.e. foam) is adjacent to the electroadhesive surface, a plastic insert is added to one or more sides of the fixed substrate, one or more mounting bolts is loosened, and the fixed substrate is formed as a lever, 17D. In this embodiment, a tangential force of between about 0.2 lbs/in$^2$ and about 0.25 lbs/in$^2$ is exerted on the moving object.

In some embodiments, electrical activation and de-activation enables electroadhesive adhesion and detachment. In some embodiments, the voltage of activation is between about 100 Volts (V) and about 1000 V. In some embodiments, the voltage of activation is between about 500 V and about 3000 V. In some embodiments, the voltage of activation is between about 500 V and about 6000 V. In some embodiments, the voltage of activation is about 100V, 200V, 300V, 400V, 500V, 600V, 700V, 800V, 900V, 1000V, 1200V, 1400V, 1600V, 1800V, 2000V, 2200V, 2400V, 2600V, 2800V, 3000V, 3200V, 3400V, 3600V, 4000V, 4200V, 4400V, 4600V, 4800V, 5000V, 5200V, 5400V, 5600V, 5800V, or 6000V.

Figures 20A, 20B:
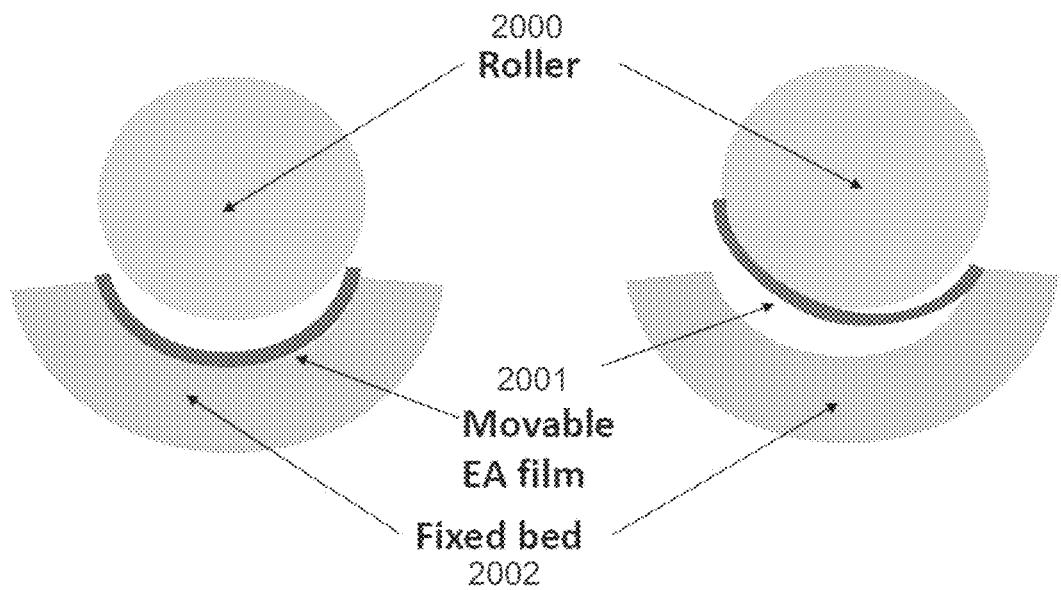
FIG. 20A-B illustrates the roller free operating state, 20A and the roller locked operating state, 20B.

As illustrated in FIG. 20, a movable substrate 2000 (i.e. a brake roller) alternates between a free movement operating state, 20A and a locked movement operating state, 20B. The movable substrate contacts an electroadhesive surface 2001 (i.e. an electroadhesive film) in the locked movement operating state. The electroadhesive surface 2001 contacts the fixed substrate 2002 (i.e. fixed bed) in the free movement operating state.

Figures 21A, 21B:
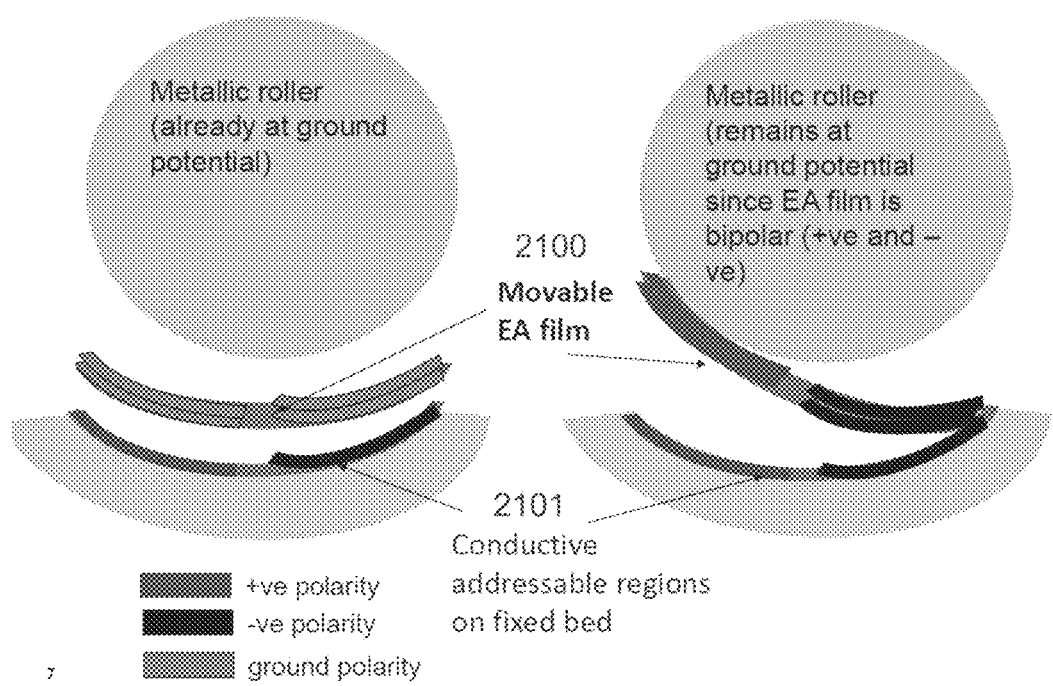
FIG. 21A-B illustrates the electrostatic potential of the roller, the electroadhesive film, and the fixed substrate in two different operating states, the roller free operating state, 21A and the roller locked operating state, 21B.
Figure 22A:
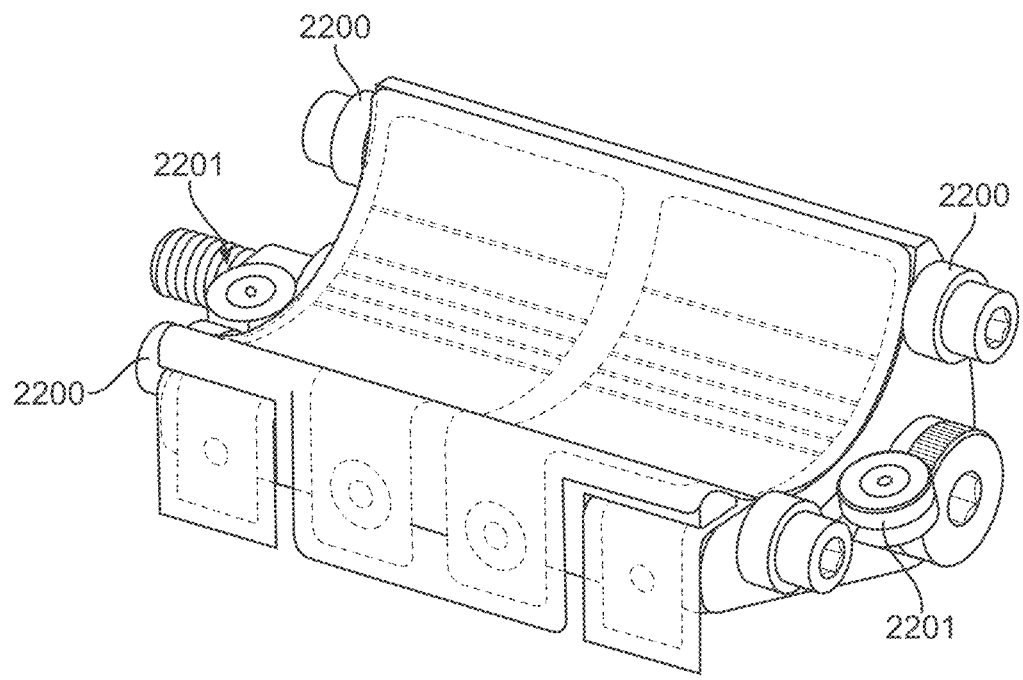
FIG. 22A-D are photographic views of the magnetic roller braking alignment, 22A, the free floating mounting, 22B, the connections to the electroadhesive film, 22C, and the electrical connections, 22D.
Figure 22B:
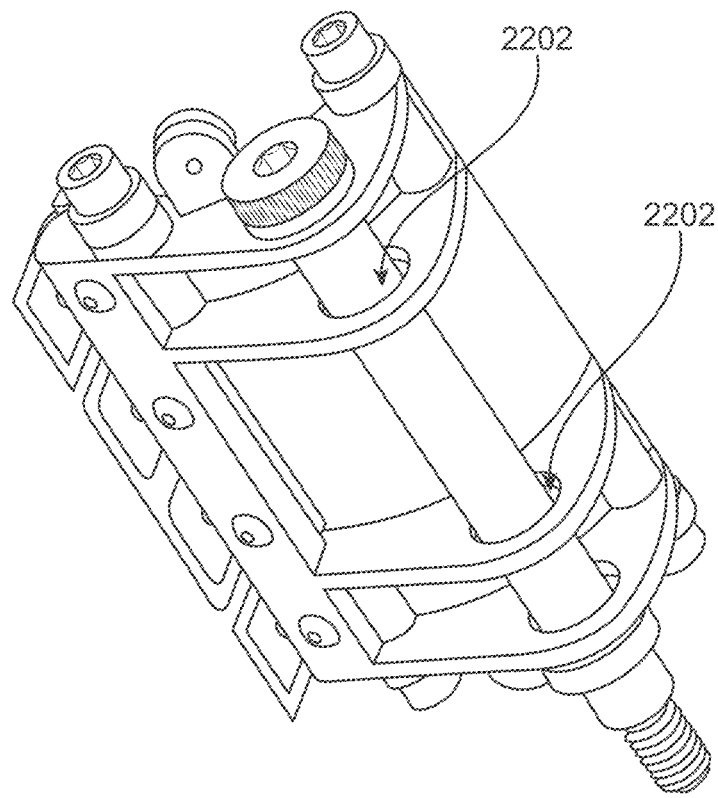
Figure 22C:
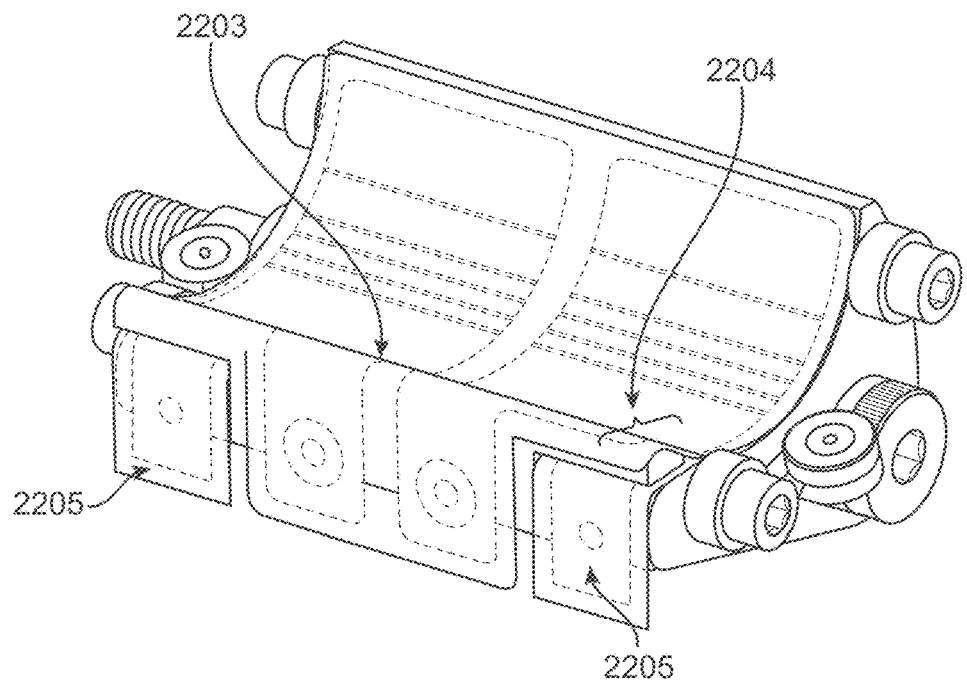
Figure 22D:
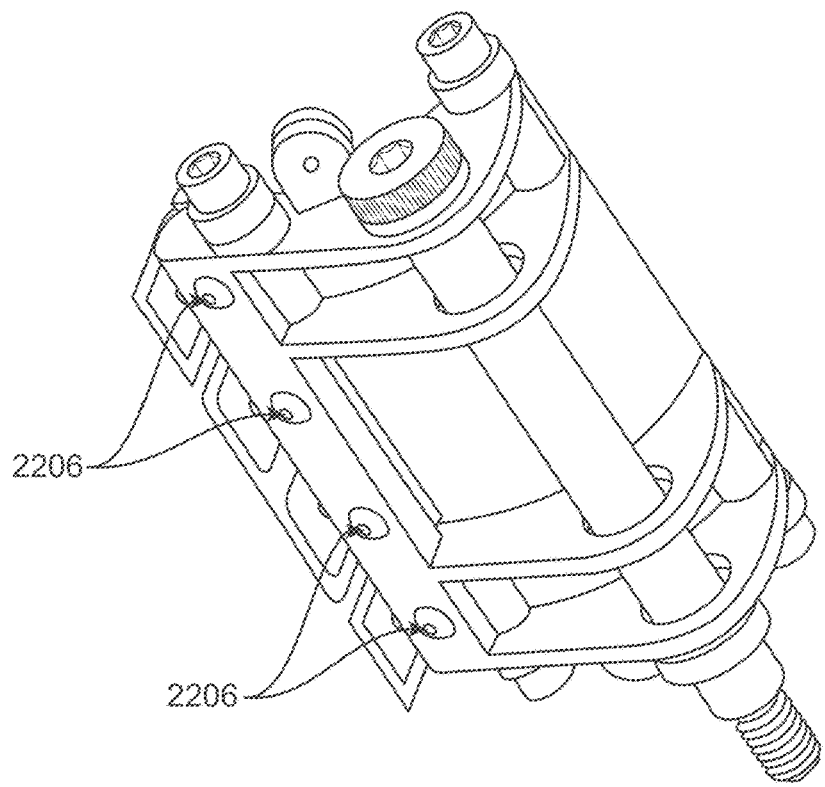

As illustrated in FIG. 21, a movable substrate (i.e. metallic brake roller) has ground potential in the free movement operating state, 21A. The movable substrate has ground potential in the locked movement operating state. The system further comprises a ground brush. The fixed substrate 2101 (i.e. a fixed bed or brake housing) has a non-homogenous polarity in the free movement operating state. The fixed substrate 2101 has a non-homogenous polarity in the locked movement state. The electroadhesive surface 2100 (i.e. an electroadhesive film) has a ground potential in the free movement operating state. The electroadhesive surface 2100 has a non-homogenous polarity in a locked movement operating state. In some embodiments, the non-homogenous polarity comprises positive and negative polarity. In some embodiments, the fixed substrate or electroadhesive surface comprise regions of non-homogenous polarity. In some embodiments, the fixed substrate or electroadhesive surface comprise one or more regions of positive polarity and one or more regions of negative polarity.

In some embodiments, the fixed substrate has an electrostatic potential that is different from the electrostatic potential of the movable substrate. In some embodiments, the electroadhesive surface shifts between a same electrostatic potential as the movable substrate and a different electrostatic potential as the movable substrate. In some embodiments, the electroadhesive surface shifts one or more times between a same electrostatic potential as the movable substrate and a different electrostatic potential as the movable substrate. In some embodiments, the electroadhesive surface shifts between electrostatic attraction to the fixed substrate and electrostatic attraction to the movable substrate. In some embodiments, the shifting is controlled by a power supply. In some embodiments, a sensor determines the shifting. In some embodiments, the shifting occurs once. In some embodiments, the shifting occurs one or more times.

In some embodiments, a velocity of the movable substrate is controlled by electroadhesion to an electroadhesive surface. In some embodiments, the velocity of the movable substrate is 0 feet per minute (ft/min) in the locked movement operating state. In some embodiments, the velocity of the movable substrate is above 0 ft/min in the free movement operating state. In some embodiments, the shifting one or more times between the two operating states decreases the velocity of the movable substrate. In some embodiments, the velocity of the movable substrate is decreased by about 5%, 10%, 15%, 20%, 25%, 30%, 35%, 40%, 45%, 50%, 55%, 60%, 65%, 70%, 75%, 80%, 85%, 90%, or 95%. In some embodiments, the velocity of the movable substrate is decreased by at least about 5%, 10%, 15%, 20%, 25%, 30%, 35%, 40%, 45%, 50%, 55%, 60%, 65%, 70%, 75%, 80%, 85%, 90%, or 95%. In some embodiments, the velocity of the movable substrate is decreased by 100%. In some embodiments, the velocity of the movable substrate is decreased by 100%. In some embodiments, the movable substrate is stationary and needs to be imparted motion by "locking" it to an external object that contains the electroadhesive surfaces. In some embodiments, the movable substrate is stationary and needs to be imparted motion by "locking" it to an external object that contains the electroadhesive surfaces. In some embodiments, the fixed substrate is at rest. In some embodiments, the velocity of the movable substrate is increased. In some embodiments, the velocity of the movable substrate is decreased. In some embodiments, the velocity of the movable substrate is increased or decreased as needed. In some embodiments, the velocity of the movable substrate is increased or decreased intermittently. In some embodiments, the velocity of the movable substrate is increased or decreased on-demand.

In some embodiments, the movable substrate is a planar substrate. In some embodiments, the movable substrate is a curved movable substrate. In some embodiments, the movable substrate is a roller (i.e. brake roller or metallic roller). In some embodiments, the fixed substrate is a planar fixed substrate. In some embodiments, the fixed substrate is a curved fixed substrate. In some embodiments, the fixed substrate is a fixed bed or cupped brake housing. In some embodiments, the fixed substrate comprises one or more electrostatic conductive regions.

In some embodiments, the system comprises two substrates or more and an electroadhesive surface. In some embodiments, the first substrate is mechanically separate from the second substrate. In some embodiments, the electroadhesive surface is partially attached to the second substrate. In some embodiments, a surface area of the electroadhesive surface is attached to the second substrate. In some embodiments, a surface area of the electroadhesive surface is adjacent to the second substrate. In some embodiments, a surface area of the electroadhesive surface is contacted to the second substrate. In some embodiments, the surface area is a portion of the electroadhesive surface area. In some embodiments, the surface area is the entire electroadhesive surface area. The first substrate has an electrostatic potential that is different from an electrostatic potential of the second substrate. The electroadhesive surface shifts between electrostatic attraction to the first substrate and electrostatic attraction to the second substrate. In some embodiments, the electroadhesive surface moves independently from the first substrate during the electrostatic attraction to the second substrate. In some embodiments, a portion of the electroadhesive surface moves independently from the first substrate during the electrostatic attraction to the second substrate. In some embodiments, the velocity of the first substrate is controlled by electroadhesion to the electroadhesive surface and the velocity of the second substrate. In some embodiments, the second substrate is at rest. In some embodiments, the velocity of the first substrate is decreased intermittently. In some embodiments, the velocity of the second substrate is increased. In some embodiments, the velocity of the second substrate is decreased. In some embodiments, the velocity of the second substrate is increased or decreased. In some embodiments, the velocity of the second substrate is increased or decreased as needed. In some embodiments, the velocity of the second substrate is increased or decreased intermittently. In some embodiments, the velocity of the second substrate is increased or decreased on demand.

In some aspects of the invention, the system comprises a fixed electroadhesive surface, a movable electroadhesive surface, and a substrate. In some embodiments, the movable electroadhesive surface is physically or mechanically attached to the fixed electroadhesive surface. In some embodiments, the movable electroadhesive surface is physically or mechanically attached in only a few specific places when no power is provided. In some embodiments, the motion of the substrate is controlled. In some embodiments, the fixed electroadhesive surface has an electrostatic potential that is different from an electrostatic potential of the movable substrate. In some embodiments, the electrostatic potential of the movable electroadhesive surface shifts between a first state and a second state. In some embodiments, the first state has the same potential as the substrate and a different electrostatic potential as the fixed electroadhesive surface. In some embodiments, the first state has the same potential as the fixed electroadhesive surface and a different electrostatic potential as the substrate. In some embodiments, the velocity of the movable substrate is controlled by electroadhesion to the movable electroadhesive surface between the first state and the second state. In the first state, the movable surface preferentially adheres to the fixed electroadhesive surface and away from the moving substrate. In this embodiment, the moving surface continues moving unimpeded. In the second state, the movable surface preferentially adheres to the moving substrate and not to the fixed electroadhesive surface. In this embodiment, the velocity or motion of the movable substrate is controlled. In this embodiment, the movable surface has certain points of mechanical attachment to the fixed electroadhesive surface.

Figure 27A:
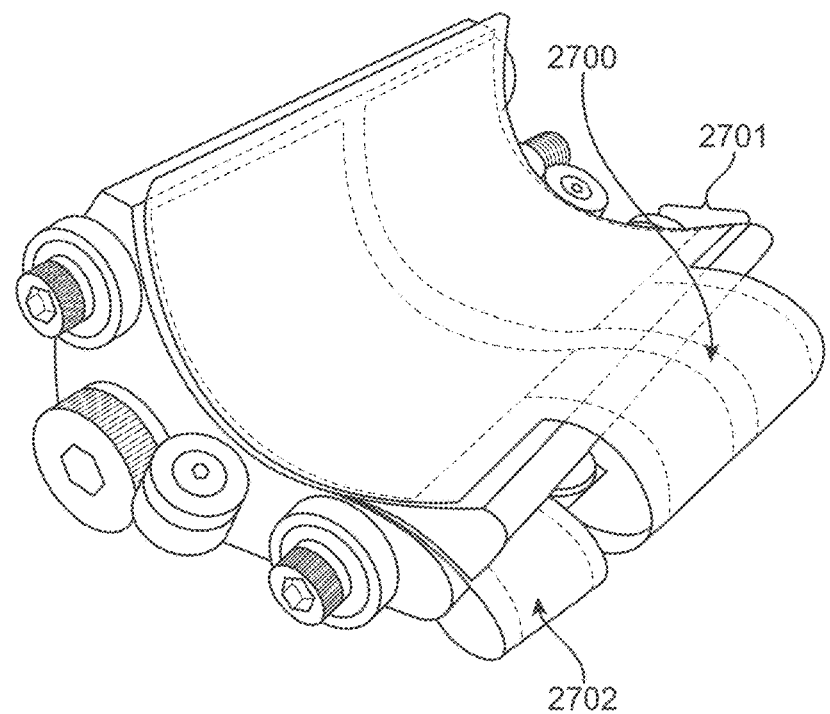
FIG. 27A-B are photographic views of electroadhesive film attachments to the roller and brake housing, 27A and electrical connections, 27B.
Figure 27B:
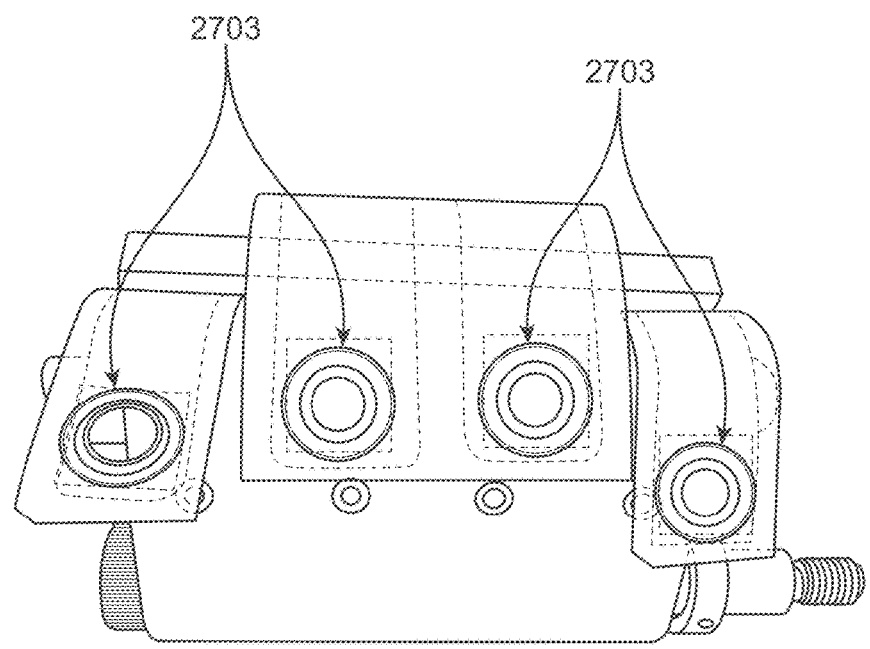
Figure 29A:
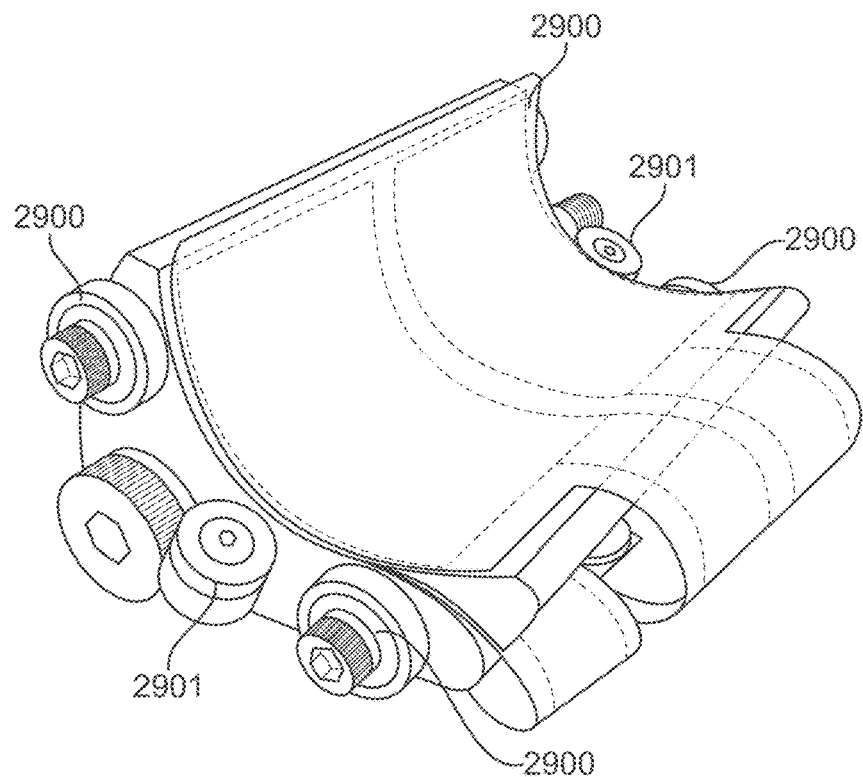
FIG. 29A-B are photographic views of roller spacing and magnetic roller braking alignment, 29A and free floating mounting, 29B.
Figure 29B:
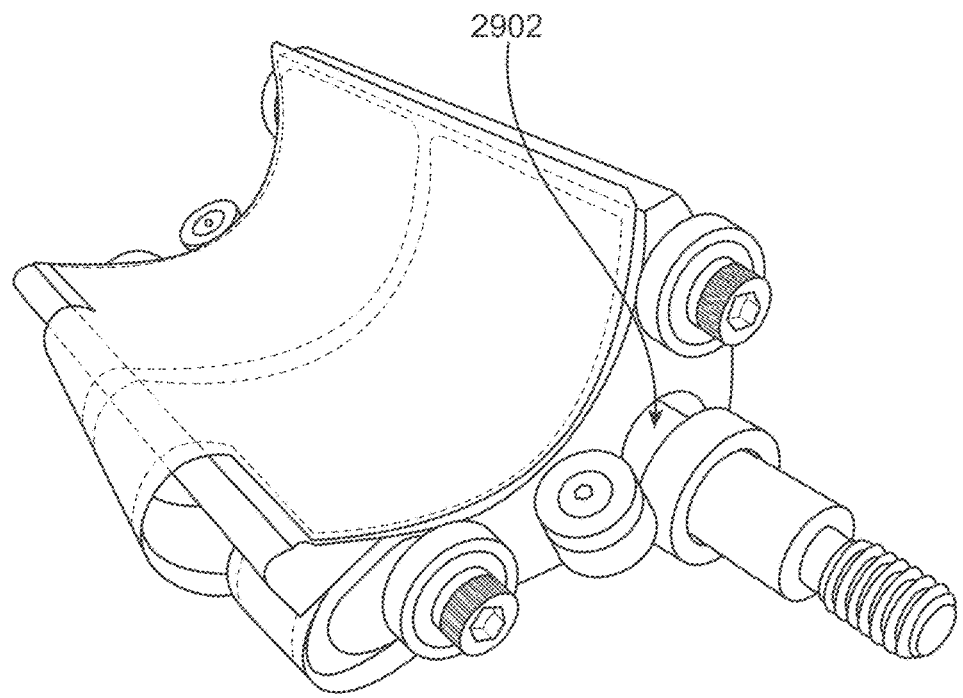

As illustrated in FIG. 22, FIG. 27 and FIG. 29, a roller braking design comprises one or more bearings 2200 or 2900. In some embodiments, the system further comprises one or more bearings to ensure smooth rotation of the movable rollers. In some embodiments, bearings are low friction bearings. One or more bearings 2200 contact one or more movable substrates (i.e. roller) to provide a physical distance between the electroadhesive surface and the movable substrate. The physical distance is about 1 millimeter. The physical distance is about 0.5 millimeters to about 2 millimeters. In some embodiments, a roller braking design comprises one or more magnets 2201 or 2901. In some embodiments, the one or more magnets are high-powered magnets. In some embodiments, the one or more magnets provide a force. The force is an attractive force. The force is a repulsive force. In some embodiments, one or more magnets, 2201, provide a force to attract one or more brakes to one or more movable substrates. One or more magnets provide a force to contact the one or more bearings to the one or more movable substrates. In some embodiments, a roller braking design comprises a mounting, 2202 or 2902. In some embodiments, the mounting is a free floating mounting. In some embodiments, the mounting accommodates mounting tolerance. In some embodiments, the mounting tolerates inconsistencies in brake and roller design (i.e. roller length, roller diameter). In some embodiments, the electroadhesive surface comprises one or more electroadhesive films. In some embodiments, the electroadhesive surface comprises a top electroadhesive film, 2203 or 2700. In some embodiments, the electroadhesive surface comprises a bottom electroadhesive film, 2205 or 2702. The top electroadhesive film, 2203 comprises one side for contacting a roller and one side for contacting a brake. The bottom electroadhesive film, 2205 comprises one side for contacting the top electroadhesive film. The bottom electroadhesive film is mounted to the fixed bed (i.e. brake housing). The top electroadhesive film is mounted to the fixed bed (i.e. brake housing) at a top rounded edge, 2204 or 2701. One or more electroadhesive films is connected to each other. The connections are electrical connections. One or more electroadhesive films connect at terminals, 2206 or 2703.

Figure 23:
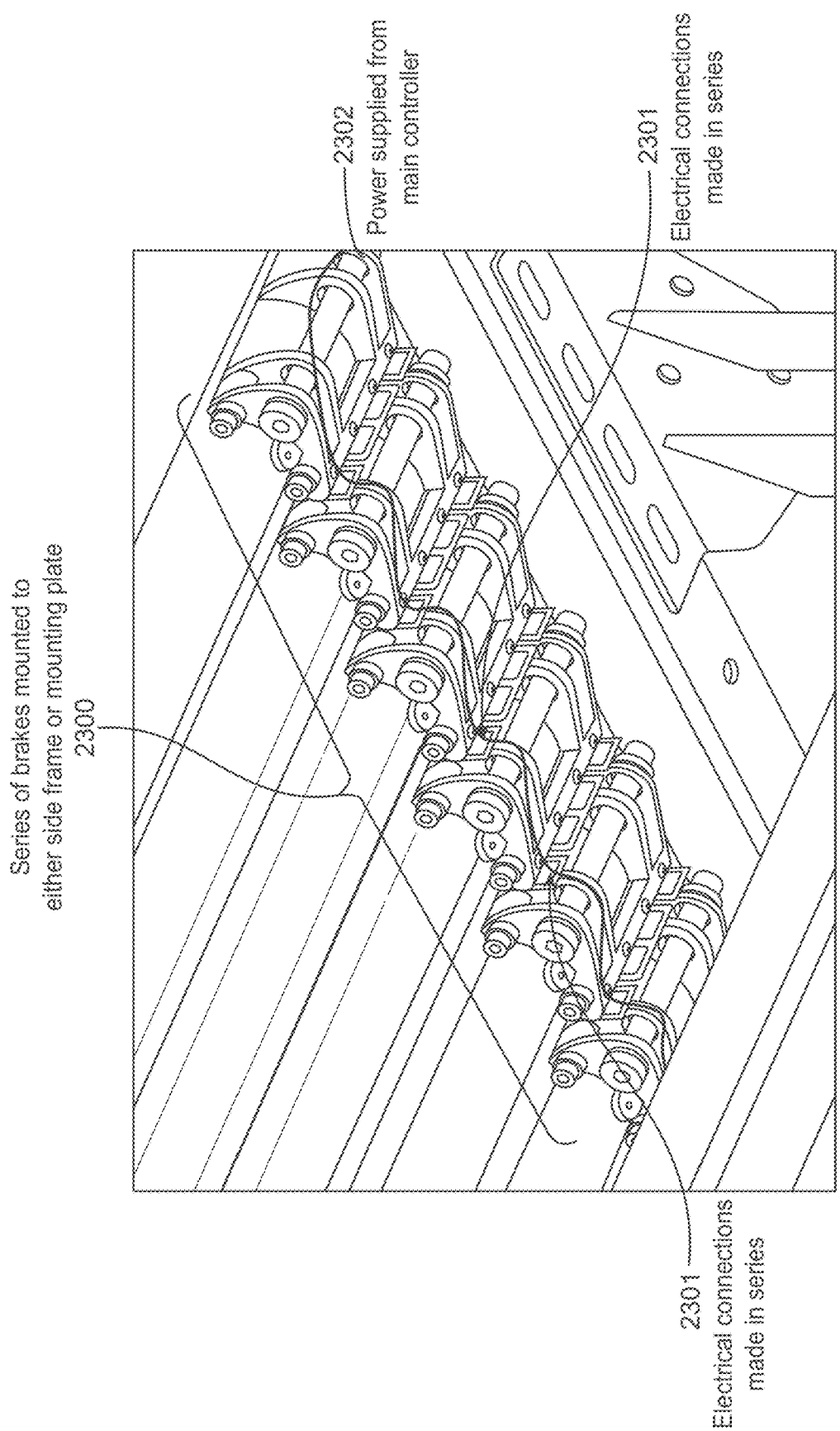
FIG. 23 is a photographic view of the series of brakes, electrical connections and power supply.
Figure 25:
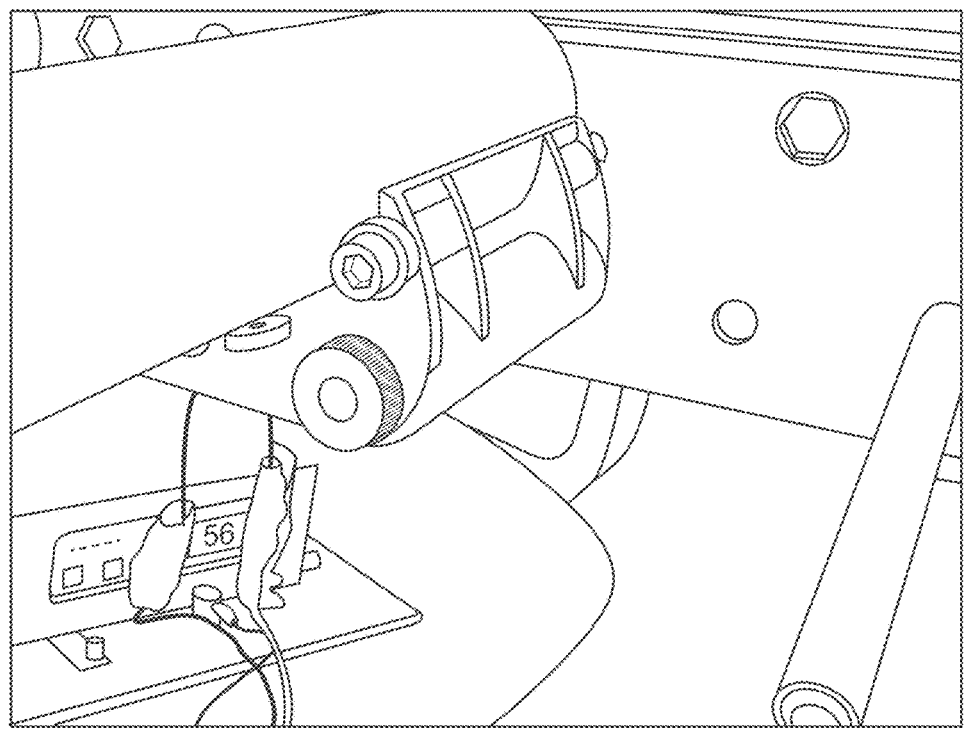
FIG. 25 is a photographic view of the roller brake pad mounted underneath a metal roller.
Figure 30:
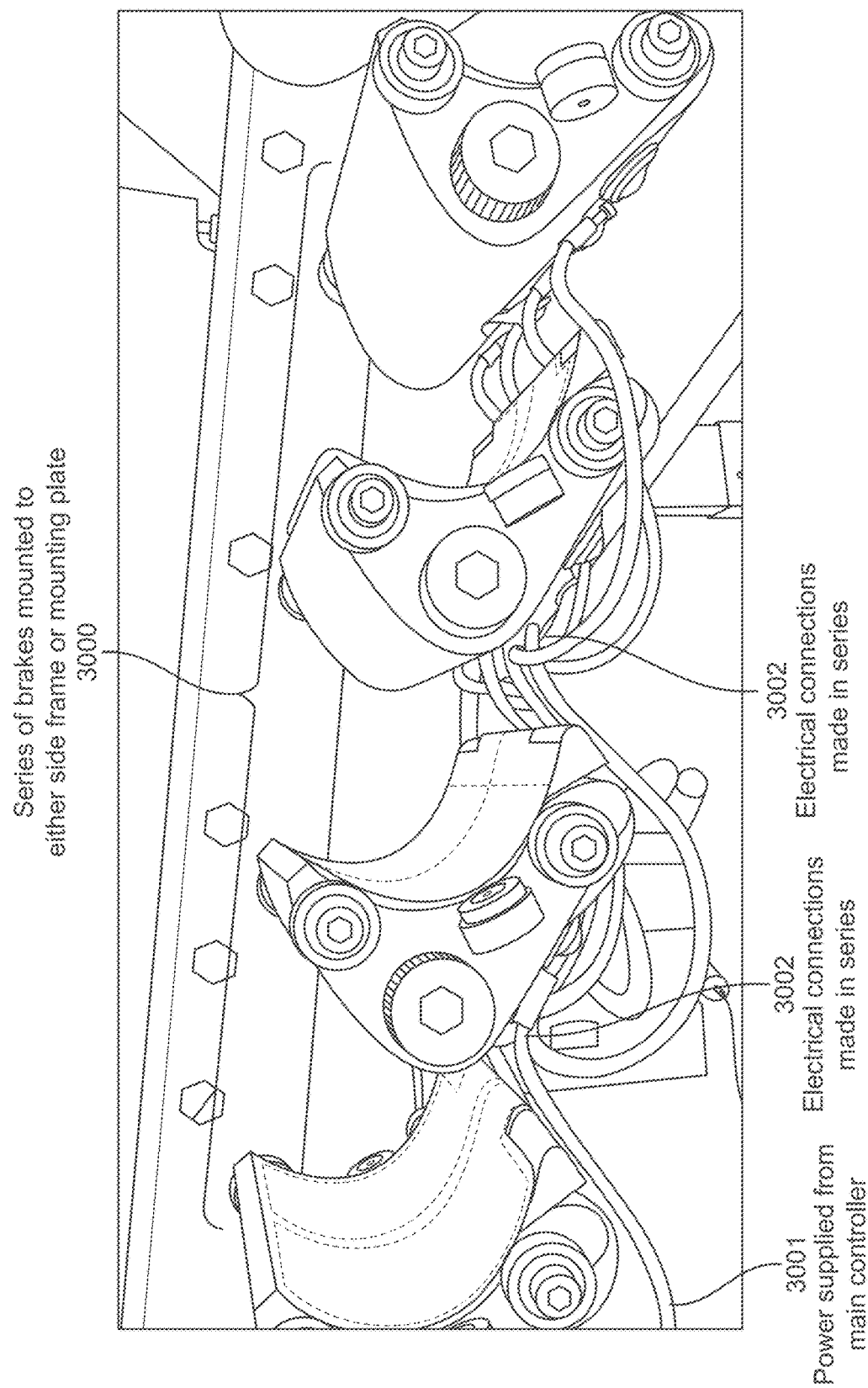
FIG. 30 is a photographic view the roller braking system mounted to a conveyer system.

As illustrated in FIG. 23 and FIG. 30, one or more brakes are mounted in series, 2300 or 3000. They can be electrically connected in series or in parallel. Brakes are mounted to a roller conveyor frame including in some cases, a loose mounting that preserves the ability for them to move relative to the conveyor frame. Brakes can be retrofitted to a roller conveyor. Brakes are mounted underneath a roller conveyor, FIG. 25. Brakes can be mounted to a side frame. Brakes can be mounted to a mounting plate. The mounting plate houses all the series or parallel electrical connections. One or more electrical connections between one or more brakes can be made. One or more electrical connections can be made in series, 2301 or 3002. A single power supply, 2302 or 3001, from a main controller can be located at one end of the one or more brakes mounted in series. In some embodiments, more than one power supply is provided.

In some embodiments, the system comprises two or more movable substrates and two or more fixed substrates. In some embodiments, the two or more movable substrates and two or more fixed substrates are in series. In some embodiments, the two or more movable substrates and two or more fixed substrates are mounted to a roller conveyor or retrofitted to a roller conveyor. In some embodiments, the system comprises 5 or more movable substrates and 5 or more fixed substrates. In some embodiments, the system comprises 10 or more movable substrates and 10 or more fixed substrates. In some embodiments, the system comprises 15 or more movable substrates and 15 or more fixed substrates. In some embodiments, each of the two or more movable substrates self-reference to a single fixed substrate of the two or more fixed substrates.

Figure 24:
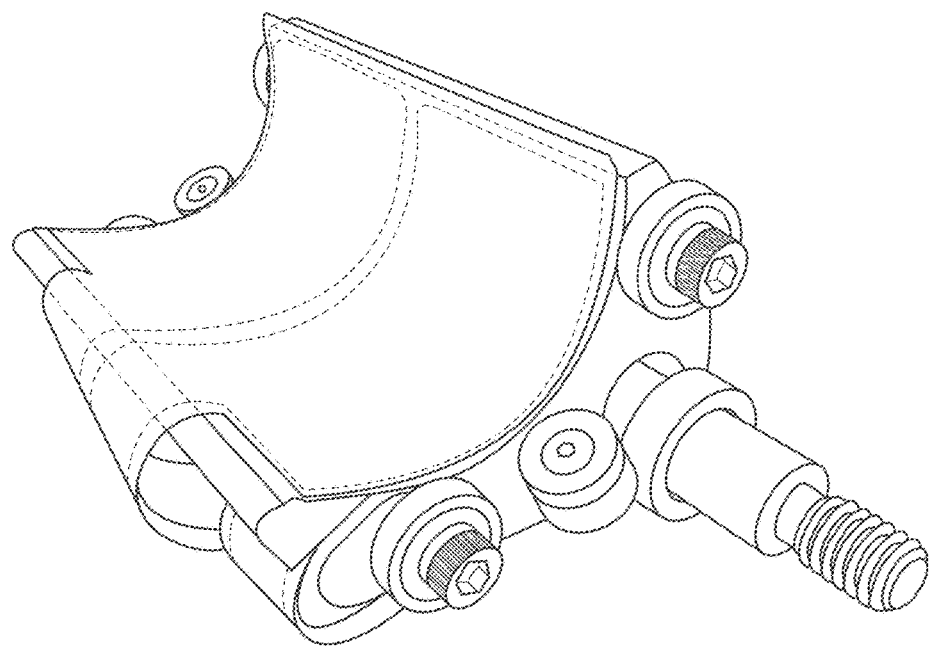
FIG. 24 is a photographic view of the dual electroadhesive film that self-aligns and adheres to each roller.

As illustrated in FIG. 24, one or more roller brakes comprise dual electroadhesive films. In some embodiments, the electroadhesive films self-align. In some embodiments, each electroadhesive film adheres to each roller brake.

Figure 26B:
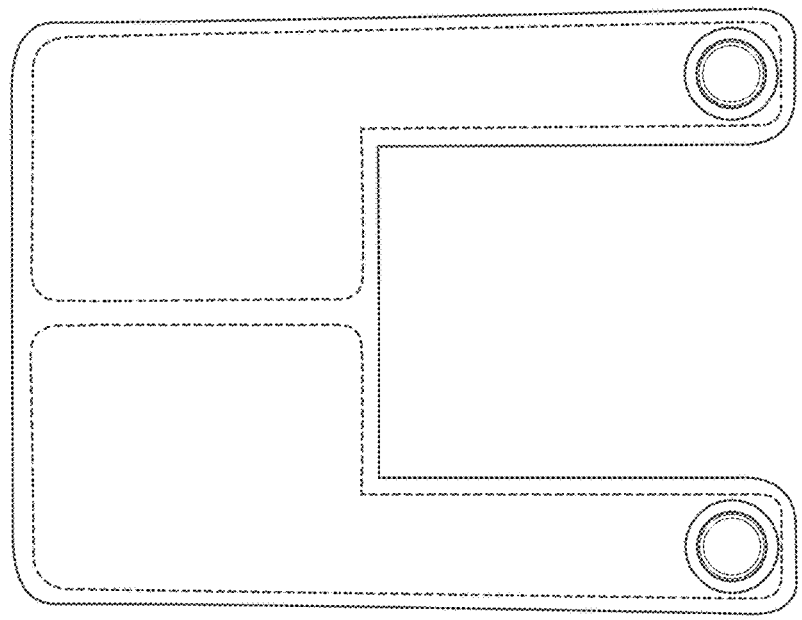
FIG. 26B is a photographic view of an electroadhesive surface with a larger distance between grommets.
Figure 26A:
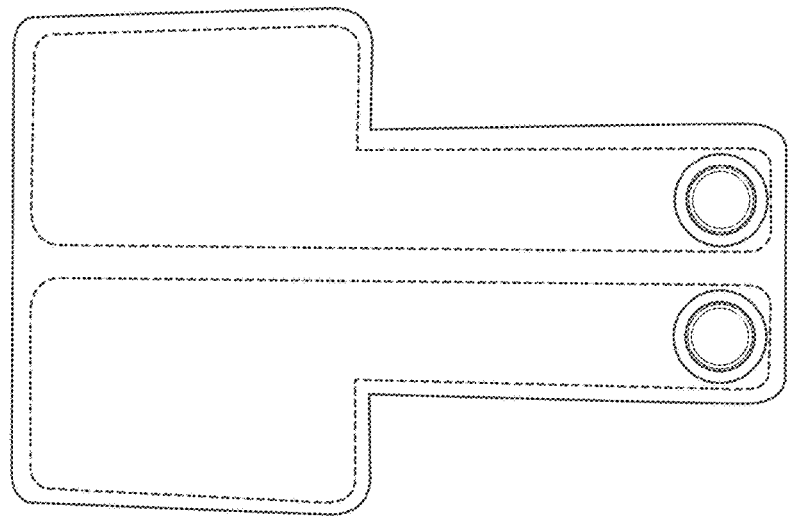
FIG. 26A is a photographic view of an electroadhesive surface with a small distance between grommets.

As illustrated in FIG. 26, the electroadhesive surface is a conductor, 2601, coated on both sides with polyurethane, 2600. In some embodiments, the polyurethane is thermoplastic polyurethane (TPU). One end of the electroadhesive surface comprises conductive tape, 2602 between a TPU and the conductor. On the same end of the electroadhesive surface comprising the conductive tape, a grommet, 2603 is mounted on the outer surface of the electroadhesive surface contacting each TPU side. In some embodiments, the one or more grommets are conductive. In some embodiments, the one or more grommets comprise teeth. In some embodiments, the conductor is flexible. In some embodiments, the conductor is adhesive to the TPU. In some embodiments, the distance between one or more grommets is less than about 1 millimeter (mm). In some embodiments, the distance between one or more grommets is between about 1 mm and about 100 mm.

As illustrated in FIG. 28, moving objects have various dimensions. In some embodiments, moving objects have dimensions shown in FIG. 28. In some embodiments, moving objects are rectangular, cubic, oval, circular, triangular, oblong, or others. In some embodiments, moving objects have a weight between about 0.5 lbs and about 50 lbs, as shown in FIG. 28. In some embodiments, moving objects have a weight greater than 50 lbs. In some embodiments, moving objects have a weight less than 1 lb.

Figure 31:
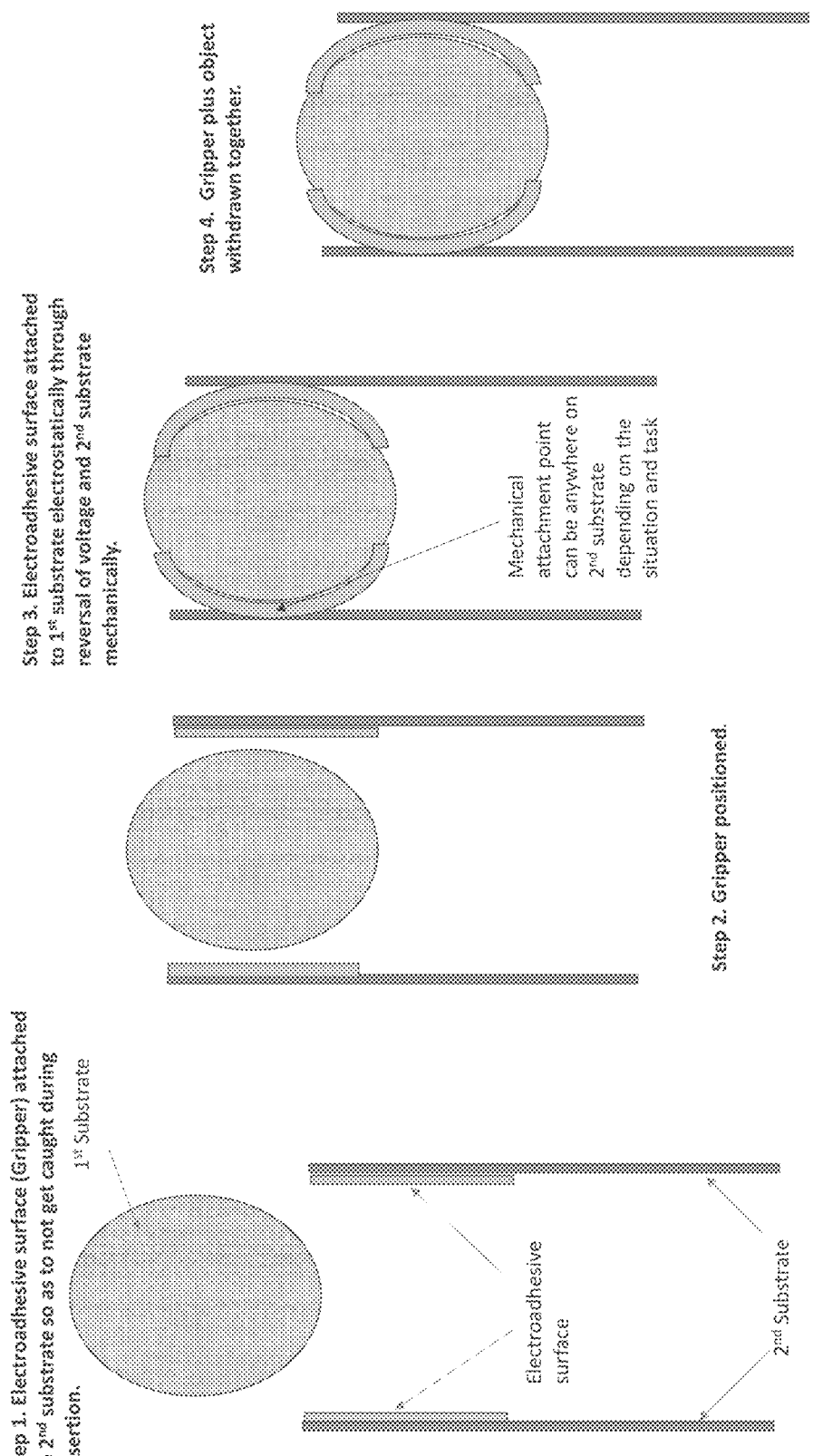
FIG. 31 is an illustration of a system utilizing electroadhesive grippers attached to substrates to capture objects in a transport system.

One additional aspect of the present invention comprises a system configured to work as a box/object gripper, as illustrated in FIG. 31. The system comprises a substrate or pair of substrates comprising a first substrate, and a second substrate that is mechanically separate from the first substrate, an electroadhesive surface only partially attached to second substrate; wherein the first substrate has an electrostatic potential that is different from an electrostatic potential of the second substrate; wherein the electroadhesive surface shifts between electrostatic attraction to the first substrate and electrostatic attraction to the second substrate; wherein at least a portion of the electroadhesive surface moves independently from the first substrate during the electrostatic attraction to the second substrate; and wherein a velocity of the first substrate is controlled by electroadhesion to the electroadhesive surface and the velocity of the second substrate. As a box or object passes through, the electroadhesive surfaces experience a reversal of voltage resulting in a mechanical attachment about the box or object. In one embodiment, the first substrate is originally substantially at rest, and the velocity of the second substrate is increased or decreased intermittently. In another embodiment the first substrate is substantially at rest, and the velocity of the second substrate is increased or decreased intermittently.

One aspect of the present invention comprises a kit. In some embodiments, the kit comprises one or more movable substrates, one or more fixed substrates, and an electroadhesive surface. The kit further comprises a ground brush. The kit further comprises a power supply. The kit further comprises one or more sensors. The kit further comprises an electroadhesive curtain. The kit further comprises one or more bearings. The kit further comprises one or more brake shoes. The kit further comprises one or more magnets or one or more springs. The kit further comprises written instructions. The kit provides a system to be retrofitted to a roller conveyor. The kit provides a system to be mounted underneath a roller conveyor. The kit provides a system to be mounted to a chute. In some embodiments, the kit is utilized in a manually operable fashion. In some embodiments, the braking system is mounted only on one or both sides of two side-by side rollers in order to selectively arrest one or the other half banks individually.

One aspect of the present invention comprises a method of exerting force on two or more objects. In some embodiments, the method comprises generating an electrostatic potential difference between an electroadhesive surface and a first object (i.e. a shipping box) and changing the electrostatic potential of the electroadhesive surface to generate a second force on the first object and a first force on a second object (i.e. another shipping box). In some embodiments, the changing is repeated one or more times to exert two or more forces on two or more objects. In some embodiments, the method is used to place an object on a surface (i.e. a shelf) followed by placing a second object on the surface. In some embodiments, the method is used to guide objects. In some embodiments, the method is used to guide the movement of a moving object. In some embodiments, the method is used to guide the movement of a shipping box on a roller conveyor system or chute system. In these embodiments, the movable substrate (i.e. roller) is separated into one or more sub-rollers. The sub-rollers move independently from one another. In some embodiments, the system is used as a braking device in a movable toy (i.e. toy car). In some embodiments, the movable toy is manually-propelled, self-propelled, or battery operated.

One aspect of the present invention comprises a system comprising: an electroadhesive surface comprising one or more electrodes; and a controller configured to meter flow of an object on-demand by applying a voltage to the one or more electrodes when the object is in a proximity to the electroadhesive surface.

One aspect of the present invention comprises a system comprising: an electroadhesive surface including one or more electrodes; and a controller configured to meter flow of an object on-demand by applying a voltage to the one or more electrodes when the object is in a proximity to the electroadhesive surface.

One aspect of the present invention comprises a system comprising: an electroadhesive surface comprising one or more electrodes; a processor comprising flow control instructions and electroadhesive surface instructions based on the flow control instructions; and a controller configured to meter the flow of a plurality of objects by applying a voltage to the one or more electrodes when a first object of the plurality of objects is in contact with the electroadhesive surface based on instruction from the processor.

One aspect of the present invention comprises a system comprising: an electroadhesive surface including one or more electrodes; a processor comprising flow control instructions and electroadhesive surface instructions based on the flow control instructions; and a controller configured to meter the flow of a plurality of objects by applying a voltage to the one or more electrodes when a first object of the plurality of objects is in contact with the electroadhesive surface based on instruction from the processor.

One aspect of the present invention comprises a system comprising: an electroadhesive surface comprising one or more electrodes; a sensor that detects the presence an object or a second object, a rate of movement of the object or the second object, or an acceleration of movement of the object or the second object; and a controller configured to decelerate the object by applying a voltage to a first electrode of the one or more electrodes when the object is in contact with the electroadhesive surface based on the sensor detection, wherein the object continues moving relative to the electroadhesive surface despite deceleration.

One aspect of the present invention comprises a system comprising: an electroadhesive surface including one or more electrodes; a sensor that detects the presence an object or a second object, a rate of movement of the object or the second object, or an acceleration of movement of the object or the second object; and a controller configured to decelerate the object by applying a voltage to a first electrode of the one or more electrodes when the object is in contact with the electroadhesive surface based on the sensor detection, wherein the object continues moving relative to the electroadhesive surface despite deceleration.

One aspect of the present invention comprises a system comprising: an electroadhesive surface comprising one or more electrodes; a controller configured to decelerate an object that is in contact with the electroadhesive surface by applying a voltage to a first electrode of the one or more electrodes based on an instruction from a processor that controls the flow of the object based on a sensor detection of the object.

One aspect of the present invention comprises a system comprising: an electroadhesive surface including one or more electrodes; a controller configured to decelerate an object that is in contact with the electroadhesive surface by applying a voltage to a first electrode of the one or more electrodes based on an instruction from a processor that controls the flow of the object based on a sensor detection of the object.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for metering a flow of a plurality of objects, the system comprising:
an electroadhesive surface including a plurality of electrodes configured to apply electroadhesive force;
a controller configured to meter the flow of the plurality of objects across the electroadhesive surface by applying a voltage to one or more select electrodes of the plurality of electrodes that are in proximity to one or more objects of the plurality of objects, wherein a controller output to apply the voltage to the one or more select electrodes is triggered by object detection data from one or more of:
(i) a sensor detecting a presence of the one or more objects;
(ii) a control system which informs one or more of a measured weight, size, or other property of the one or more objects;
(iii) a rate of movement of the one or more objects or a different set of the plurality of objects; or
(iv) an acceleration of movement of the one or more objects or the different set of the plurality of objects; and
a processor configured to: receive the object detection data, and output electroadhesive force application instructions to the controller based on the detection data, thereby metering the flow of the plurality of objects across the electroadhesive surface.

2. The system of claim 1, wherein when the controller is configured to apply the voltage when the plurality of objects is in contact with the electroadhesive surface.

3. The system of claim 1, wherein the processor comprises flow control instructions based on a second sensor, a flow plan, or a user input.

4. The system of claim 1, wherein the processor comprises flow control instructions and electroadhesive surface instructions based on the flow control instructions;
wherein the controller is configured to meter the flow of the plurality of objects by applying the voltage to the one or more electrodes when a first object of the plurality of objects is in contact with the electroadhesive surface based on instruction from the processor; and
wherein the sensor is configured to:
detect the presence of one or more objects;
detect a rate of movement of the object;
detect an acceleration of movement of the object, and output object detection data to the processor.

5. The system of claim 1, wherein the sensor is configured to detect the presence an object or a second object, a rate of movement of the object or the second object, or an acceleration of movement of the object or the second object;
wherein the controller is configured to decelerate the object by applying a voltage to a first electrode of the one or more electrodes when the object is in contact with the electroadhesive surface based on the sensor detection; and
wherein the object continues moving relative to the electroadhesive surface despite deceleration.

6. The system of claim 1, wherein the sensor comprises:
an optical sensor,
a weight sensor,
a speed sensor,
an acceleration sensor,
a proximity sensor,
a touch sensor,
a laser sensor,
a RFID sensor,
an UV sensor,
an Infrared sensor, or
a radar sensor.

7. The system of claim 1, wherein the sensor is configured to determine:
the presence of the object,
the presence of the second object,
the presence of stacked or layered objects,
the number of objects in a stack,
the size of the object,
the shape of the object,
the weight of the object,
the speed of the object,
the acceleration or deceleration of the object, or
the acceleration or deceleration of the second object.

8. The system of claim 1, wherein the electroadhesive surface is flexible, has a low coefficient of friction when there is no voltage applied, or comprises one or more of:
a pad,
a curtain,
a flap,
a strip,
chute,
a slide,
a roller,
a carousel,
a door,
an arm,
a partition,
a step,
a platform,
a table,
an undulating surface,
a decline surface, or
an incline surface.

9. The system of claim 1, further comprising:
a movable substrate; and
a fixed substrate,
wherein the fixed substrate has an electrostatic potential that is different from an electrostatic potential of the movable substrate;
wherein the electroadhesive surface shifts between a same electrostatic potential as the movable substrate and a different electrostatic potential as the movable substrate; and
wherein a velocity of the movable substrate is controlled by electroadhesion to the electroadhesive surface.

10. The system of claim 9, wherein the electroadhesive surface shifts at least twice between the same electrostatic potential as the movable substrate and the different electrostatic potential as the movable substrate.

11. The system of claim 9, wherein the electroadhesive surface shifts between electrostatic attraction to the movable substrate and electrostatic attraction to the fixed substrate; and
wherein the electroadhesive surface moves independently from the fixed substrate during the electrostatic attraction to the movable substrate.

12. The system of claim 9, wherein the second substrate is substantially at rest and the velocity of the first substrate is decreased intermittently.

13. The system of claim 9, wherein the movable substrate is one or more of a planar movable substrate, a curved movable substrate, a brake roller, or a metallic brake roller.

14. The system of claim 9, wherein the movable substrate maintains an electrostatic potential equal to ground potential.

15. The system of claim 9, wherein the fixed substrate is one or more of a planar fixed substrate, a curved fixed substrate, a fixed bed, a cupped brake housing, a molded material, or one or more electrostatic conductive regions.

16. The system of claim 9, wherein the electroadhesive surface comprises ground potential or bipolar electrostatic potential.

17. The system of claim 16, wherein the bipolar electrostatic potential comprises a region of positive polarity and a region of negative polarity.

18. The system of claim 9, wherein a velocity of the object contacting the movable substrate is controlled by electroadhesion.

19. The system claim 9, wherein the system is utilized as one or more of a roller brake, a braking system, or a roller conveyer.

20. The system of claim 9, further comprising an optical sensor, wherein the optical sensor measures one or more features of the object comprising a weight of the object, a velocity of the object, or an acceleration of the object, or combinations thereof.

* * * * *